(12) United States Patent
Chen

(10) Patent No.: US 9,347,207 B2
(45) Date of Patent: May 24, 2016

(54) FAUCET ASSEMBLY

(71) Applicant: Chung-Chia Chen, La Habra Heights, CA (US)

(72) Inventor: Chung-Chia Chen, La Habra Heights, CA (US)

( * ) Notice: Subject to any disclaimer, the term of this patent is extended or adjusted under 35 U.S.C. 154(b) by 399 days.

(21) Appl. No.: 13/843,148

(22) Filed: Mar. 15, 2013

(65) Prior Publication Data

US 2014/0261749 A1 Sep. 18, 2014

(51) Int. Cl.
*E03C 1/05* (2006.01)
*F16K 11/074* (2006.01)

(52) U.S. Cl.
CPC .............. *E03C 1/057* (2013.01); *F16K 11/074* (2013.01); *Y10T 137/1842* (2015.04); *Y10T 137/2496* (2015.04); *Y10T 137/8208* (2015.04); *Y10T 137/86389* (2015.04)

(58) Field of Classification Search
CPC ............ E03C 1/057; Y10T 137/86389; Y10T 137/8208; Y10T 137/9464; F16K 19/006
USPC .................. 4/623, 678; 251/129.04; 137/801, 137/624.11, 552.7
See application file for complete search history.

(56) References Cited

U.S. PATENT DOCUMENTS

| | | | |
|---|---|---|---|
| D315,397 S | 3/1991 | Knapp | |
| D317,971 S | 7/1991 | Sauter et al. | |
| D352,095 S | 11/1994 | Bollenbacher | |
| 5,548,119 A | 8/1996 | Nortier | |
| 5,549,273 A | 8/1996 | Aharon | |
| 5,566,702 A | 10/1996 | Philipp | |
| 5,625,908 A | 5/1997 | Shaw | |
| 5,694,653 A | 12/1997 | Harald | |
| 5,781,942 A | 7/1998 | Allen et al. | |
| 5,868,311 A | 2/1999 | Cretu-Petra | |
| 5,966,753 A | 10/1999 | Gauthier et al. | |
| 6,019,130 A | 2/2000 | Rump | |
| 6,298,875 B1 | 10/2001 | Warshawsky et al. | |
| 6,321,785 B1 | 11/2001 | Bergmann | |
| 6,513,787 B1 | 2/2003 | Jeromson et al. | |

(Continued)

FOREIGN PATENT DOCUMENTS

| | | |
|---|---|---|
| CN | 2584985 | 11/2003 |
| CN | 2906258 | 5/2007 |

OTHER PUBLICATIONS

U.S. Appl. No. 13/862,254, System and Method of Touch Free Automatic Faucet, filed Apr. 12, 2013.

(Continued)

*Primary Examiner* — Atif Chaudry
(74) *Attorney, Agent, or Firm* — Knobbe Martens Olson & Bear, LLP

(57) ABSTRACT

A touch-free faucet provides control over flow and/or temperature by detecting object presence in one or more detection zones. In one embodiment, the faucet provides for continuous-flow water flow wherein the spout of the faucet pours water for a period of time regardless of whether an object is detected in a detection zone, such as the sink, during that time. The faucet may initiate continuous-flow based on the detection of an object in another detection zone, and may cause continuous-flow operation for a determined period of time based on the amount of substantially uninterrupted time during which an object is detected in a detection zone associated with initiating continuous-flow mode. Furthermore, the faucet may provide for user-programmable sensitivity affecting the amount of continuous-flow time that is determined based on the amount of time that the faucet detects object in the continuous-flow mode detection zone.

18 Claims, 31 Drawing Sheets

(56) References Cited

U.S. PATENT DOCUMENTS

| | | |
|---|---|---|
| 6,598,245 B2 | 7/2003 | Nishioka |
| 6,753,554 B1 | 6/2004 | Gomes et al. |
| 6,996,863 B2 | 2/2006 | Kaneko |
| D516,675 S | 3/2006 | Kakihana |
| 7,107,631 B2 | 9/2006 | Lang et al. |
| 7,134,451 B1 | 11/2006 | Malapanes |
| D534,622 S | 1/2007 | Chu et al. |
| D535,366 S | 1/2007 | Sedwick |
| 7,174,577 B2 | 2/2007 | Jost et al. |
| 7,228,874 B2 | 6/2007 | Bolderheij et al. |
| 7,326,334 B2 | 2/2008 | Boyd et al. |
| D592,286 S | 5/2009 | Berberet |
| D602,125 S | 10/2009 | Montgomery et al. |
| 7,641,173 B2 | 1/2010 | Goodman |
| D610,653 S | 2/2010 | Schoenherr et al. |
| 7,766,026 B2 | 8/2010 | Boey |
| 7,784,481 B2 | 8/2010 | Kunkel |
| 7,946,504 B2 | 5/2011 | Shapira et al. |
| 8,006,712 B2 | 8/2011 | Boey |
| 8,028,355 B2 | 10/2011 | Reeder et al. |
| D677,366 S | 3/2013 | Chen |
| D677,367 S | 3/2013 | Chen |
| 8,418,993 B2 | 4/2013 | Chen |
| 8,438,672 B2 | 5/2013 | Reeder et al. |
| 8,516,628 B2 | 8/2013 | Conroy |
| D689,596 S | 9/2013 | Chen |
| D692,110 S | 10/2013 | Chen |
| 8,572,772 B2 | 11/2013 | Wolf et al. |
| D698,013 S | 1/2014 | Chen |
| D701,947 S | 4/2014 | Chen |
| D704,311 S | 5/2014 | Chen |
| D707,798 S | 6/2014 | Chen |
| 8,827,239 B2 | 9/2014 | Chen |
| 8,827,240 B2 | 9/2014 | Chen |
| 9,062,790 B2 | 6/2015 | Esche et al. |
| 2006/0016902 A1 | 1/2006 | Restivo, Sr. et al. |
| 2007/0057215 A1 | 3/2007 | Parsons et al. |
| 2007/0170384 A1 | 7/2007 | Goodman |
| 2007/0239143 A1 | 10/2007 | Altshuler et al. |
| 2008/0156017 A1 | 7/2008 | Johnson et al. |
| 2008/0256494 A1 | 10/2008 | Greenfield |
| 2009/0014654 A1 | 1/2009 | Zhevelev et al. |
| 2009/0056011 A1 | 3/2009 | Wolf et al. |
| 2009/0119832 A1 | 5/2009 | Conroy |
| 2009/0288712 A1 | 11/2009 | Lang et al. |
| 2010/0108165 A1 | 5/2010 | Rodenbeck et al. |
| 2011/0185493 A1 | 8/2011 | Chen |
| 2011/0186161 A1 | 8/2011 | Chen |
| 2012/0055557 A1 | 3/2012 | Belz et al. |
| 2013/0233387 A1 | 9/2013 | Bedolla et al. |
| 2013/0248617 A1 | 9/2013 | Sawaski et al. |
| 2013/0269799 A1 | 10/2013 | Swist |
| 2014/0290774 A1 | 10/2014 | Chung |
| 2015/0052677 A1 | 2/2015 | Chen |
| 2015/0101122 A1 | 4/2015 | Chung |

OTHER PUBLICATIONS

U.S. Appl. No. 12/815,281, Touch Free Automatic Faucet, filed Jun. 14, 2010.

U.S. Appl. No. 13/005,457, Mixing System and Faucet for Touch-Free Automatic Faucet, filed Jan. 12, 2011.

U.S. Appl. No. 29/489,642 Including its prosecution history, filed May 1, 2014, Chen.

U.S. Appl. No. 29/479,788 Including its prosecution history, filed Jan. 20, 2014, Chen.

U.S. Appl. No. 29/509,093 Including its prosecution history, filed Nov. 13, 2014, Chen.

U.S. Appl. No. 29/509,094 Including its prosecution history, filed Nov. 13, 2014, Chen.

U.S. Appl. No. 14/728,868 Including its prosecution history, filed Jun. 2, 2015, Chen.

U.S. Appl. No. 14/734,819 Including its prosecution history, filed Jun. 9, 2015, Chen.

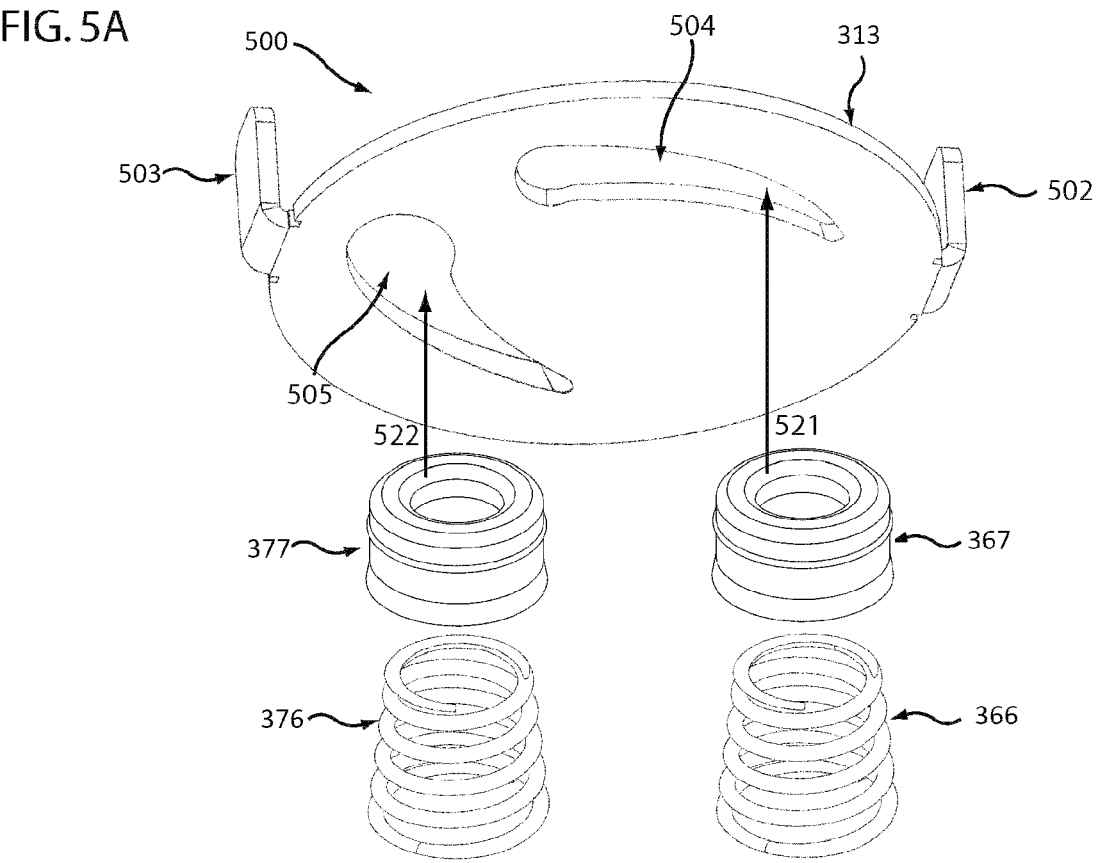
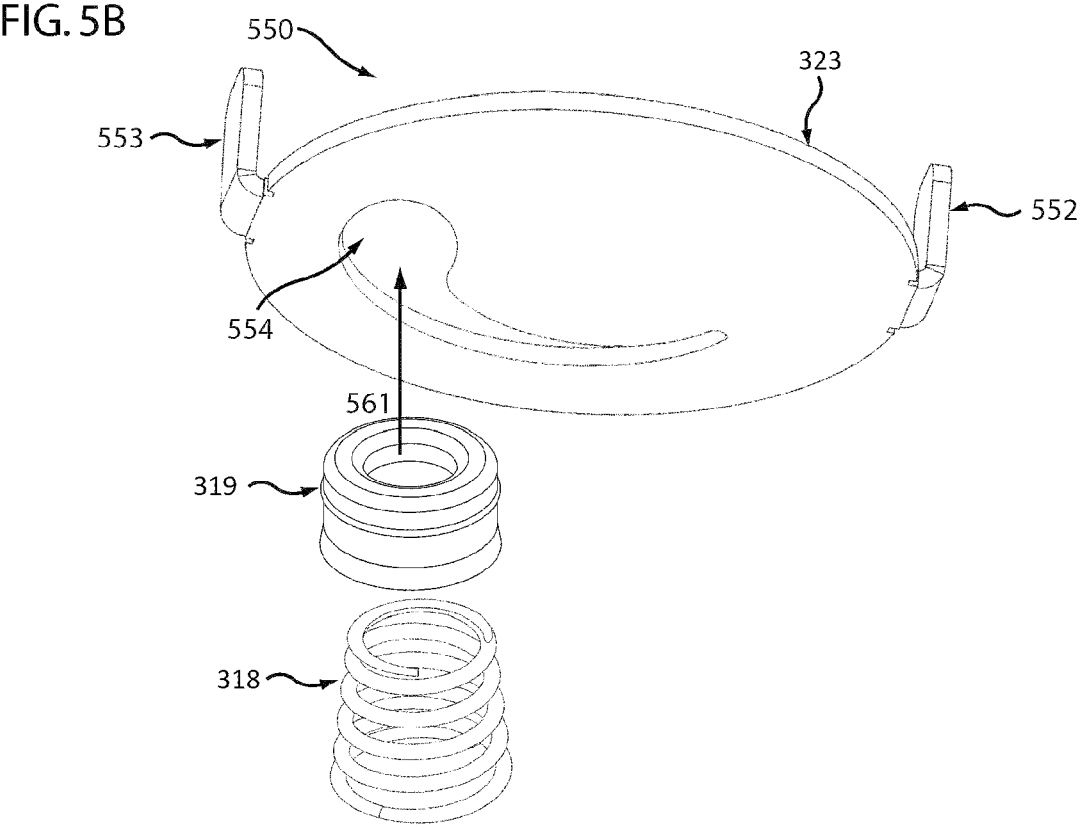

FAUCET ASSEMBLY

BACKGROUND

Touch-free faucets can provide a more hygienic means of washing hands and performing other tasks associated with traditional faucets. Touch-free faucets typically operate by sensing the presence of an object in a detection area, and pouring water in response to that detected object. However, there remains a need to enhance the available features of faucet assemblies with touch-free capabilities and to allow users an opportunity to manipulate various functional attributes.

Faucet assemblies may include a control valve responsible for controlling the temperature and/or flow rate of water poured by the faucet. However, existing control valves may introduce inefficiencies such as energy loss through lost radiant heat, and delays in providing water at a desired temperature and flow rate to the faucet spout.

SUMMARY OF SOME EMBODIMENTS

In some embodiments, a faucet apparatus for providing user-controllable continuous water flow may include a spout configured to direct water flow into a sink; a logic processor; a first sensor zone comprising a first sensor, said first sensor facing the area in which the spout is configured to direct water to flow; and a second sensor zone comprising a second sensor, said second sensor configured to detect an object in the second sensor zone and respond to the detection by providing input to the logic processor; wherein the logic processor is programmed to: determine whether an electronic representation of a flow state is in either a primary-water-flow-mode or a continuous-water-flow mode; receive input from the first sensor indicating the presence of an object within the first sensor zone and, in response thereto, cause the spout to direct water flow while the input from the first sensor indicates than an object is present in the first sensor zone; cause the spout to stop directing water flow when the input from the first sensor indicates that no object is present within the first sensor zone, if it is determined that the electronic representation of the flow state is in the primary-water-flow-mode; and receive input from the second sensor indicating the presence of an object within the second sensor zone and, in response thereto, if the electronic representation of the flow state is in the primary-water-flow-mode, determine an amount of time for continuous water flow based on the amount of substantially uninterrupted time in which the object is detected in the second sensor zone and in response thereto, change the electronic representation of the flow state from the primary-water-flow-mode to the continuous-water-flow-mode, and cause the spout to direct water flow for the determined amount of time for continuous water flow, regardless of whether an object is present in the first sensor zone.

In some embodiments, the logic processor may be further programmed to receive input from the second sensor indicating the presence of an object within the second sensor zone and, in response thereto, if the electronic representation of the flow state is in the continuous-water-flow mode, cause the spout to stop directing water to flow.

In some embodiments, the logic processor may be further programmed to receive input from the second sensor indicating the presence of an object within the second sensor zone and, in response thereto, if the electronic representation of the flow state is in the continuous-water-flow mode, increase the determined amount of time for continuous water flow.

In some embodiments, the logic process may be further programmed to receive input from the second sensor indicating the presence of an object within the second sensor zone and, in response thereto, if the electronic representation of the flow state is in the continuous-water-flow mode, increase the determined amount of time for continuous water flow as a function of the amount of time that the object is detected within the second sensor zone substantially interrupted.

In some embodiments, the logic process may be further programmed to receive input from the second sensor indicating the presence of an object within the second sensor zone and, in response thereto, if the electronic representation of the flow state is in the continuous-water-flow mode and the object is detected for at least a minimum threshold amount of time, increase the determined amount of time for continuous water flow; and receive input from the second sensor indicating the presence of an object within the second sensor zone and, in response thereto, if the electronic representation of the flow state is in the continuous-water-flow mode and the object is detected for less than a minimum threshold amount of time, cause the spout to stop directing water to flow.

In some embodiments, the apparatus further may include a display element, wherein the display element is configured to provide a visual indication when the electronic representation of a flow state is in continuous-water-flow mode.

In some embodiments, the logic processor may be further programmed to receive a first input from the second sensor indicating the presence of an object within the second sensor zone and, in response thereto, if the electronic representation of the flow state is in the primary-water-flow-mode, determine an amount of time for continuous water flow based on the amount of substantially uninterrupted time in which the object is detected in the second sensor zone and in response thereto, change the electronic representation of the flow state from the primary-water-flow-mode to the continuous-water-flow-mode, and cause the spout to direct water flow for the determined amount of time for continuous water flow, regardless of whether an object is present in the first sensor zone; and receive a second input from the second sensor indicating the presence of an object within the second sensor zone and, in response thereto, if the electronic representation of the flow state is in the primary-water-flow-mode and the second input was received within a predetermined duration from when the first input was received, change the electronic representation of the flow state from the primary-water-flow-mode to the continuous-water-flow-mode, and cause the spout to direct water flow for the same determined amount of time for continuous water flow as was determined in response to the receipt of the first input, regardless of whether an object is present in the first sensor zone.

In some embodiments, the assembly further may include a third sensor zone comprising a third sensor, the third sensor configured to detect an object in the third sensor zone and respond to the detection by providing input to the logic processor; and wherein the logic processor is further programmed to determine an electronic representation for a continuous-water-flow timing-sensitivity level; receive input from the third sensor indicating the presence of an object within the third sensor zone and, in response thereto, change the electronic representation for the continuous-water-flow-sensitivity level; and receive input from the second sensor indicating the presence of an object within the second sensor zone and, in response thereto, if the electronic representation of the flow state is in the primary-water-flow-mode, determine an amount of time for continuous water flow based on both the amount of substantially uninterrupted time in which the object is detected in the second sensor zone and the continuous-water-flow timing-sensitivity level, and in response thereto, change the electronic representation of the flow state from the primary-water-flow-mode to the continuous-water-flow-mode, and cause the spout to direct water flow for the determined amount of time for continuous water flow, regardless of whether an object is present in the first sensor zone.

In some embodiments wherein changing the electronic representation for the continuous-water-flow-sensitivity level comprises setting the electronic representation for the continuous-water-flow-sensitivity level to one of a low-sensitivity state, a medium-sensitivity state, or a high-sensitivity state, the logic processor may be further programmed to, in response to receiving input from the second sensor indicating the presence of an object within the second sensor zone, determine an amount of time for continuous water flow as the product of the amount of substantially uninterrupted time in which the object is detected in the second sensor zone and either a low-sensitivity multiplier, a medium-sensitivity multiplier, or a high-sensitivity multiplier, depending on which of the respective continuous-water-flow-sensitivity levels the electronic representation for the continuous-water-flow-sensitivity level is set to, wherein the low-sensitivity multiplier is a lower numeric value than the medium-sensitivity multiplier and the medium-sensitivity multiplier is a lower numeric value than the high-sensitivity multiplier.

In some such embodiments, the low-sensitivity multiplier may be 5, the medium-sensitivity multiplier may be 15, and the high-sensitivity multiplier may be 60 such that, if an object is detected in the second sensor zone substantially uninterrupted for 5 seconds, the logic processor is configured to determine the amount of time for continuous water flow as 25 seconds if the continuous-water-flow-sensitivity level is in the low-sensitivity state, the logic processor is configured to determine the amount of time for continuous water flow as 75 seconds if the continuous-water-flow-sensitivity level is in the medium-sensitivity state, and the logic processor is configured to determine the amount of time for continuous water flow as 5 minutes if the continuous-water-flow-sensitivity level is in the high-sensitivity state.

In some embodiments, wherein changing the electronic representation for the continuous-water-flow-sensitivity level comprises setting the electronic representation for the continuous-water-flow-sensitivity level to a multiple calculated as a function of the amount of substantially uninterrupted time in which an object is detected in the second sensor zone.

In some embodiments, the second sensor zone overlaps with the third sensor zone.

In some embodiments the logic processor is further configured to reset the electronic representation for the continuous-water-flow-sensitivity level to a default value after a predetermined period of time.

In some embodiments further comprising a display element, the display element may be configured to provide a visual indication of the continuous-water-flow timing-sensitivity level.

In some embodiments, the display element may be a light emitting diode configured to blink as an indication of the continuous-water-flow timing-sensitivity level, such that the light emitting diode is configured to blink a larger number of times as an indication of a higher continuous-water-flow timing-sensitivity level and the light emitting diode is further configured to blink a smaller number of times as an indication of a lower continuous-water-flow timing-sensitivity level.

In some embodiments of a control valve apparatus for a touch-free faucet, the control valve apparatus may include an electrical power supply package; a logic processor electronically coupled to said electrical power supply package; a user-notification component electronically coupled to said logic processor; and a water-detection component configured to detect the presence of water and, in response thereto, provide a water-detection signal to the logic processor; wherein said logic processor is configured to receive said water-detection signal and, in response thereto, transmit a signal to said user-notification component, thereby causing said user-notification component to transmit an indication of a detected water leak.

In some embodiments, the water-detection component can include an electronic humidity sensor such as capacitor humidity sensor, resistive humidity sensor or thermal conductivity sensor to detect humidity increase inside the control valve box due to the water leaking from the control box.

In some embodiments, the water-detection component can include two sensor diodes such that, in the presence of sufficient water, the two sensor diodes form a circuit having a signal conducted by said water and, in the absence of sufficient water, the two sensor diodes do not form a circuit.

In some embodiments the user-notification component comprises an audio notification component configured to make an audible notification of a detected water leak.

In some embodiments, the audio notification component comprises a beep-component configured to transmit a beeping noise as a notification of a detected water leak.

In some embodiments, the audio notification component may include a voice-component configured to transmit a spoken statement as a notification of a detected water leak.

In some embodiments, the user-notification component may include a display notification component configured to provide a visual notification of a detected water leak.

In some embodiments, the display notification component may include a light-emitting diode (LED) that provides a blinking indication of a detected water leak.

In some embodiments, the display notification component may include a display screen component configured to display a plurality of images on a screen, including an image indicating a detected water leak.

In some embodiments, the water control valve may be configured to receive one or more signals from said logic processor and, in response thereto, adjust the temperature and/or flow rate of water passing through the valve, and wherein the logic processor is further configured, in response to the receipt of a water-detection signal, to transmit a shutoff signal to the water control valve thereby causing the water control valve to shut off the flow of water exiting the water control valve.

In some embodiments, of a control valve apparatus for controlling the temperature and flow-rate of water flow, the control valve apparatus may include a cold water inlet connector; a warm water inlet connector; a water temperature control housing comprising a water temperature control cartridge, the water temperature control housing configured to receive cold water from the cold water inlet connector and receive warm water from the warm water inlet connector, wherein the water temperature control cartridge includes one or more openings arranged to permit the flow of cold and warm water from the cold water inlet connector and warm water inlet connector, respectively; a temperature-control motor unit configured to control the rotational position of the water temperature control cartridge, wherein the temperature-control motor unit is configured to receive a temperature control signal from a logic processor, and in response thereto, control the ratio of cold water received to warm water received by adjusting the rotational position of the water temperature control cartridge; a water flow control valve comprising a water flow control cartridge, said water flow control cartridge including one or more openings arranged to provide adjustable amount of flow of mixed-temperature water through the water flow control valve; a flow-control motor unit configured to control the rotational position of the flow control cartridge, wherein the flow-control motor unit is configured to receive a flow control signal from a logic processor, and in response thereto, control the rate that mixed-temperature water flows through the water control valve; and a water outlet nozzle configured to provide outflow of mixed temperature water at a temperature and rate controlled by the control valve; wherein said cold water inlet connector, warm water inlet connector, water temperature control housing, water flow control valve, and water outlet nozzle are configured substantially along a single plane; and wherein the distance between the water temperature control housing and the water flow control valve is less than the internal diameter of the water temperature control housing.

In some embodiments, the motor unit may include a stepper motor.

In some embodiments, the water flow control valve may include a solenoid valve.

BRIEF DESCRIPTION OF DRAWINGS

The accompanying drawings, which are incorporated in and form a part of this specification, illustrate example embodiments of the inventive subject matter, and in no way limit the scope of protection. The accompanying drawings illustrate embodiments wherein:

FIG. 5A illustrates an embodiment of a water-temperature control module assembly from a control valve cartridge assembly.

FIG. 5B illustrates an embodiment of a water-flow control module assembly from a control valve cartridge assembly.

DETAILED DESCRIPTION

The following description is made for the purpose of illustrating various embodiments and is not meant to limit the inventive concepts described or claimed herein. Further, particular features described herein can be used in combination with other described features in each of the various possible combinations and permutations. Unless otherwise specifically defined herein, all terms are to be given their broadest possible interpretation including meanings implied from the specification, as well as meanings understood by those skilled in the art and/or as defined in dictionaries, treatises, etc. The description discloses several embodiments of a control valve assembly for use with faucet assemblies, as well as operation and/or component parts thereof. While the following description will be described in terms of control valve assembly for automatic touch-free faucets for clarity and placing various embodiments in context, it should be kept in mind that the teachings herein may have broad application to other types of systems, devices, and methods.

Figure 1:
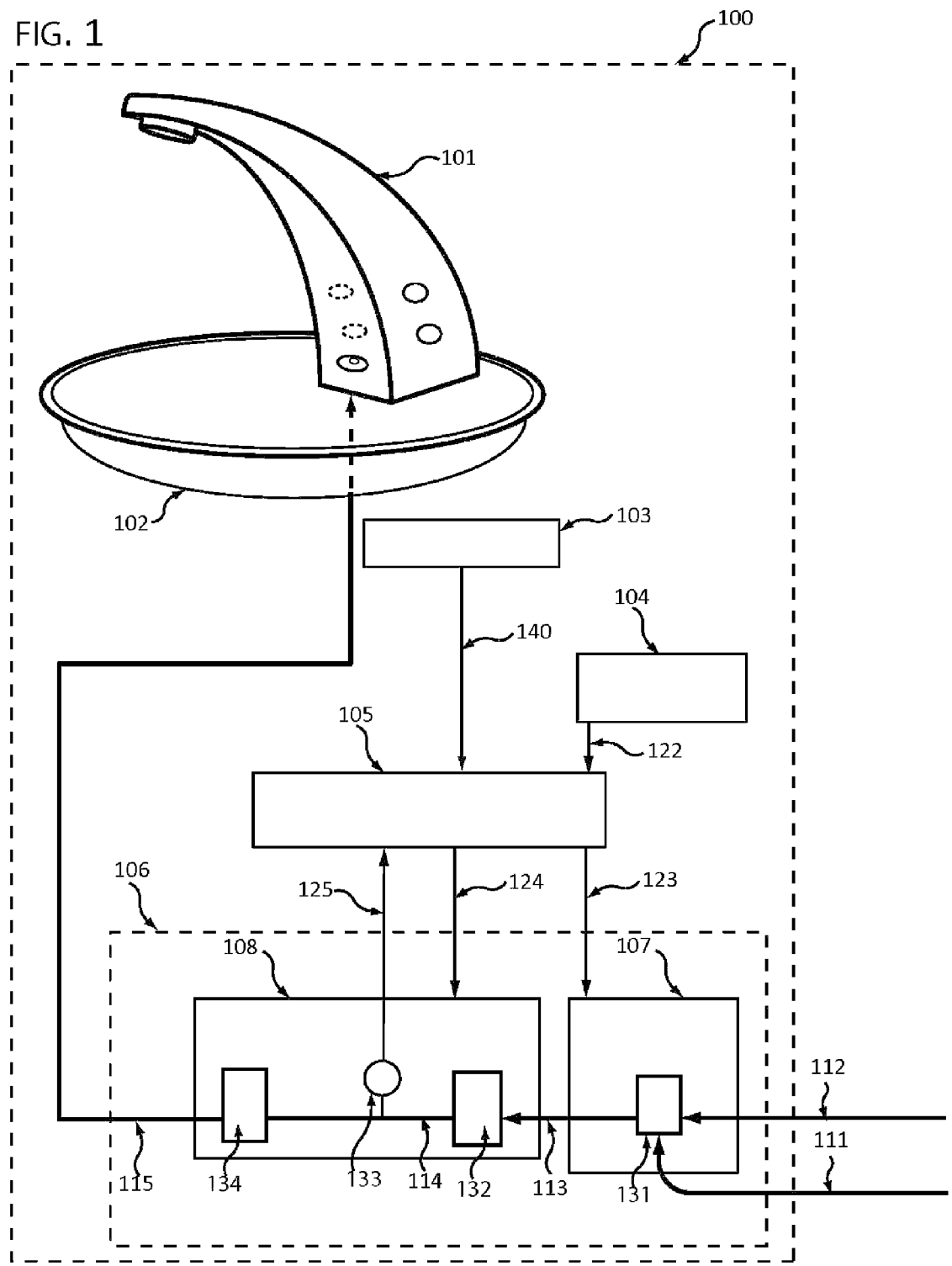
FIG. 1 depicts an embodiment of a touch-free faucet assembly, including a spout with embedded sensors, a logic processor circuit board, a power supply, and a control valve assembly.

FIG. 1 depicts an illustrative touch-free automatic faucet including a control valve assembly according to an embodiment and a schematic representation of additional components that may be associated therewith. The illustrative touch-free automatic faucet system (100) includes a faucet spout (101) with sensor assembly (103), a logic processor circuit board (105), an electrical power supply package (104) and a control valve assembly (106). In some embodiments, the power supply package (104) may include one or more a batteries, a solar cell system, direct current voltage supplied from an AC/DC converter, or any combination thereof.

The sensor assembly (103) is configured to received sensing signals from sensors which may be positioned on the faucet spout. In some embodiments, the sensors may be positioned on a separate control console and can communicate with the logic processor circuit board (105). Communication between the sensors may be through a wired link or wireless for example using Bluetooth or wireless communication technologies. The logic processor circuit board (105) can be powered (122) by an electrical power supply package (104) and can communicate with control valve assembly (106) to control the input cold water supply (111) and hot water supply (112) and output the adjusted mixed water (115) at the desired water temperature to the faucet spout. In some embodiments, sensors may communicate individually with the logic processor circuit board (105) without a sensor assembly.

Embodiments of the control valve assembly (106) may include a water temperature control valve assembly (107) including a two way temperature control valve (131), which, in some embodiments, can be a motorized gear driven valve, though other types of valves are also possible. The control valve assembly (106) may also include a water flow control valve assembly (108) which may include a water-flow control valve (132), a water temperature detection device (133), and an on/off valve 134. In some embodiments, the water-flow control valve (132) may be a motorized gear driven valve, though other types of valves are also possible. In some embodiments, valve (134) may be a solenoid valve, though other types of valves are also possible. In some embodiments, valve (134) is capable of rapid shifts from a first closed position to a second position. In some embodiments, the second position may be partially or fully open and the valve is configured to return to the second position that was used prior to switching to the first position. Thus, such valves are capable of rapidly returning to a position that allows a set flow there through.

In some embodiments, the control valve assembly (106) may receive signals to manipulate the flow of fluid through the assembly. For example, the water temperature control valve assembly (107) may receive one or more control signals (123) from a logic processor (105) instructing the valve to adjust the water mixing ratio of cold water (111) and hot water (112). For example, the temperature control valve may adjust the mixing ratio of hot water and cold water by controlling the relative intake levels of hot water from a hot water input (112) and cold water from a cold water input (111).

In some embodiments, the water flow control valve assembly (108) receives one or more signals (124) from logic processor (105) to adjust the rate at which the temperature-controlled, mixed water (113) may flow though the control valve assembly (106). For example, by restricting the flow rate through the flow control valve (108), the control valve assembly (106) may restrict the rate of flow of water through various portions of the water flow path, including the flow through the temperature detection device (133), which in some embodiments may be a thermometer, thermister, thermocouple, etc. The mixed hot/cold water (114) can then flow through a valve (134) that may serve to toggle water flow on and off. As discussed above, in some embodiments, valve (134) may be a solenoid or other appropriate valve capable of rapid switching. In some embodiments, a solenoid valve may facilitate on/off water toggling by rapidly returning to the state of water flow from prior use when water flow is resumed. A mechanical valve may be capable of shutting water flow off by rotating to a fully closed position, however a mechanical valve may subsequently turn water flow back on by first rotating through a range of low flow rate before reaching a desired flow rate.

By placing a valve (134) that is capable of rapid on/off flow rate control in line with a valve (132), the valve (134) may control on/off toggle so that the valve (132) retains its rotational position for a selected flow rate, causing water flow to promptly resume at that rate once flow is turned back on. A valve 134 dedicated to on/off functionality may further provide a more rapid response to signals instructing water flow to turn on or off. In the illustrated embodiment, the flow controlled water (115) is output to the faucet spout (101).

In some embodiments, a temperature detector (133) measures the temperature of the water after the hot water has been mixed with the cold water in the temperature control valve assembly (107). The detector 133 may transmit one or more water temperature signals (125) to the logic processor (105). The system may respond to the water temperature signals (125) by sending signals back to the control valve assembly (106) to adjust the temperature. For example, the logic processor (105) may transmit a signal to the temperature control valve (107) instructing it to adapt the temperature mixing ratio in order to generate mixed water flow 114 consistent with a selected temperature.

In some embodiments, the logic processor (105) may send a signal to reduce water temperature if the water temperature signal (125) reveals that the water has exceeded a maximum temperature safety level. In some embodiments, the faucet apparatus may display the measured water temperature, based on the water temperature signal (125) to a user, for example by displaying the temperature on a liquid crystal display incorporated into the faucet or a secondary, separate assembly.

Figure 2:
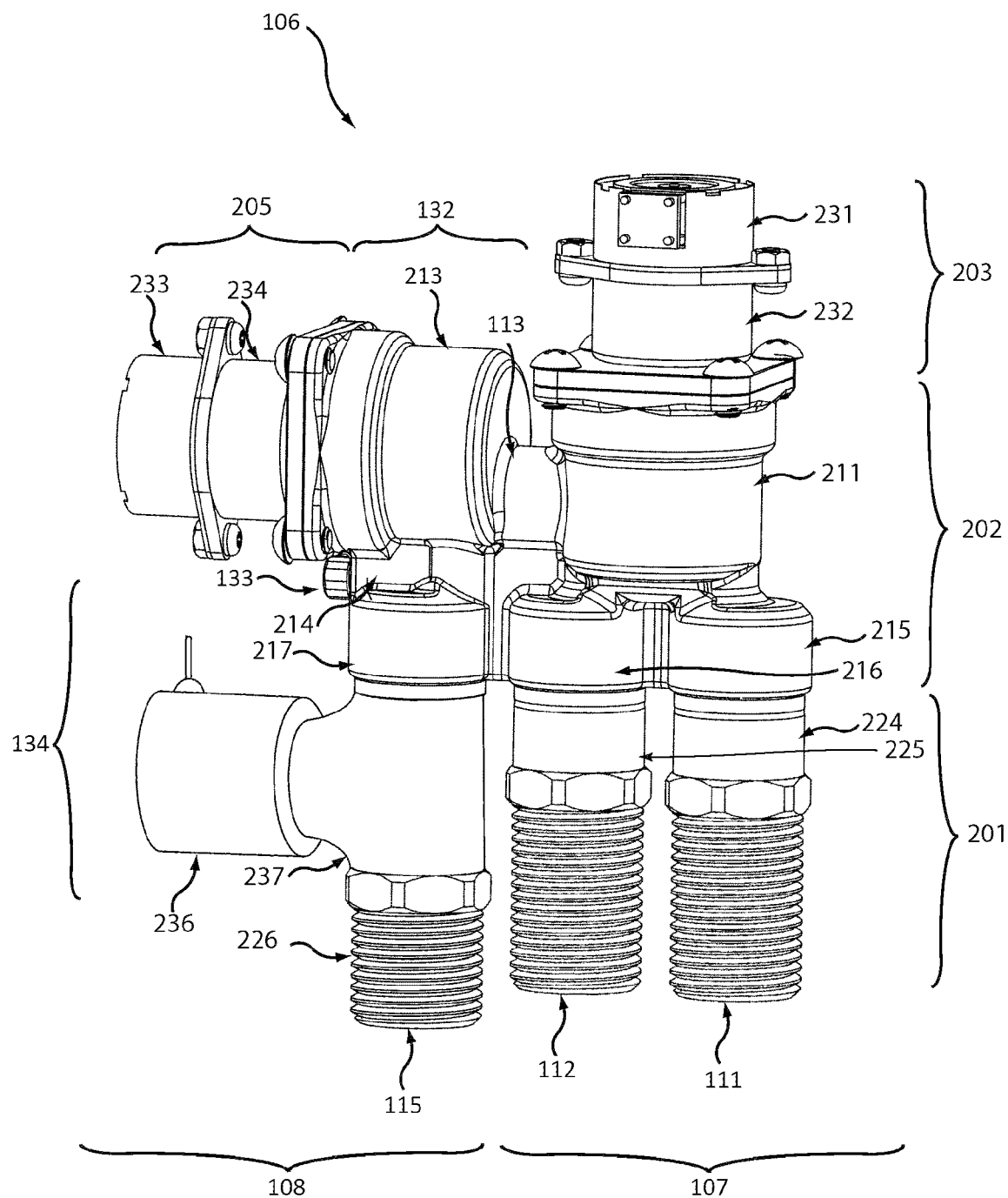
FIG. 2 illustrates an embodiment of a control valve.

FIG. 2 illustrates an embodiment of a control valve assembly (106). The lower portion (201) of the water inlet portion of control valve assembly (106) may include a cold water inlet connector (111) with a cold water strainer housing (224), which may include a cold water strainer and a check valve in some embodiments. The lower portion (201) may also include a hot water inlet connector (112) with a water strainer housing (225) which may include a hot water strainer and a check valve in some embodiments. The upper portion (202) of the control valve assembly (200) may include a cold water connection nozzle (215) and a hot water connection nozzle (216). The water temperature control valve housing (211) houses a water temperature control cartridge that is used to control the mixing ratio for hot water to cold water. The upper portion (203) of the motorized gear assembly includes a motor (231) such as a stepper motor, and a gear actuator (232) connecting the water temperature control cartridge to the water temperature control valve housing (211). The water temperature cartridge may be capable of adjusting the ratio for mixed water flow; this may control the flow from the housing (211) through a water channel (113) to a water flow control valve housing (213).

The portion of the water flow control valve (132) shown as immediately following the water channel (113) receives the mixed water through the water channel (113) from the water temperature control valve housing (211). Attached to the water flow control valve (132) is a motorized gear assembly (205) that includes a motor (233), such as a stepper motor, and a gear actuator (234) connecting the water flow control cartridge housed in the flow control valve housing (213). The water flow cartridge adjusts water flow rate and output through the connecting water channel (214) where a temperature detector (133), for example a thermometer, may be present to detect water temperature and feed a signal regarding the temperature back to the logic processor (105). In certain embodiments, the logic processor uses this signal for water temperature control in a subsequent portion of the valve (134).

In the illustrated embodiment, the subsequent portion of solenoid valve (134) includes a solenoid actuator (236) and a solenoid valve body (237) to toggle water flow. The use of a solenoid valve may provide fast response to electronic instructions affecting turning water flow on or off (e.g., the primary water flow control Primary-Water-Flow-Mode by Primary Sensor, and continuous water flow control Continuous-Water-Flow-Mode by secondary sensor). The use of a solenoid valve may reduce the work load of water flow control valve (132) and extend the life of motor gear (205).

In the illustrated embodiment, a water outlet nozzle (115) connects an outlet nozzle housing (226). In certain embodiments, a water flow regulator is included to restrict water flow rate is housed in the outlet nozzle housing (226). For example, this may provide water conservation and may comply with regulations or code such as "water sense" or "NSF". In various embodiments, the valve housing 106 is formed out of one or more materials including metal, for example copper, bronze, or stainless steel, or plastic. In some embodiments, the valve housing is formed of a combination of plastic, metal, and/or other material. The housing may be formed through material injection, molding, cutting, 3-dimensional printing, or other techniques.

Figure 3A:
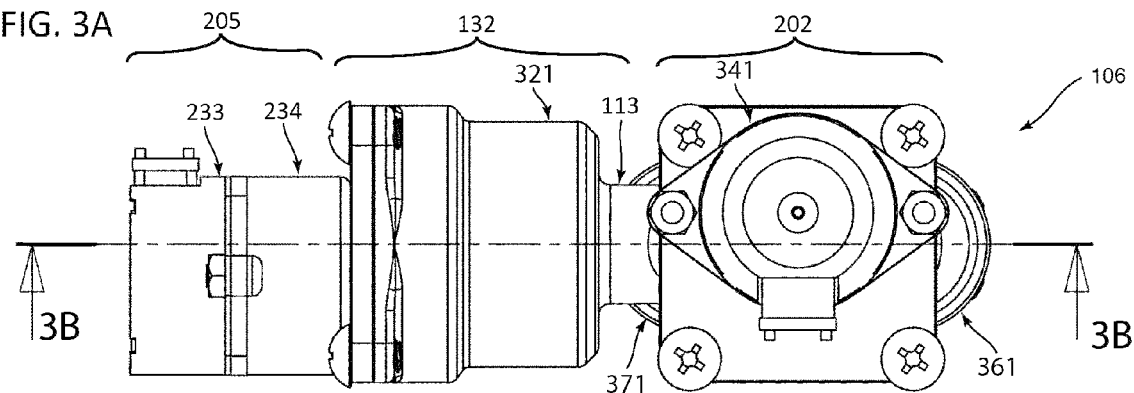
FIG. 3A illustrates a top view of the control valve of FIG. 2.

FIG. 3A illustrates a top view of the embodiment shown in FIG. 2. A cold water inlet connector (361), hot water inlet connector (371) and a water temperature control motor (231) are shown. The water channel from water temperature control valve (202) flows through the connection channel (113) to the water flow control valve housing (321). The water flow control motor (233) and gear actuator (234) are also shown.

Figure 3B:
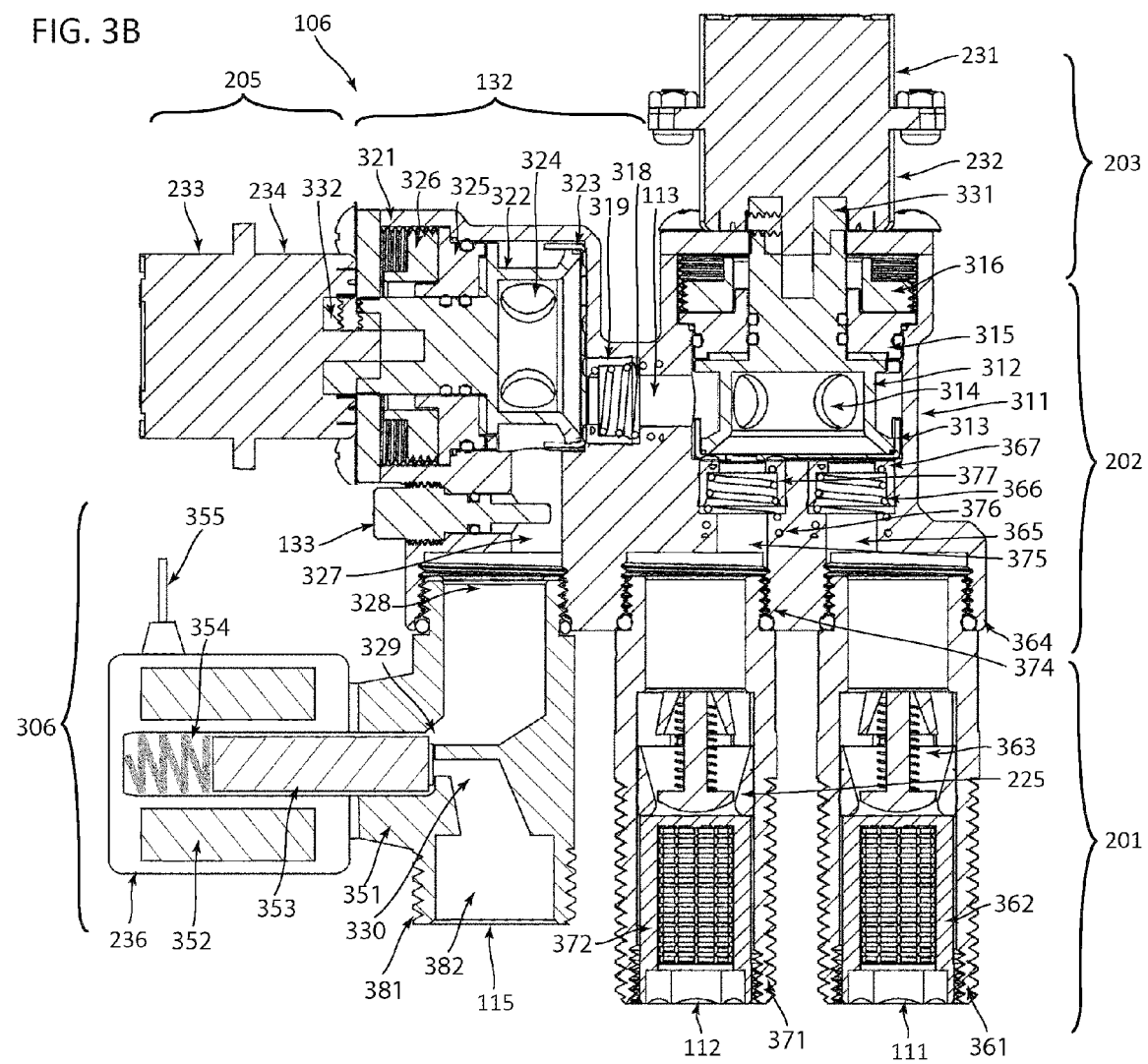
FIG. 3B illustrates a cross-sectional side view of the control valve of FIG. 2 taken along the line 3B-3B.

FIG. 3B illustrates a side section view of the embodiment shown in FIG. 2, and as a cross-section of the embodiment shown in FIG. 3A. As shown, the water supply inlet assembly can include a cold water inlet connector (111) with a cold water inlet housing (361). The illustrated cold water inlet housing (361) includes a cold water strainer (362) to remove foreign particles and/or debris in the cold water supply and a check valve (363) to prevent backflow from the hot water supply. The embodiment also includes a hot water inlet connector (112) with a water inlet housing (371) for hot water strainer (372) to remove foreign particles and/or debris in the hot water supply and a check valve (225) to prevent backflow from the cold water supply. The water temperature control valve also includes a cold water connect nozzle (364) and a hot water connect nozzle (374). The water temperature control valve housing (311) houses the water temperature control cartridge body (312), a control module including a control disk (313) and a bushing (367) coupled with a holding spring (366) to control cold water from the water inlet channel (365). In some embodiments, a bushing is not present and a different rotation element, such as a bearing, may be used. The control disk (313) also includes a bushing (377) coupled with a holding spring (376) to control hot water from the hot water inlet channel (375) at a mixing cold/hot water ratio according to the temperature control signal (123) from the logic processor (105) as shown in FIG. 1. The mixed hot/cold water flows from the opening of cartridge chamber (314) through the water channel (113) to the flow control valve (132). A cartridge shaft housing (315) and a locking nut (316) are also shown. The bracketed portion of the motorized gear assembly (203) includes a motor (231), such as a stepper motor, and a gear actuator (232) connecting the water temperature control cartridge (312). The motor (231) in the temperature control valve gear assembly (203) turns a gear actuator (232) that connects with the top portion of the temperature valve cartridge stem (331). As one or more signals are received from the logical processor (105), the motor turns the temperature control valve stem (331) and rotates it to adjust the size of the cold/hot water control cartridge module opening (313). In another embodiment, an alternative mechanical control device is used instead of the illustrated motor.

The flow control valve housing (321) includes a flow control cartridge (322) and a control module. The flow control module includes a control disk (323) and a bushing (319) coupled with a holding spring (318) to control the mixed hot/cold water from the water channel (113). In this example, the flow rate of the mixed hot/cold water is set according to the signal from the logic processor (105). This is accomplished by rotating the step motor gear assembly to control the flow rate. A cartridge shaft housing (325) and a locking nut (326) are also shown. The adjusted water flow flows through the cartridge opening (324) to the temperature detection chamber (327) of the bracketed portion of solenoid control assembly (306). The illustrated solenoid control assembly (306) includes a thermocouple (133), a solenoid actuator (236) with a solenoid body (351), a water outlet nozzle (115), a water outlet connector (381) and a water regulator housing (382). The thermocouple (133) is positioned to detect the temperature of outbound water flow and provide information concerning that temperature to logic processor (105) for water temperature control and display. The solenoid actuator includes a solenoid coil (352), a plunger (353), a spring (354) and power supply (355).

The solenoid valve (236) in embodiment of FIG. 3B is a direct-acting type solenoid valve. Other embodiments use one or more other types of solenoid valve, such as a bi-state type solenoid valve or a diaphragm piloted valve. Still other embodiments use a different type rapid on-off valve, rather than a solenoid valve. Similarly, though threaded connectors are shown with the water inlets and outlets, other sealable connections may be used.

Figure 4A:
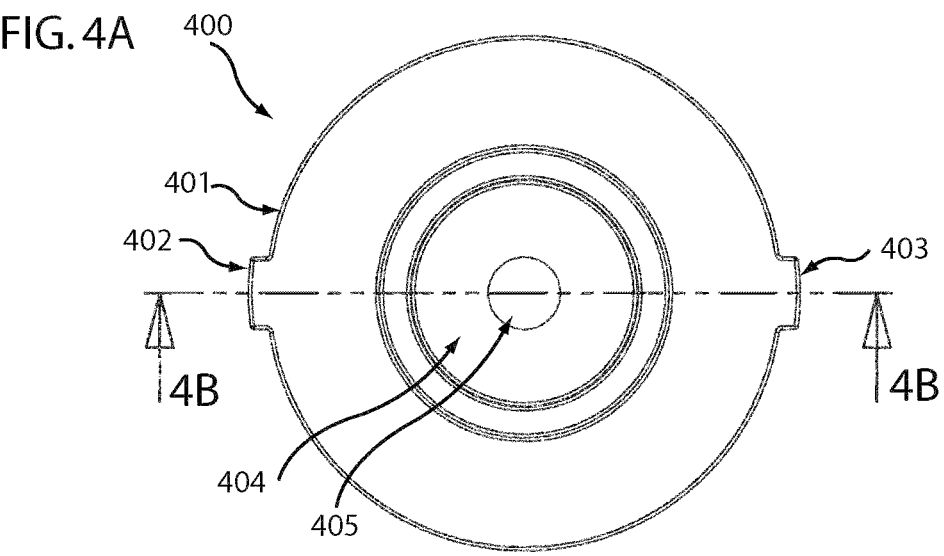
FIG. 4A illustrates a top view of one embodiment of a control valve cartridge assembly.

FIG. 4A illustrates a top view of one embodiment of a cartridge assembly (400), such as a water temperature cartridge assembly or flow cartridge assembly. The cartridge assembly may be of the type used in FIG. 3, including elements 311-316. In the illustrated embodiment, two locking bracket (402 and 403) are attached to the cartridge disk (401). The cartridge shaft (404) and the motor gear shaft hole (405) that connect the motor gear assembly are also shown. In another embodiment, securing elements other than mounting brackets are used. For example, bolts or adhesive may be used.

Figure 4B:
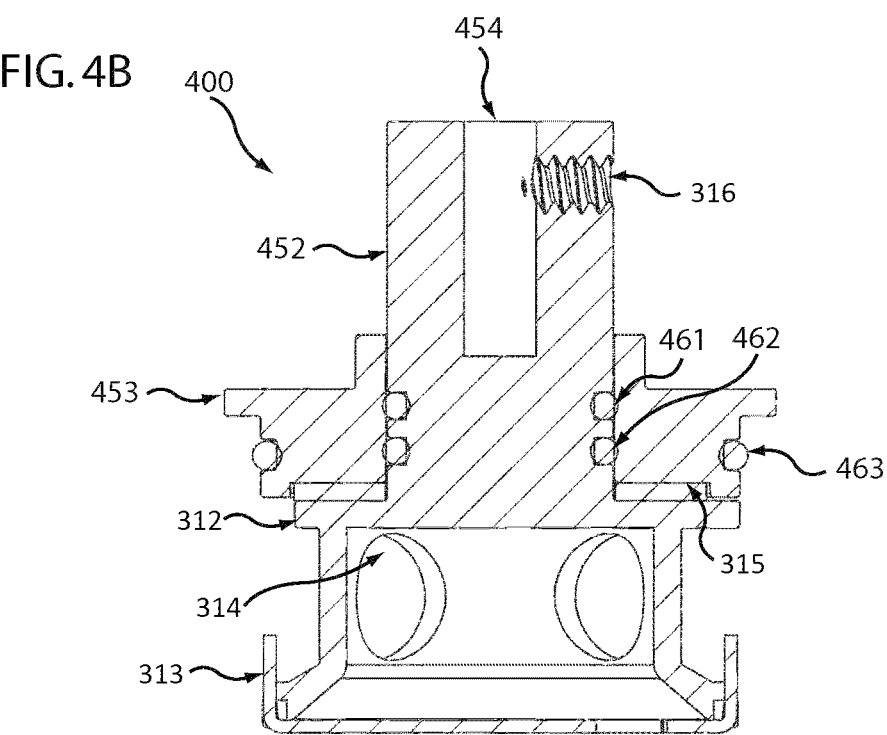
FIG. 4B illustrates a cross-sectional side view of the control valve cartridge assembly of FIG. 4A taken along the line 4B-4B.

FIG. 4B illustrates a side section view of the water control cartridge assembly (400) embodiment shown in FIG. 4A. The water control cartridge (400) includes a cartridge body (451) with cartridge shaft (452), a cartridge housing (453) and a control module disk (313). The control module disk (313) controls water flow through the cartridge chamber (314) and also the water flow that exits the control valve. O-rings (461 and 462) seal water leakage between the cartridge shaft (454) and cartridge housing (453). O-ring (463) seals leakage from the cartridge housing (453) and water control valve housing (e.g., 311 or 321). In some embodiments, O-rings are not present and another sealing element may be used. In the illustrated embodiment, a gasket (315) reduces the friction between the lower portion (312) of cartridge shaft (452) and cartridge housing (453) for smooth operation. A thread hole (316) on the cartridge shaft (452) secures the motor gear shaft in the motor gear shaft hole (454).

Figure 6:
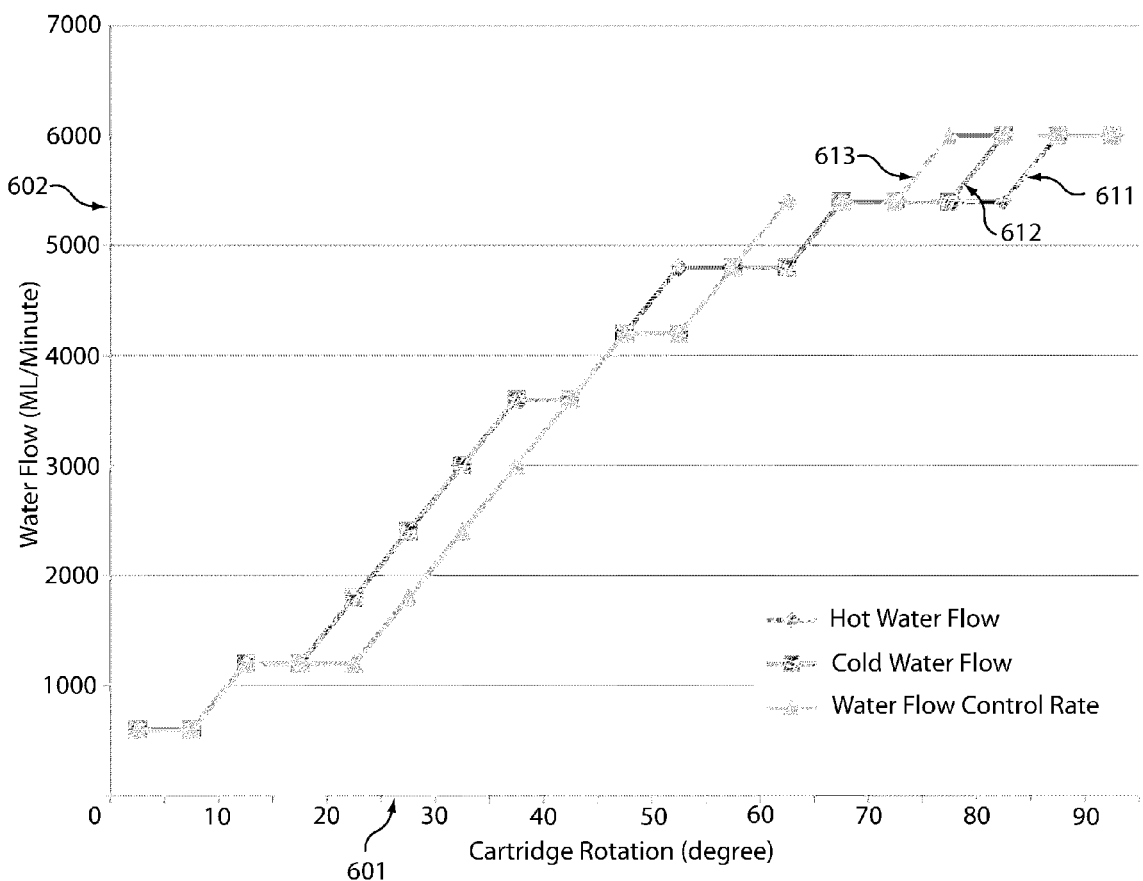
FIG. 6 is an exemplary graph illustrating the water flow pattern of a control valve cartridge assembly, showing water flow rate as a function of cartridge rotation.

FIG. 5A illustrates one example of a water temperature control module assembly, such as the control module in the cartridge assembly of the embodiment shown in FIG. 3. The water temperature control module assembly (500) includes a control disk (313) attached with two locking clips (502 and 503) to lock onto the water temperature control cartridge (312) in FIG. 3B. The water temperature control module assembly (500) also includes two sets of bushings (510 and 512) and holding springs (511 and 513) mounted on the control valve body (311) of the water temperature control valve (302) as shown in FIG. 3B. The illustrated example includes a spring (366) set into the bushing (367). The spring (366) may push the bushing (367) against the control disk (313) of the cold water control disk opening (504) on the control disk (313), which may control the flow of cold water into the cartridge chamber (314) of FIG. 3B. Cold water flows (521) from the inner opening of one of the bushings (367) through the cold water control disk opening (504) of the control disk (313) into the cartridge chamber (314) of FIG. 3B. Hot water flows (522) from the opening of another bushing (377) which may be pushed by the spring (376) against the hot water control disk opening (505) on the control disk (313) into the cartridge chamber (314) of FIG. 3B. The hot water is mixed with the controlled cold flow in the chamber (314). The ratio of cold and hot water flow is controlled by the rotation angle of the control cartridge and the shape formed by the intersection of the control disk openings (504) on the control disk (313) with the opening of bushings (510 and 512). In one example, the shape of disk openings (504 and 505) on the control disk (313) provide a substantially linear pattern of cold and hot water flow change, individually, as the control cartridge rotation angle changes. FIG. 6 illustrates one example of varying hot water flow and cold water flow rates as functions of cartridge rotation. In certain embodiments, the control module disk (313) is constructed of one or more of metal, plastic, ceramic material, and/or some other material(s). In other embodiments, a faucet uses a water mixing mechanic other than a rotating control disc in order to control the ratio of hot water and cold water that are mixed.

FIG. 5B illustrates an embodiment of the water flow control module assembly in the cartridge assembly of the embodiment shown in FIG. 3. The water flow control module (550) includes a control disk (323) attached with two locking clips (552 and 553) which may lock onto the water flow control cartridge (322) in FIG. 3B, a bushing (319), and a holding springs (318) mounted onto the water control valve body (321) of the water flow control valve (132) as shown in FIG. 3B. The spring (318) is set into the bushing (319) which may cause it to push the bushing (319) against the control disk (323) of the water flow control disk opening (554) on the control disk (323). In the present embodiment, this alters the rate of water flow into the cartridge chamber (324) of FIG. 3B. Water from the water temperature control valve flows (561) from the opening of one bushing (319) through the water flow control disk opening (554) of the flow control disk (323). By affecting the flow rate of that water, the faucet apparatus adjusts the water flow rate and output to the temperature detection chamber. In one example, the shape of the control disk opening (554) on the control disk (323) may provide for a near linear flow pattern, such as the pattern illustrated in FIG. 6. The flow rate of the mixed water flowing from the mixing chamber is affected by the rotation angle of the control cartridge, the shape and placement of the control disk opening (554) on the control disk (323) and the opening of the bushing (319). In certain embodiments, the control module disks may be constructed of one or more of metal, plastic, ceramic material, and/or some other material(s).

FIG. 6 illustrates one example of a graph representing water flow rates for an embodiment of the water temperature control valve assembly of the embodiment shown in FIG. 5A. The X-axis (601) represents the rotational angle of the control cartridge in degrees. The Y-axis (602) represents the water flow rate in milliliters per minute. Water flow rate is shown for: hot water flow, cold water flow, and water flow control rate for the resulting, mixed water. The flow curve (612) represents the cold water flow rate when the hot water supply is shut off. The flow curve (611) represents the hot water flow pattern when the cold water supply is shut off. The flow curve (613) represents the flow rate for the mixed water flow of both hot and cold water. All three of the cold water flow curve (612), the hot water flow curve (611) and the mixed water flow curve (613) shown in the FIG. 6 are substantially linear. This may allow a logic processor, such as logic processor (105) of FIG. 1 to cause substantially linear changes in water flow rate by sending signals instructing for the performance of substantially linear changes in cartridge rotation angle.

Referring to FIG. 3B, in the illustrated embodiment, a check valve (363) is installed before the cold water inlet (365) and another check valve (375) is installed before the hot water inlet (112) of the control valve (311) to prevent backflow to the cold or hot water supply inlet. A water flow control valve (132) is downstream of the water temperature control valve; as a result, it is not necessary to shut off both the cold and hot water at same time. Although the X-axis in FIG. 6 shows a maximum rotation angle of about 90 degrees, in certain embodiments, other maximum rotation angles may be used. For example, the shape and size of the cold and hot control disk openings (504 and 505) of the control disk (313) can be designed for an angle of about 150 degrees or more according to the diameter of control disk and the opening size of bushings. Embodiments with larger rotation angles may still provide substantially linear flow response. For example, a rotation angle between about 110 and about 135 degrees may provide for water-flow response that is both. The control of the angle may be accomplished by step motor as shown in the illustrated embodiment. The water flow control disk opening (554) of water flow control disk (323) as shown in FIG. 5B also can be shaped to obtain a substantially linear flow pattern similar to the FIG. 6 with a maximum rotation angle of about 270 degrees or greater. For example, a maximum rotation angle of about 180 degrees may provide accurate and fast response for program control by the logic processor (105) in the illustrated embodiment.

Figure 7A:
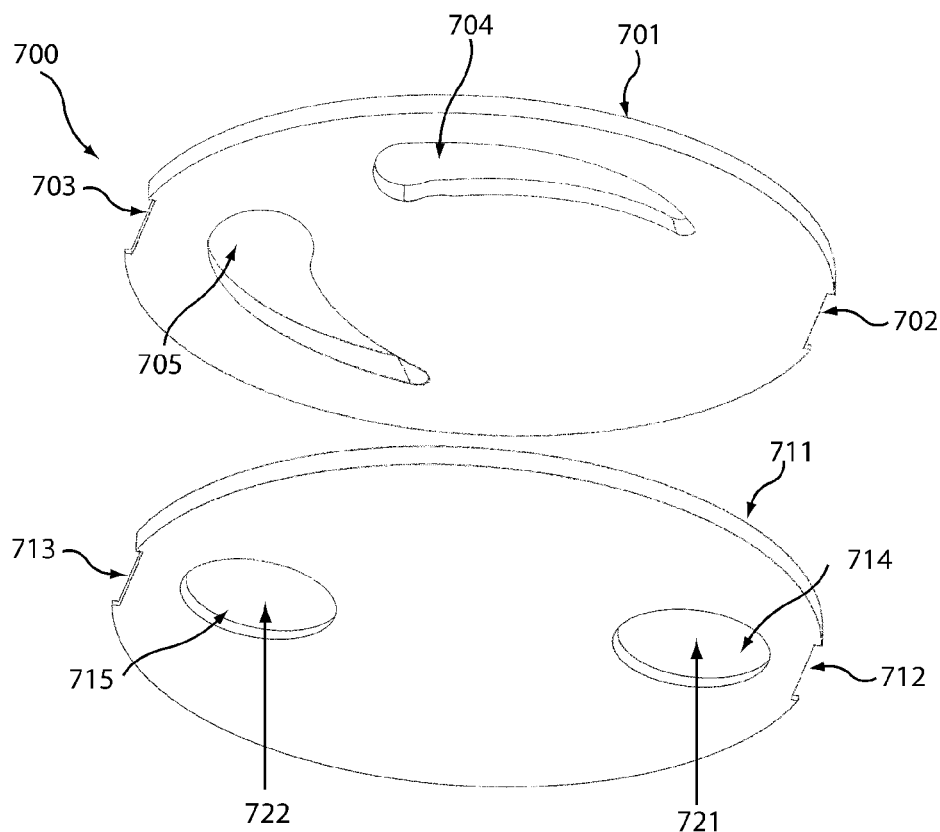
FIG. 7A illustrates an embodiment of a water-temperature control module of a control cartridge.

FIG. 7A illustrates another embodiment of a water temperature control module of the control cartridge assembly shown in FIG. 3B. The water temperature control module (700) includes a top control disk (701) and a bottom control disk (711). The top control disk has fastening elements (702 and 703) for use in mounting on the rotation cartridge (312) as shown in FIG. 3B. In the illustrated embodiment, the fastening elements are indentations; in other embodiments, clips and/or other fastening elements may be used. The illustrated embodiment also includes a cold water control disk opening (704) and a hot water control disk opening (705). The bottom control disk (711) also has fastening elements (712 and 713) for use in mounting on the water temperature control valve body (311) of the water flow control valve (132) as shown in FIG. 3B, a cold water disk opening (714), and hot water disk opening (715). The incoming cold water flows (721) from the bottom of the control disk (711) through the cold water control disk opening (704) of top control disk (701) into the cartridge mixing chamber (312) of the water temperature control valve (202) as shown in FIG. 3B. The incoming hot water flows (722) from bottom of the control disk (711) through the hot water control disk opening (705) of top control disk (701) and is mixed with the cold water in the cartridge mixing chamber (312) of the water temperature control valve (202) as shown in FIG. 3B. The illustrated embodiment includes a gasket which may seal the gap between the bottom control disk (711) and control valve body (311) to prevent or reduce water leakage into the chamber through some path other than through the control disk openings (714 and 715). In another embodiment, a sealing element other than a gasket, such as packing, is used. In certain embodiments, the control module disks (701 and 711) are constructed of one or more of metal, plastic, ceramic material, and/or some other material(s).

Figure 7B:
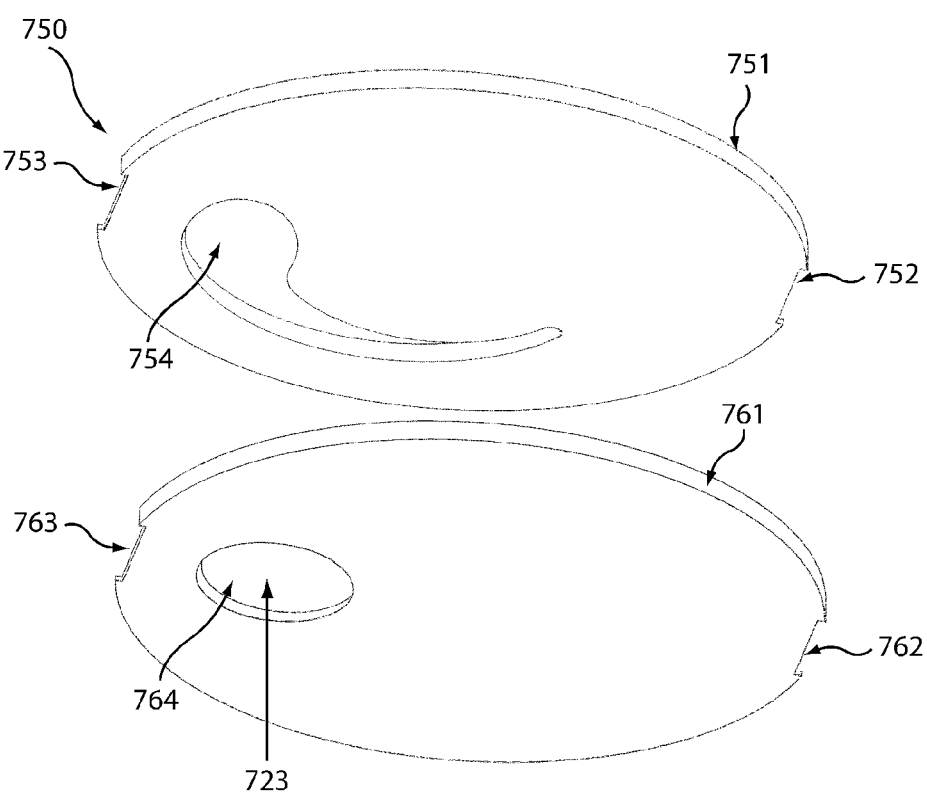
FIG. 7B illustrates an embodiment of a water-flow control module of a control cartridge assembly.

FIG. 7B illustrates another embodiment of a water flow control module of the control cartridge assembly shown in FIG. 3B. The water flow control module (750) includes a top control disk (751) and a bottom control disk (761). The top control disk has fastening elements (752 and 753) for use in mounting on the rotation cartridge (322) as shown in FIG. 3B. In the illustrated embodiment, the fastening elements are indentations; in other embodiments, clips and/or other fastening elements may be used. The illustrated embodiment also includes a water flow control disk opening (754). The bottom control disk (761) also has fastening elements (762 and 763) for use in mounting on the water flow control valve body (321) of water flow control valve (132) as shown in FIG. 3B and a water flow disk opening (754). The incoming mixed water flows (764, 723) from the bottom of the control disk (761) through the water flow control disk open (754) of the top control disk (751) into the cartridge chamber (322) of the water flow control valve (132) as shown in FIG. 3B and then flows to the temperature detection chamber (327) as shown in FIG. 3B. The illustrated embodiment includes a gasket which may seal the gap between the bottom control disk (761) and water flow control valve body (321) to prevent or reduce water leakage into the chamber through some path other than through the control disk openings (764 and 754). In certain embodiments, the control module disks (751 and 761) are constructed of one or more of metal, plastic, ceramic material, and/or some other material(s).

Figure 7C:
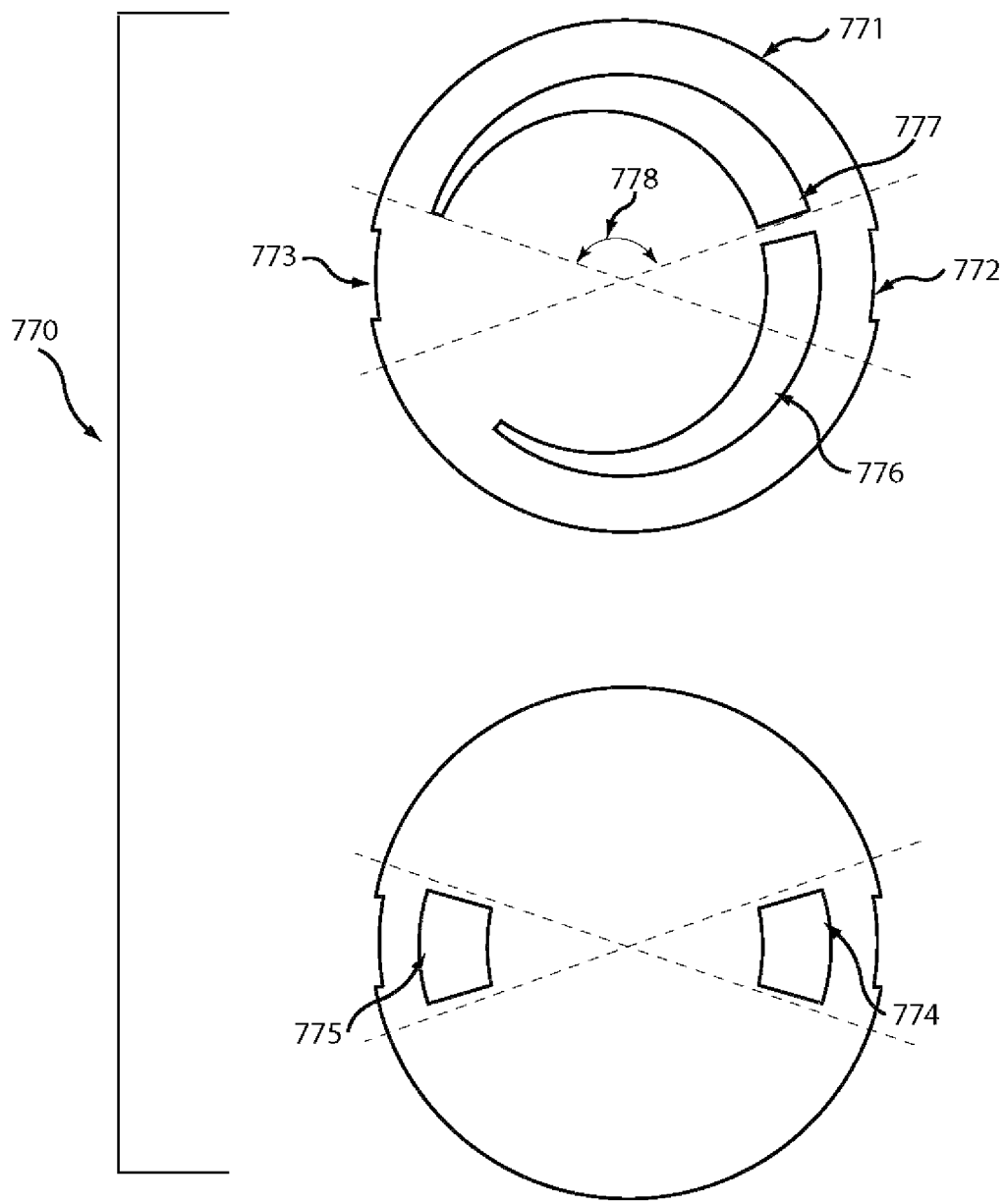
FIG. 7C illustrates another embodiment of a water-temperature control module.

FIG. 7C illustrates another embodiment of a module disk assembly 770 of the water temperature control module shown in FIG. 3B. The top control module disk (771) includes fastening elements for use in mounting on the water temperature control valve body (311) of water temperature control valve (202) as shown in FIG. 3B. In the illustrated embodiment, the fastening elements are indentations (772 and 773); in other embodiments, clips and/or other fastening elements may be used. The illustrated embodiment also includes a cold water control disk opening (776) and a hot water control disk opening (777). The generally trapezoidal shape of the openings of the present embodiment couple with the openings (774 and 775) of the bottom control module disk to enable the water flow in a substantially linear pattern. This may enable the logic processor (105) programming to produce substantially linear changes in flow characteristic in response to substantially linear changes in disk rotation. The combination of the top and bottom control module disk with the trapezoidal shape design can extend the disk rotation angle 778 to approximately 150 degrees for better water temperature control. In certain embodiments, both of the control module disks are constructed of one or more of metal, plastic, ceramic material, and/or some other material(s). The generally trapezoidal shape of the openings of the disk design can be applied on the other flow control disks also disclosed herein.

Figure 8:
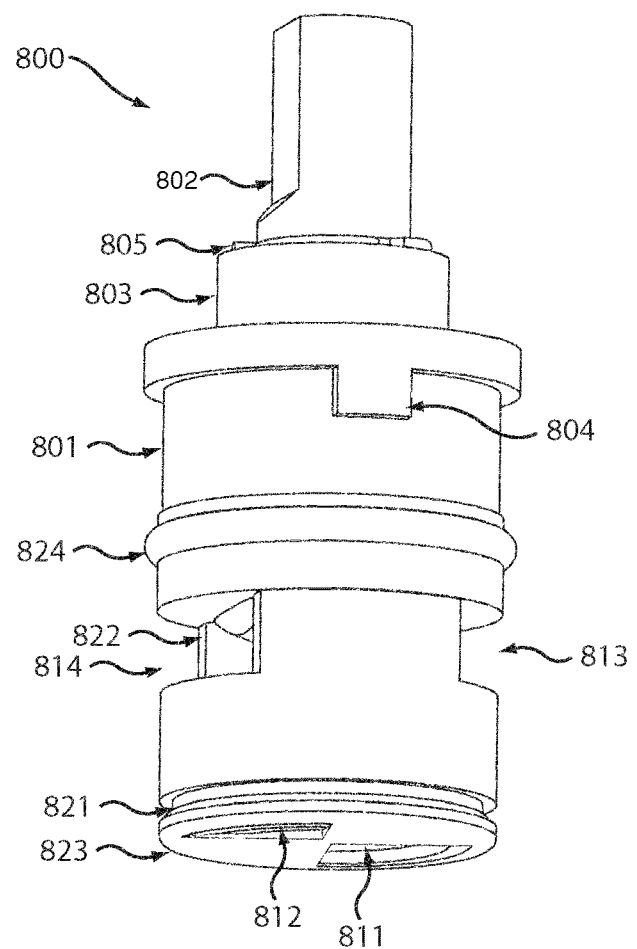
FIG. 8 illustrates an embodiment of a water control cartridge assembly.

FIG. 8 illustrates an embodiment of a water control cartridge assembly 800 of the water control cartridge assembly shown in FIG. 3B. The water control cartridge includes a cartridge body (801) with a shaft (802), a cartridge housing (803) with a locking clip (804), an O-ring (824) to seal the cartridge, a control module includes a top control module disk (824), a bottom module disk (821) and a bottom seal gasket (823). Water flows into the bottom of the gasket openings (811 and 812) through the opening of bottom module disk (821) and through the opening of the top module disk (822), thereby providing control the water flow and flow out of the cartridge chamber (813 and 814). In some embodiments, a C-clip (805) holds the cartridge shaft (802) on the cartridge housing (803). A cut on the cartridge shaft (802) is also shown. The water control cartridge can be designed for either water temperature control to mix cold/hot water or to control the water flow rate according to the design of control module opening of the top control module disk (822) and bottom control module disk (821).

Figure 9A:
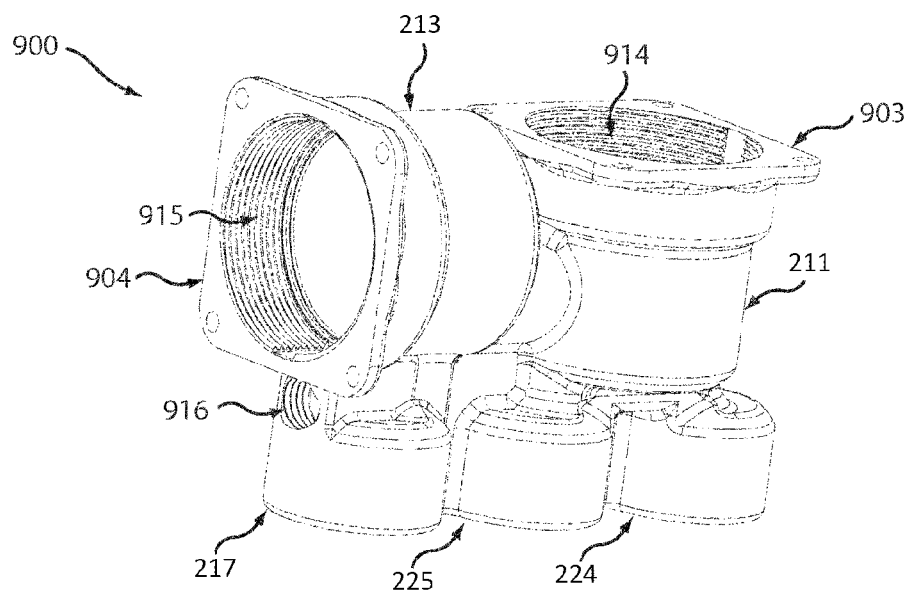
FIG. 9A illustrates an embodiment of a control valve assembly with open sockets for water control cartridge assemblies.

FIG. 9A illustrates an embodiment of the water control valve body assembly (900). The water control valve body (900) includes cold water inlet connector (224), a hot water inlet connector (225), a water temperature control valve (211) with a water temperature control cartridge housing (914), a water flow control valve (213) with a flow control cartridge housing (915), a water temperature detection housing (916) and a water outlet connector (217). The water control valve body (900) also includes a water temperature motor control gear assembly bracket (903) and water flow motor control gear assembly bracket (904).

Figure 9B:
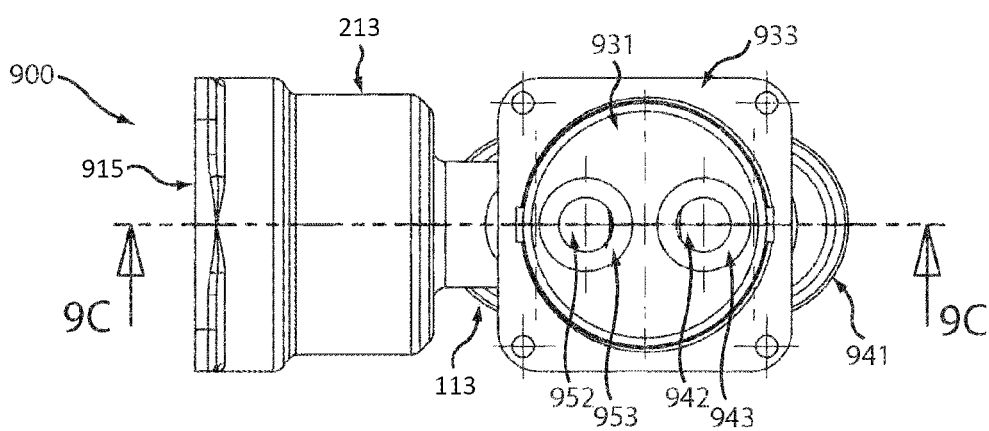
FIG. 9B illustrates a top view of the control valve assembly of FIG. 9A.

FIG. 9B illustrates a top view of one embodiment of a water control valve body assembly. The water control valve body assembly includes a water temperature control valve housing (931), a water flow control valve housing (213), a water temperature motor and gear control assembly bracket (933), a water flow motor and gear control assembly bracket (915), a cold water inlet connector (941) and a hot water inlet connector (113). A cold water inlet channel (942) with a bushing housing (943), and a hot water inlet channel (952) with a bushing housing (953) are also shown.

Figure 9C:
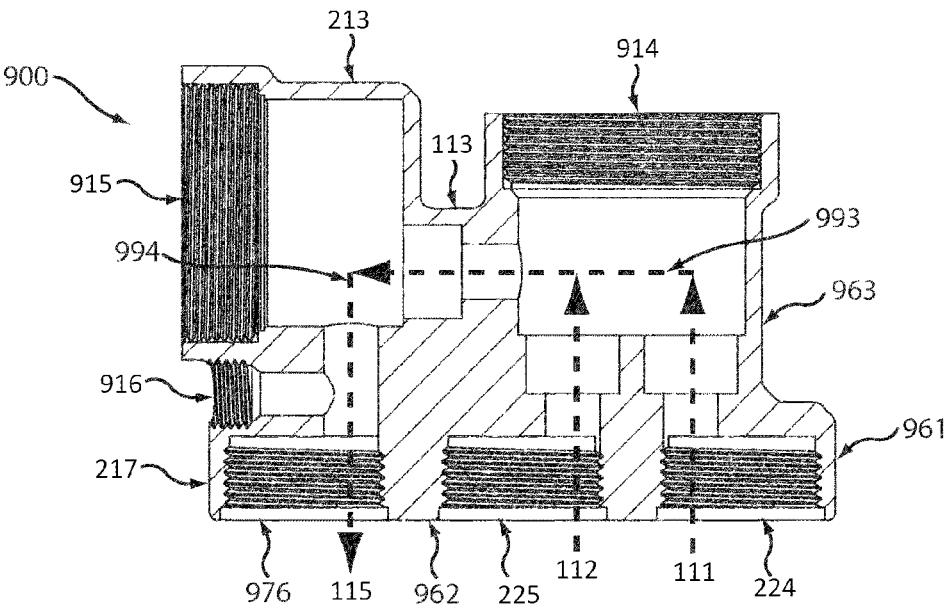
FIG. 9C illustrates a cross-sectional side view of the control valve assembly of FIG. 9A taken along the line 9C-9C.

FIG. 9C illustrates a side view of one embodiment of a water control valve body assembly. The water control valve body assembly includes a cold water inlet connector (961) with a cold water inlet housing (224), a hot water inlet connector (962) with a hot water inlet housing (225), a water temperature control valve housing (963) with a water temperature control cartridge housing (914), a cold/hot mixed water channel (113), a water flow control valve housing (213) with a water flow control cartridge housing (915), a thermocouple housing (916) and a water outlet connector (217) with a water outlet housing (976). Cold water enters (111) from the cold water connector (961) into the mixing chamber (993) where it mixes with hot water that enters (112) from the hot water connector (962) into the mixing chamber (993). The mixed water flows through the connecting channel (113) to the water flow control valve housing (213). The mixed water is adjusted by the water flow control cartridge and flows through the thermocouple housing (916) then flows out (115) to the water outlet connector (217). In certain embodiments, the water flow control valve (213) is designed to have an angle of at least about 90 degrees to the water temperature control valve (963). For example, this arrangement may provide for a short path that will reduce the delay of water temperature response to logic processor control. In some embodiments, the connecting channel (113) is shorter than the internal diameter of the cold water inlet housing (225). In some embodiments, the distance between the water temperature control housing and the water flow control valve is less than the internal diameter of the water temperature control housing. In some embodiments, the inlets and outlets of the assembly 900 are arranged generally parallel to reduce the turbulence and facilitate movement through the assembly while keeping the overall size of the assembly small and efficiently manufactured. Thus, in some embodiments the general fluid path 994 through the assembly 900 will make a first approximately 90 degree turn from the inlet portion and mixing chamber toward the flow control housing through the connecting channel. The general fluid path 994 then makes a second approximately 90 degree turn to head toward the fluid outlet.

Figure 11A:
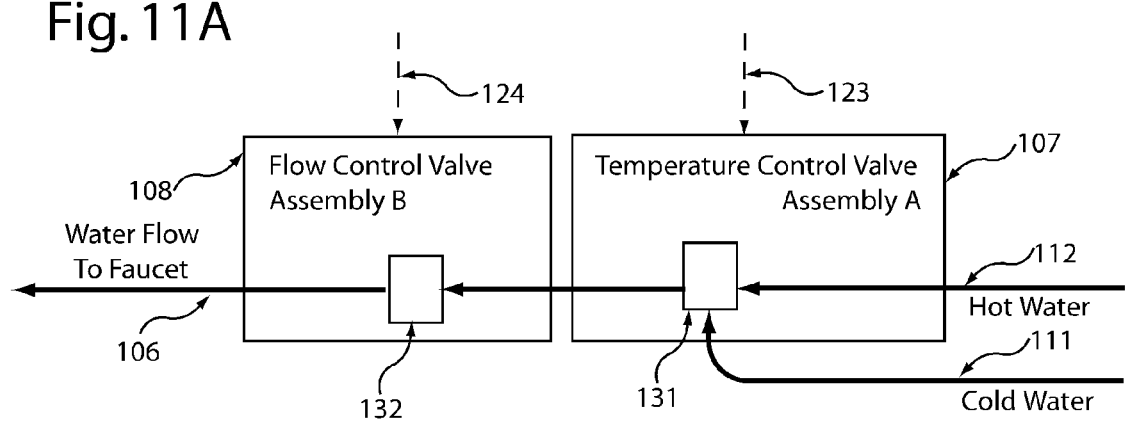
FIG. 11A depicts an embodiment of a control valve assembly comprising a flow control valve assembly and a temperature control valve assembly.

In some embodiments, an efficient layout of the control valve assembly may be used with more or less combinations of the various components disclosed herein. For example, FIG. 11A schematically illustrates a control valve assembly having hot water inlet (112) and cold water inlet (114) directing fluid flow into temperature control valve assembly (107) which includes a mixing valve assembly (131) which can adjust the temperature of the water by adjusting the ratio of the hot and cold water permitted to pass through. In some embodiments, mixing valve assembly (131) can utilize a mechanical valve or other valve. For example, the water temperature control valve assembly A (107) comprises a three-way motorized gear valve (131) to adjust the cold/hot water flow ratio from the cold water inlet (111) and the hot water inlet (112) according to the input signal (123) from the output of logic processor (105). The adjusted water can then flow into flow control assembly (108) which can include a valve assembly (132) that can be used to toggle the fluid flow on and off through the control valve assembly (106). In some embodiments, valve assembly (132) can adjust for both flow volume as well as to turn the flow substantially on or off. In some embodiments, mixing valve assembly (131) can utilize a mechanical valve or other valve. For example, the flow control valve assembly B (108) comprises a motorized gear valve (132). The motorized gear valve (132) adjusts the water flow (106) to spout (101) according to the signal input (124).

Figure 11B:
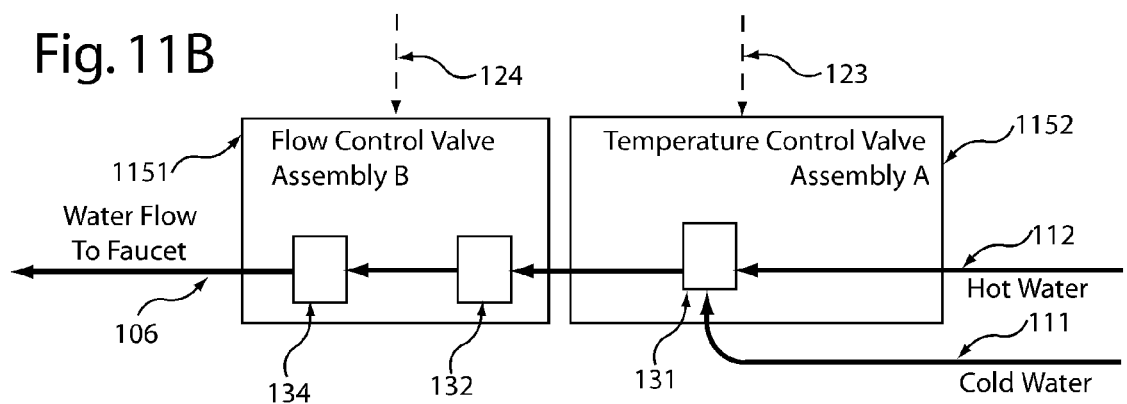
FIG. 11B depicts an embodiment of a control valve assembly comprising a flow control valve assembly and a temperature control valve assembly.

FIG. 11B illustrates an embodiment of the invention of the water temperature control valve assembly B (1152) and flow control valve assembly A (1151). The temperature control valve assembly B (1152) comprises a three-way motorized gear valve (131) to adjust the cold/hot water flow ratio from the cold water inlet (111) and the hot water inlet (112) according to the input signal (123) from the output of logic processor (105). The flow control valve assembly B (1151) comprises a motorized gear valve (132) and a solenoid valve (134). The motorized gear valve (132) adjusts the water flow according to the signal input (124). The solenoid valve (134) receives a signal (124) from the logic processor (105) to toggle on/off the valve (134) to start/stop water flow (106) to the faucet spout (101). Though described as a solenoid valve, valve (134) may be any valve capable of rapid response to input signals.

Figure 12A:
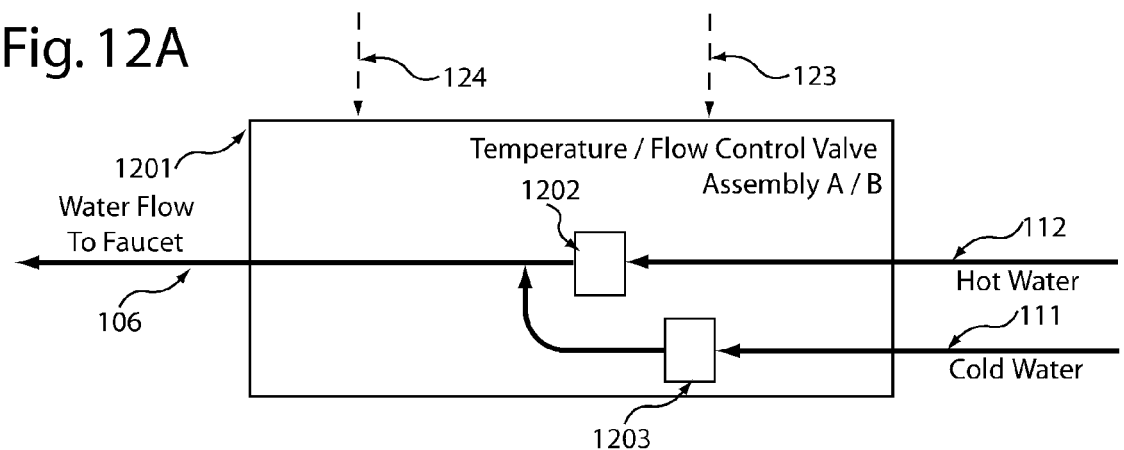
FIG. 12A depicts an embodiment of a control valve assembly comprising a merged flow control valve assembly and temperature control valve assembly.

FIG. 12A illustrates another water temperature and flow control valve assembly A/B (1201) according to some embodiments. The temperature/flow control valve assembly A/B (1201) comprises two two-way motorized gear valves (1202) (1203) to toggle on/off, and to adjust the cold/hot water flow ratio from the cold water inlet (111) and the hot water inlet (112) according to the input signal (123 and 124) from the output of logic the processor (105).

Figure 12B:
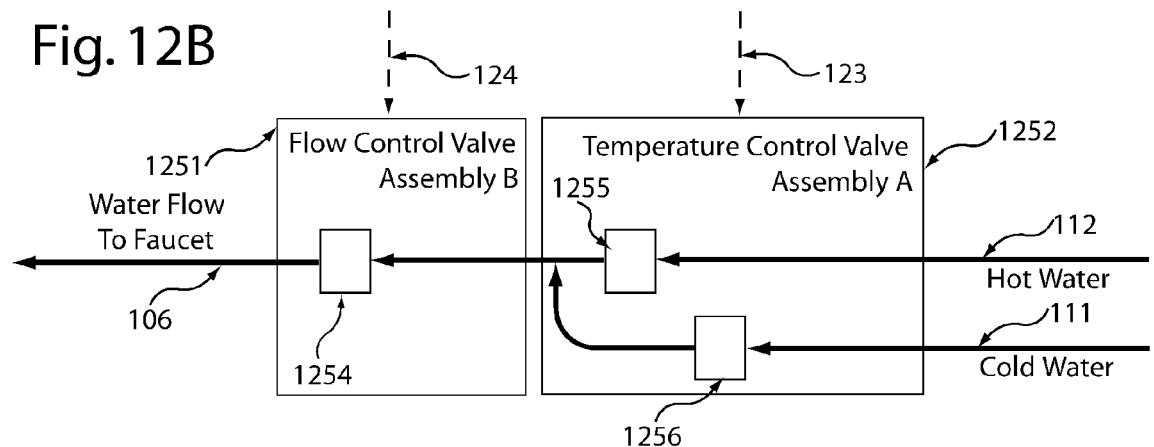
FIG. 12B depicts an embodiment of a control valve assembly comprising a merged flow control valve assembly and temperature control valve assembly.

FIG. 12B illustrates a combined water temperature/flow control valve assembly A (1252) and water on/off flow control valve assembly B (1251) according to some embodiments. The temperature/flow control valve assembly A (1252) comprises two motorized gear valves (1255) and (1256) to adjust the cold/hot water flow ratio from the cold water inlet (111) and the hot water inlet (112) respectively, according to the input signal (123) from the output of logic processor (105). The solenoid valve (1254) of flow control valve assembly (1251) receives a signal (124) from the logic processor (105) to toggle on/off the valve (1254) to start/stop water flow to faucet spout.

Figure 13:
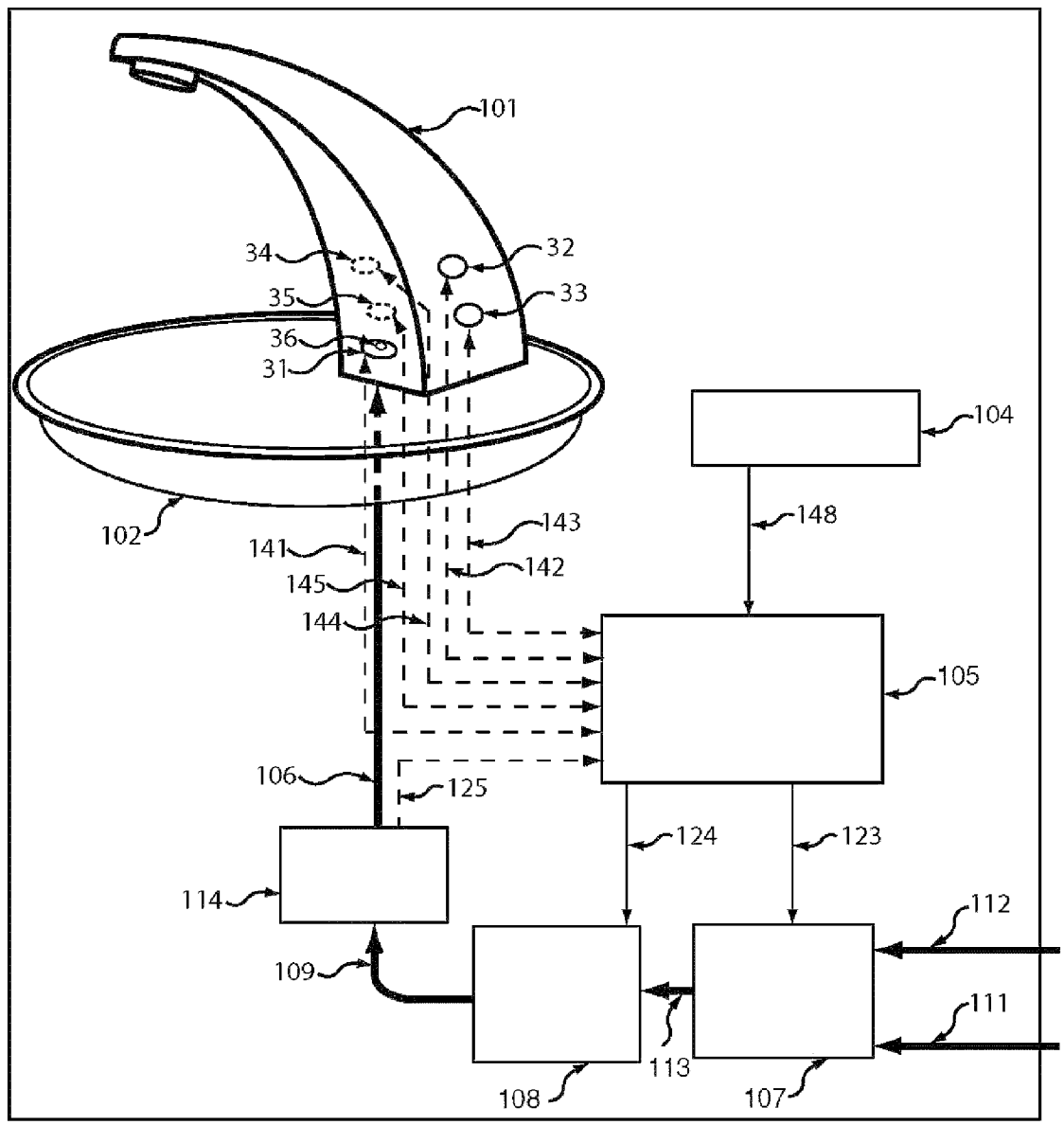
FIG. 13 depicts an embodiment of a touch-free faucet assembly, including a logic processor circuit board, a water flow control assembly and a water temperature control assembly.

Referring to FIG. 13, there is illustrated an example of a faucet apparatus with sensors (31-35) for touch-free control. Due to differences in materials, programming, valves, and other elements, the structure of FIG. 13 may encompass multiple embodiments. For convenience, when discussing these embodiments, the primary sensor (31) will be referred to as "Sensor C" while the other illustrated sensors will be referred to as "Sensor A" (32), "Sensor B" (33), "Sensor D" (34) and "Sensor E" (35). Various of the embodiments described with reference to these sensors by letter may include fewer, or more than five sensors. In the illustrated configuration, Sensor C (31) is forward facing, while Sensors A, B, D, and E are side-facing (32-35). In other embodiments, some or all of these sensors may face alternative directions. For example, one or more sensors may face upward. In addition, in some embodiments, one or more of the sensors may be fixed relative to each other while one or more may be able to move relative to others of the sensors.

Some embodiments provide a touch-free automatic faucet. The faucet may include a faucet housing including a plurality of sensors for controlling water flow and water temperature. A processor is connected to the sensors. A first control valve assembly is connected to the processor. A second control valve assembly is connected to the processor. A power source is connected to the processor, the first control valve assembly and the second control valve assembly. Water flow and water temperature are controlled by the sensors without touching of the faucet housing.

Another embodiment provides a touch-free automatic faucet. The touch-free automatic faucet may include sensors for controlling water temperature. A processor is coupled to the sensors. A voltage source is coupled to the processor. A temperature control valve assembly is coupled to the processor. The processor controls water flow and temperature of water exiting the touch-free automatic faucet.

Yet another embodiment provides a faucet. The faucet includes a plurality of sensors including: a main faucet control sensor, a primary and secondary temperature control sensor, and a primary and secondary water flow control sensors. A processor is coupled to the plurality of sensors. A water flow control valve assembly is coupled to the processor. A temperature control valve assembly is also coupled to the processor. A power supply is coupled to the processor and is configured to control water flow through the water flow control valve assembly and to control water temperature through the temperature control valve assembly.

Still another embodiment provides a faucet housing including a plurality of sensor windows. A plurality of sensor assemblies are removably coupled to the faucet housing. A shaft is at least partially disposed within the faucet housing and coupled with a securing nut. The securing nut is configured to hold the sensor assemblies within the faucet housing, and for aligning the plurality sensor assemblies with the plurality of sensor windows.

Some embodiments include a touch-free automatic faucet system comprising a touch-free automatic faucet mode; wherein water flow and water temperature are controlled by a flow control valve assembly and a temperature control valve assembly in response to the electronic sensors through a logic processor circuit board. The faucet can be operated, for example, in either automatic mode or manual mode.

In some embodiments, the faucet apparatus may include a plurality of sensors. These sensors can include a primary electronic sensor (Sensor C) that may cause the faucet spout to flow water (Primary-water-flow-mode) so long as an object is detected by that sensor. For example, the primary sensor (Sensor C) may be located facing a sink basin so that it sends a signal when a user's hands are detected in the sink basin. A logic processor may receive the signal and cause the faucet to pour water into the sink. The embodiment may also include a pair of secondary sensors (Sensor A and Sensor B) and a pair of tertiary sensors (Sensor D and Sensor E), any or all of which may be pointed in different directions than the sink. For example, the secondary and tertiary sensors may be pointed at about 90 degree angles from each other to reduce interference. The secondary and tertiary sensors may provide for touch-free control of the following exemplary functions: water temperature control (Temperature-control-mode), continuous water flow control (Continue-water-flow-mode), faucet pause control (Faucet-pause-mode), water flow adjustment control (Water-flow-control-mode), default setting control (Common-default-mode) and user defined preset(s) (Save-preset-mode). One or more of these functions may provide for convenient operation, water conservation and personal hygiene protection. For example, the system may maintain an electronic representation of a flow state, such as by maintaining a data object or data structure in some memory, such as Random Access Memory, flash memory, a hard disk, or some other memory storage medium. The system may determine the state of the flow state by querying this electronic representation in memory.

In certain embodiment, one of the secondary sensor provides a timer function (Timer-mode) which can set the timer for use with the user-control of the faucet spout water flow. In one such embodiment, the tertiary sensor may provide a program function (User-defined-program-mode) for receiving user-provided logic processor parameter(s) and/or function(s).

Some embodiments include a programmed logic processor with a circuit board that receives input from the sensors and, in response thereto, controls the behavior of, a water flow control valve assembly and a temperature control valve assembly. For example, upon the detection of an object in presence within the detection zone of the primary sensor (Sensor C), the logic processor may activate the flow control valve assembly (Valve B) for water flow to the faucet spout (activation of Primary-water-flow-mode). This embodiment may be used, for example, as a sink faucet.

In some embodiments, upon activation of Primary-water-flow-mode, the water flow control valve assembly (Valve B) is in an activated position for water flow, and when the primary sensor (Sensor C) senses that no object is present within the corresponding detection zone (for example, in a sink), the logic processor deactivates the water flow control valve assembly (Valve B) to stop water flow to the faucet spout (deactivation of flow during Primary-water-flow-mode).

In one or more embodiments, should both secondary sensors (Sensor A and Sensor B) sense the presence of an object (for example, a hand) within the corresponding detection zone(s) for a predetermined time period (Time Continue-flow-on), the logic processor activates the water flow control valve assembly (Valve B) for a continuous water flow (Continuous-water-flow-mode), during which the faucet pours water from the spout regardless of whether an object is detected by the primary sensor or not. Continuous water flow may occur until the faucet receives input from a user instructing for a stop of the continuous water flow, or for a predetermined period of time, or for a calculated period of time, or some combination thereof, or whichever occurs first. This Continuous-water-flow-mode operation may be convenient for a user who wishes to fill a sink or container without keeping his hands within the detection zone of the primary sensor (Sensor C) in order to obtain continuous water flow. In another embodiment, the system detects the presence of an object using one or more sensors while the faucet is providing continuous water flow, and increases the time for the continuous water flow in response to the detection. This may allow a user to increment the continuous flow time without interrupting the flowing water. The amount of time that the system increments may be a fixed amount, a function of the time that the object was detected, or some other amount of time.

In some embodiments, the water flow control valve assembly (Valve B) is activated for water flow to the faucet spout. Sensor A of the secondary sensors detects the presence of an object (for example, a finger) within the detection zone. The logic processor increases the faucet water flow temperature by increasing hot water flow and/or decreasing cold water flow of the temperature control valve assembly (Valve A) accordingly depending on the sensing time period of sensor (Sensor A). Sensor B of secondary sensors senses the presence of an object (for example, a finger) within the detection zone. The logic processor decreases the faucet water flow temperature by decreasing hot water flow and/or increasing cold water flow of the temperature control valves assembly (Valve A) accordingly depending on the sensing time period of sensor (Sensor B). In some embodiments, faucet water flow temperature is controlled by the function of the pair of secondary sensors (Sensor A and Sensor B) without requiring a user to touch any part of the faucet body (touch-free Temperature-control-mode).

In one or more embodiments, the water flow control valve assembly (Valve B) enters an activated position for water flow when Sensor D of the tertiary sensors senses the presence of an object (for example, a finger) within the detection zone. The logic processor increases the water flow to the faucet spout by increasing both hot and cold water flow of the water flow control valve assembly (Valve B). The amount of increase may correspond to the sensing time period of Sensor D—that is, the amount of time during which Sensor D detected an object substantially uninterrupted in the corresponding sensing zone. When sensor E of the tertiary sensors senses the presence of an object (for example, a finger) within the detection zone, the logic processor decreases the water flow to the faucet spout by decreasing both hot and cold water flow of the water flow control valves assembly (Valve B). The amount of decrease may correspond to the sensing time period of Sensor E. In these embodiments, faucet water flow may be adjusted by the function of the pair of tertiary sensors (Sensor D and Sensor E) without any touching of any part(s) of the faucet. In other embodiments, a combination of touch-free and touch controls are provided. For example, the faucet may include sensors for touch-free control, and a faucet lever for touch control.

In some embodiments, in the Continue-Water-flow-mode, the water flow control valve assembly (Valve B) is activated for water flow. In this mode, both of the secondary sensors (Sensor A and Sensor B) sense the presence of an object (for example, a hand) within the detection zone for a predetermined time period (Time Continuous-flow-off). The logic processor deactivates the water flow control valve assembly (Valve B) to stop continuous water flow (Continuous-water-flow-mode) to the faucet spout (deactivation of Continuous-water-flow-mode) upon the sensors not sensing the presence of an object.

In one or more embodiments, the faucet includes a stand-by condition in which the primary sensor (Sensor C) does not sense an object's presence within the detection zone and the flow control valve assembly (Valve B) is in a deactivation condition. In the stand-by mode, no water flows from the faucet spout. Detection of an object (for example, a hand or finger) within the detection zone of Sensor A of the secondary sensors for a predetermined time period (Time Sc-pause) triggers the logic processor to pause the function of the primary sensor (Sensor C) referred as "Faucet-pause-mode." In this Faucet-pause-mode, a user can work within the primary sensor detection zone without activating faucet water flow for water conservation (beginning of Faucet-pause-mode).

In some embodiments, in the Faucet-Pause-Mode, the primary sensor (Sensor C) is paused—that is, the faucet behavior is not affected by the presence of an object in the Sensor C detection area. Sensor A of the secondary sensors detects an object (for example, a hand or finger) within the detection zone for a predetermined time period (Time Sc-reset), which triggers the logic processor to reset the function of primary sensor (Sensor C). The faucet system may then reset back to the stand-by condition (reset of Faucet-pause-mode).

In some embodiments, a primary sensor (Sensor C), the pair of secondary sensors (Sensor A and Sensor B) and the pair of tertiary sensors (Sensor D and Sensor E) are functional to control the water flow and water temperature of touch-free automatic faucet embodiments for commercial and residential applications. In one embodiment, the water temperature control valve assembly has two fluid inlets (a cold water inlet and a hot water inlet) and one fluid outlet (mixed cold/hot water flow) conduits. The water may then flow to a flow control valve assembly, which may affect the rate of flow of the mixed water. The water temperature control valve assembly and flow control valve assembly may combine with one or more electric solenoid valves and/or electric motorized gear valves therefrom to control water flow to the faucet spout.

In one or more embodiments, when the faucet is in the Primary-water-flow-mode or Continuous-water-flow-mode, the water flow control valve assembly (Valve B) is in an activated position for water flow. Both of the Sensor D and Sensor E of the tertiary sensors sense the presence of object (for example, a hand) within the detection zone for a predetermined time period (Time-default-setting). The logic processor sets the current temperature and flow condition as the default settings for water flow (Common-default-mode). The default flow and temperature reset function prevents a user from accidently becoming injured by sudden hot water flow from a previous usage and maintains faucet water flow at a minimum requirement for water conservation.

In one embodiment, at least three default settings exist for the faucet. In one example, the default settings are as follows: (1) Common default setting—for all users, when the faucet does not have either Customized Preset 1 or 2; (2). User defined Preset 1—used with Sensor D; and (3) User defined Preset 2—used with Sensor E.

Using Preset 1: When the water is not flowing as Flow control valve A is Off, Sensor D senses an object (e.g., a finger, a hand, etc.) for a predetermined time period and the water flow is turned on with Sensor C or Continuous Water Flow Mode within another predetermined time period, then water will flow using the temperature and/or flow-rate stored as the Preset 1 condition. Similar behavior may occur for Preset 2. In other embodiments, the faucet has more or fewer presets.

In one embodiment, the faucet includes a Stand-By mode in which the water flow commences with detection by Sensor C or Sensor A and B. Water initially flows at the Common-default flow rate, and the flow rate may be adjusted by the user after the default is initially used. After a Time-default amount of seconds without water flow, the faucet is set back to the Common-default-mode. Also in that embodiment, the logic processor is configured so that, in response to sensing by Sensor D, temporarily utilize a preset such that, if water flow is triggered by Sensor C or Sensor A and B, the preset is used.

After the predetermined Time-default period without water flow, the faucet is set back to the Common-default-mode. Similar triggering of a second preset by using Sensor E may also occur.

In one or more embodiments, the logic processor sets the faucet at Common-default-mode, the second sensor (Sensor B) of the secondary sensors detects an object (for example, a hand or finger) within the detection zone for a time period (water-flow-timer), the LED indicator flashes accordingly and the faucet is activated in the Primary-water-flow-mode or Continuous-water-flow-mode within a predetermined time period (Time preset activation), the water flow control valve assembly (Valve B) activates and water flow from the spout for a period of time according to the user defined timer (water-flow-timer) and water temperature control valve assembly (Valve A) responds for water flow at the second user defined preset water flow and temperature (Timer-mode).

In some embodiments, user presets can be saved using touch-free controls. For example, when the water is turned on with Preset 1, both sensors D and E (tertiary sensors) may sense an object for a predetermined time period and, in response thereto, cause the logic processor to save the current settings as the Preset 1 settings. The same is true for Preset 2, albeit the predetermined time period may be different, for example. The faucet may receive certain user input and in response thereto, change the default water flow rate or default temperature. For example, the logic processor may be configured to receive input from the secondary and/or tertiary sensors, and save a new Common-default in response thereto. As an example of providing functionality for user-settable presets, after Sensor D senses an object, the faucet enters a preset-configuration state; after sensing Sensor C (primary flow mode) or Sensors A and B (continuous flow mode), the faucet pours water at a flow and temperature associated with preset 1. A user may then change water flow rate or temperature to a new condition and save to a new preset 1 by having Sensors D and E sense an object. Similar functionality may be provided for a preset 2, for example by using different sensors, different combinations of sensors, different detection times, some other trigger mechanism, and/or some combination thereof.

In one or more embodiments, when one sensor (e.g., Sensor D) of the plural of tertiary sensors detects an object (for example, a hand or finger) within the detection zone for a predetermined time period (time Sd-preset), the logic processor sets a state to "User-defined-preset-mode" and then, if the faucet is activated in the Primary-water-flow-mode or Continuous-water-flow-mode within a predetermined time period (time preset activation), the water flow control valve assembly (Valve B) and water temperature control valve assembly (Valve A) respond for water flow at the first user defined preset water flow and temperature.

In one or more embodiments, when a second sensor (e.g., Sensor E) of the plural of tertiary sensors detects an object (for example, a hand or finger) within the detection zone for a predetermined time period (time Se-preset), the logic processor sets a state to "User-defined-preset-mode" and then, if the faucet is activated in the Primary-water-flow-mode or Continuous-water-flow-mode within a predetermined time period (time preset activation), the water flow control valve assembly (Valve B) and water temperature control valve assembly (Valve A) respond for water flow at the second user defined preset water flow and temperature.

In one or more embodiments, when the first sensor (Sensor D) of the plural of tertiary sensors detects an object (for example, a hand or finger) within the detection zone for a predetermined time period (time Sd-preset), the logic processor sets a state to "User-defined-preset-mode" and then, if the second sensor (Sensor B) of the secondary sensors detects an object (for example, a hand or finger) within the detection zone for a time period (water-flow-timer), the LED indicator flashes accordingly and then, if the faucet is activated in the Primary-water-flow-mode or Continuous-water-flow-mode within a predetermined time period (time preset activation), the water flow control valve assembly (Valve B) activates and water flow from the spout for a period of time according to the user defined timer (water-flow-timer) and water temperature. For example, the control valve assembly (Valve B) may respond for water flow at the second user defined preset water flow and temperature (Timer-mode).

In one or more embodiments, when the second sensor (Sensor E) of the plural of tertiary sensors detects an object (for example, a hand or finger) within the detection zone for a predetermined time period (time Se-preset), the logic processor sets a state to "User-defined-preset-mode" and then, if the second sensor (Sensor B) of the secondary sensors detects an object (for example, a hand or finger) within the detection zone for a time period (water-flow-timer), the LED indicator flashes accordingly and then, if the faucet is activated in the Primary-water-flow-mode or Continuous-water-flow-mode within a predetermined time period (time preset activation), the water flow control valve assembly (Valve B) activates and water flow from the spout for a period of time according to the user defined timer (water-flow-timer) and water temperature. For example, the control valve assembly (Valve B) may respond for water flow at the second user defined preset water flow and temperature (Timer-mode).

In one or more embodiments, when the faucet is in stand by condition and no water flow from the spout, both of the first sensor (Sensor D) and second sensor (Sensor E) of the plural of tertiary sensors detects an object (for example, a hand or finger) within the detection zone for a predetermined time period (time-to-program), the logic processor sets a state to "User-program-mode" and an LED indicator of the faucet apparatus flashes in a color at a certain speed continuously (for example; LED flashes in red color at one flash per second to indicate the faucet is in User-program-mode). Upon the first sensor (Sensor A) of the plural of secondary sensors (the-program-select-sensor can be one of the plural of secondary sensors or the plural of tertiary sensors for different program) detecting an object (for example, a hand or finger) within the detection zone for a time period (time-to-activate), the LED indicator stops flashing and will emit a colored light (such as a red color for first program, yellow color for second program and green for third program) to that indicate the second sensor of the plural of secondary sensors is ready for setting a parameter for the timer of Timer-mode. When the second sensor of the plural of secondary sensors detects an object (for example, a hand or finger) within the detection zone for a time period (time-program-parameter) (for example: one LED flash means one minute water flow per LED flashing for the Timer-mode, two LED flashes mean two minutes water flow per LED flashing for the Timer-mode and so on to set the timer parameter for different faucet applications, (i.e. bathtub faucet water flow can be set longer than the kitchen faucet). The User-program-mode may be saved by the logic processor by activating both (Sensor D and Sensor E of the plural of tertiary sensors. For example, the logic processor may be in communication with non-volatile memory storage such as flash storage to store preset information within.

In one or more embodiments, the faucet is configured such that, when it is activated by one of the user defined presets (User-preset-mode), and the water flow control valve assembly (Valve B) is in an activated position for water flow, then, if both Sensor D and Sensor E of the tertiary sensors sense the presence of object (for example, a hand) within the detection zone for a predetermined time period (time-default-setting), the logic processor will set the current temperature and flow condition as the user defined preset default settings for water flow (User-defined-preset-default-mode). This user-defined preset default flow feature and temperature function feature may provide comfort and convenience to users.

In one or more embodiments a logic processor circuit board comprises a logic processor, for example a Micro Chip, and a circuit board. The logic processor is programmed to function in response to input from sensors (e.g., Sensor A, Sensor B, Sensor C, Sensor D and Sensor E), and to provide output to water flow control valve assembly (Valve B) and water temperature control valve assembly (Valve A). The faucet apparatus may also include an electricity power supply package includes a battery pack (rechargeable or not) and an alternating current to direct current (AC-DC) transformer to supply direct current to the logic processor circuit board to activate the sensors, the flow control valves assembly and the motorized temperature control valves assembly.

Some embodiments may include touch-free automated control that provide water conservation. The water flow and temperature may be maintained at a comfortable temperature and economic flow rate for water conservation and user comfort.

In some embodiments the function of the plural of secondary sensors (Sensor A and Sensor B) controls the faucet water temperature with a "touch-free" operation. The default temperature reset function prevents injury by sudden hot water flow. Activation of first and second sensors of secondary sensors (Sensor A and Sensor B) controls a continuous water flow of the faucet. Sensor A of the secondary sensors pauses the function of the primary sensor (Sensor C) and stops water flow for a user to work within the primary detection zone without activating faucet water flow for water conservation. The plurality of tertiary sensors (Sensor D and Sensor E) adjust faucet water flow.

An illustrative embodiment provides a faucet for use in one or more of a lavatory or a kitchen. The faucet may be that can be fully functional for all operational needs without requiring touch. In another embodiment, some functions can be controlled by either a touch-based and-or touch-free manner. In order to provide water-efficient operation that is easy and convenient to use, the water flow is activated and deactivated in response to a primary electronic sensor that detects an object presence under the spout, so as to provide water-efficient operation in Primary-water-flow-mode. For other applications, such as filling the sink or bathtub, a container or for washing dishes, washing food, running a shower, etc., continuous water flow is provided. In one embodiment, the faucet can be switched in/out a Continuous-water-flow-mode without touching any part(s) of the faucet body.

Another illustrative embodiment with a Timer-mode can provide a touch-free automatic faucet to fill a container in the kitchen or fill a tub at a user defined timed interval without the user needing to watch the water level in the container or tub. Yet another invented function to allow the user to program the logic processor.

FIG. 13 is a diagram of an illustrative touch-free automatic faucet according to some embodiments. The illustrative touch-free automatic faucet system is shown coupled to a cold water source (111), a hot water source (112) and an outlet for mixed water flow to the faucet spout (106). The system includes a primary electronic sensor C 131), a secondary electronic sensor assembly including sensors A and B (32 and 33), a tertiary electronic sensor assembly including sensors D and E (34 and 35), an electrical power supply package (104), a logic processor circuit board (105), a water temperature control assembly valve A (107), a status indicator (36), a water flow control assembly valve B (108) and a water temperature sensor (114). In one embodiment, the power supply package (104) may be one or more a batteries, one or more rechargeable batteries, a solar cell system, a DC voltage supplied from an AC/DC converter, etc.

The sensing signals (141, 142, 143, 144 and 145) from the primary electronic sensor C (31), the secondary sensors A and B (32, 33) and the tertiary sensors D and E (34, 35) input signals to the logic processor circuit board (105). The outputs of the logic processor (123 and 124) control the water temperature control assembly A (107) and flow control assembly B (108). The electricity power supply package (104) supplies electrical power (148) to the logic process circuit board (105) for powering the whole system. In one embodiment, water flow (113) exits the temperature control assembly A (107) and enters the water flow control assembly B (108). In one embodiment, the water flows from the water flow control assembly B (108) through the water temperature sensor (114) and flows to the faucet as a stream of mixed-temperature, flow-controlled water (106).

In one embodiment, the water temperature sensor (114) detects the mixed water temperature flow (106) to the faucet spout. The sensed temperature signal (125) is transmitted to the logic processor (105), and may be used for displaying the water flow temperature on a display device, such as an LED lighting device, LCD lighting device, etc. In one embodiment, the display may be located on the faucet spout (101), or within a close proximity to the faucet. In another embodiment, the water temperature sensor controls the water temperature control assembly (131) to control excessive temperature that is sensed, which can prevent injuries due to excessive water temperature being sensed by the water temperature sensor (114), which transmits a signal to the logic processor (105) to control the temperature control assembly (107). In another embodiment, the sensed temperature is used to adjust the water-temperature control assembly A in order to adjust the water stream (106) to more closely match a selected temperature, even if the water is within safe temperature levels.

Figure 14:
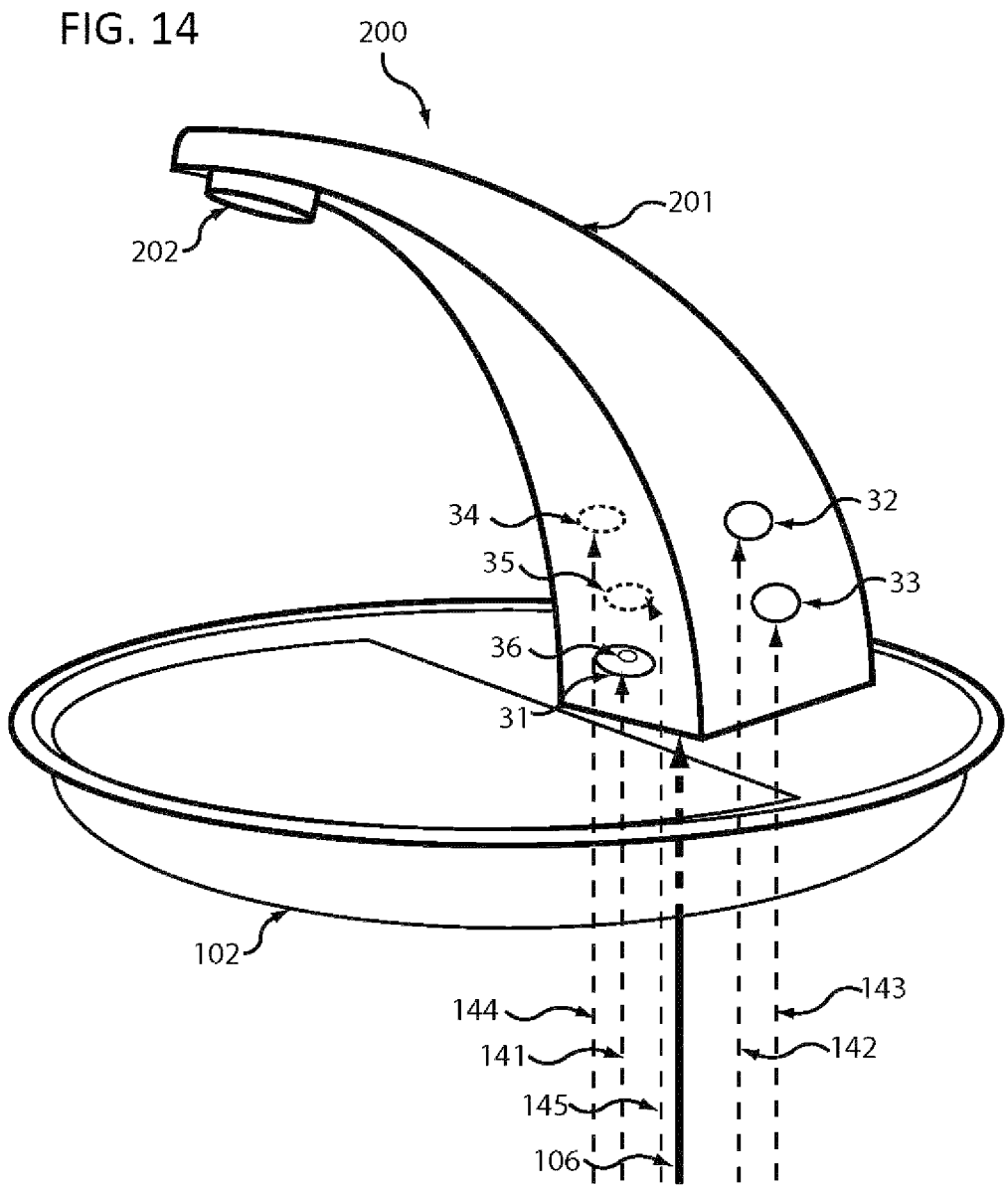
FIG. 14 depicts an embodiment of a spout for use in a touch-free faucet assembly, comprising embedded sensors.

FIG. 14 is a diagram illustrating one embodiment of a faucet with different touch-free functions. The function of the primary sensor C (31) is to activate the Primary-water-flow-mode when water is needed in the sink area (102) for washing hands or foods, filling the sink, etc. The plural of secondary sensors Sensor A (32) and Sensor B (33) serves three different functions: adjusting water temperature, pausing the primary sensor (Sensor C) and the effect of triggering both Sensors A and B (32 and 33) substantially simultaneously is to toggle between a Continuous-water-flow-mode and a Primary-Flow-Mode. For example, continuous-water-flow-mode may be used for filling a sink, a container, or to wash dishes, wash food, etc.

In the Primary-water-flow-mode or the Continue-water-flow-mode, when water is flowing from the faucet, the plural of secondary sensors (Sensor A and Sensor B) (32 and 33) function to adjust water temperature (Temperature-control-mode) up/down. When the primary sensor (Sensor C) (31) does not detect an object, activation of Sensor A (32) triggers a "Faucet-pause-mode" to pause the function of Sensor C (31) to enable the user to work in the vicinity of faucet without water flowing. The tertiary sensors (Sensor D, Sensor E) (34) (35) control the water flow of the faucet (Adjust-water-flow-mode).

The secondary sensors (Sensor A and Sensor B) (32 and 33) and tertiary sensors (Sensor D and Sensor E) (34 and 35) control the default setting of water flow and temperature of the faucet (Common-default-mode). In one embodiment, a common default mode may be used for pre-setting water flow and/or temperature control. In one example, when the water flow control valve assembly B (108) in FIG. 13 is placed in an activated position for water flow by the logic processor (105) upon both the first sensor D (34) and the second sensor of the tertiary sensor E (35) sensing presence of an object (e.g., a finger) within the respective detection zones for a predetermined period of time (e.g., about 2 seconds, about 5 seconds, etc.), an LED indicator light blinks (and/or a sound chip produces an audio indication), the logic processor (105) sets a current temperature and water flow condition as a common default setting (Common-default-mode).

The secondary sensors (Sensor A and Sensor B) (32 and 33) and the tertiary sensors (Sensor D and Sensor E) (34 and 35) control the customized preset default operation of water flow and temperature of the faucet (User-save-preset-mode). In one embodiment, one of the tertiary sensors may be used for pre-setting water flow and/or temperature control. In one example, when the first sensor (Sensor D) (34) of the tertiary sensors senses the presence of an object (e.g., a finger) within the respective detection zone for a predetermined period of time (e.g., about 2 seconds, about 5 seconds, etc.), an LED indicator light blinks, and/or a sound chip produces an audio indication. The water flow control valve assembly B (108) is then placed in an activated position for water flow by the logic processor (105) upon the activation of the Primary Sensor C (31) for a Primary-water-flow-mode or by secondary sensors (Sensor A and Sensor B) (32 and 33) for a Continuous-water-flow-mode within a predetermined period of time (e.g., about 2 seconds, about 5 seconds, etc.), then the faucet will cause water to flow at temperature and flow condition of the customized preset 1 (User-save-preset-mode).

In another example, when the second sensor (Sensor E) (35) of the tertiary sensors senses the presence of an object (e.g., a finger) within the respective detection zone for a predetermined period of time (e.g., about 2 seconds, about 5 seconds, etc.), an LED indicator light blinks, and/or a sound chip produces an audio indication. The water flow control valve assembly B (108) is placed in an activated position for water flow by the logic processor (105) upon the activation of the Primary Sensor C (31) for a Primary-water-flow-mode or by the plural of secondary sensors (Sensor A and Sensor B) (32 and 33) for a Continuous-water-flow-mode within a predetermined period of time (e.g., about 2 seconds, about 5 seconds, etc.), then the faucet will cause water to flow at temperature and flow condition of the customized preset 2 (User-save-preset-mode).

The secondary sensors (Sensor A, Sensor B) (32 and 33) and the tertiary sensors (Sensor D, Sensor E) (34 and 35) control the customized preset default setting of water flow and temperature of the faucet (User-save-preset-mode). In one embodiment, one of the tertiary sensors may be used for pre-setting water flow and/or temperature control. In one example, when the water flow is initiated by the customized preset 1 condition as described above paragraph, the water flow control valve assembly B (108) is placed in an activated position for water flow by the logic processor (105) upon both the first sensor D (34) and the second sensor of the tertiary sensors sensor E (35) sensing presence of an object (e.g., a finger) within the respective detection zones for a predetermined period of time (e.g., about 2 seconds, about 5 seconds, etc.). In that embodiment, an LED indicator light blinks, and/or a sound chip produces an audio indication, and the logic processor (105) sets a current temperature and water flow condition as a new customized preset 1 (User-save-preset-mode).

In another example, when the water flow is initiated by the customized preset default preset 2 condition as described above, the water flow control assembly B (108) is placed in an activated position for water flow by the logic processor (105) upon both the first sensor D (34) and the second sensor of the tertiary sensor E (35) sensing presence of an object (e.g., a finger) within the respective detection zones for a predetermined period of time (e.g., about 2 seconds, about 5 seconds, etc.). In that embodiment, an LED indicator light blinks, and/or a sound chip produces an audio indication, and the logic processor (105) sets a current temperature and water flow condition as a new customized preset 2 (User-save-preset-mode).

In another example, upon the water flow control assembly B (108) being placed in an inactivated position (where no water flows) by the logical processor (105) when either the first tertiary sensor, Sensor D (34), or the second tertiary sensor, Sensor E (35), senses an object within their respective detection zones for a predetermined time period (e.g., about 2 seconds, about 5 seconds, etc.), the logical processor (108) activates the first preset or second preset for temperature control and water flow. In another example, whenever a change of temperature or water flow is made, it will clear the preset operation conditions for temperature and water flow. In one embodiment the water outlet (202) may house the primary sensor (31).

Figure 15:
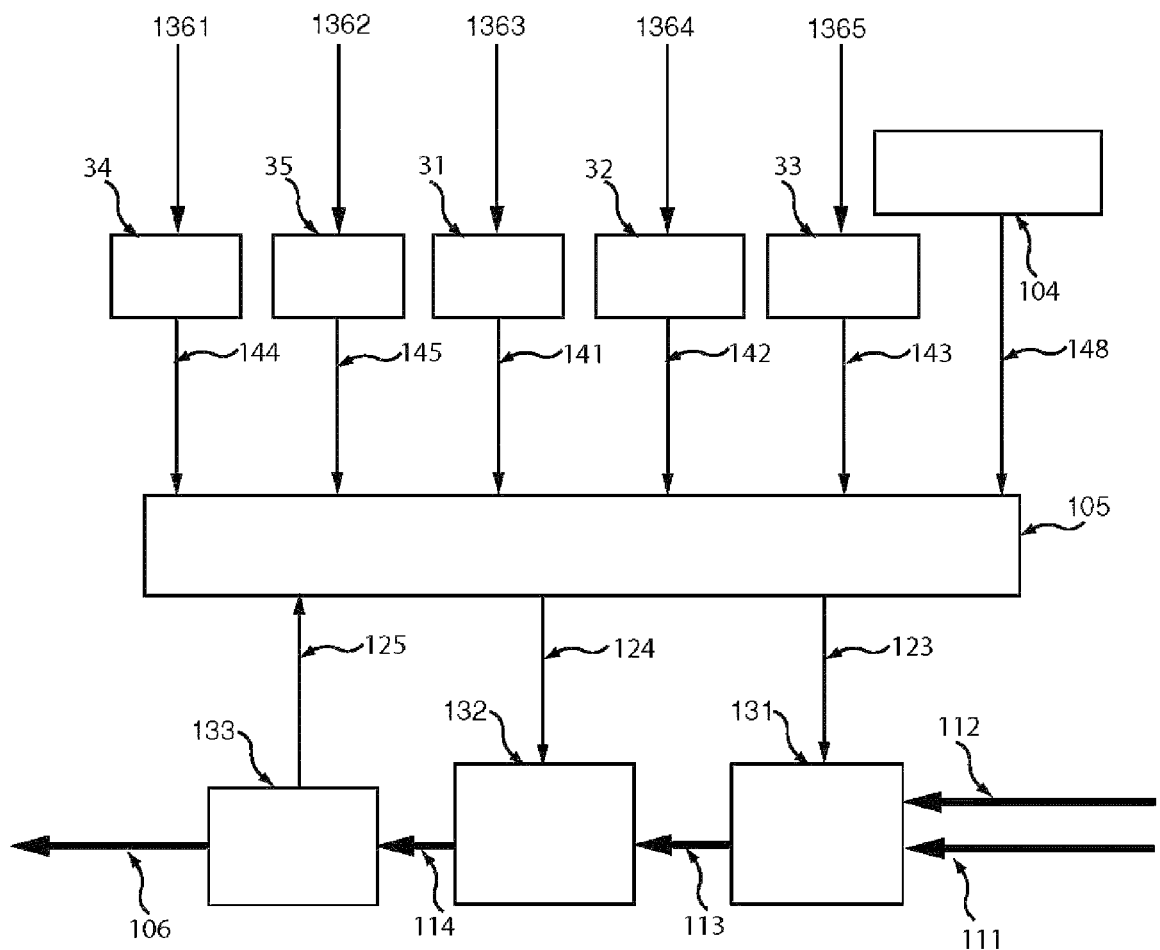
FIG. 15 depicts an embodiment of a logic processor circuit board, input signals to the circuit board, and output signals from the circuit board.

FIG. 15 is a diagram of an illustrative touch-free automatic faucet according to one embodiment. The illustrative touch-free automatic faucet system is shown coupled to a cold water source (111), a hot water source (112) and an outlet for mixed water flow (106) to the faucet spout. The system includes one primary electronic sensor C (31), a plural of secondary electronic sensor assembly sensor A and B (32 and 33), a plural of tertiary electronic sensor assembly sensor D and E (34 and 35), an electrical power supply package (104), a logic processor circuit board (105), a water temperature control assembly A (131), a water flow control assembly B (108) and a water temperature sensor (133). In one embodiment, the power supply package (104) may include one or more batteries, one or more rechargeable batteries, a solar cell system, and/or a DC voltage supplied from an AC/DC converter, etc.

The sensors (31, 32, 33, 34, and 35) sense the presence of one or more objects in sensor zones (1361, 1362, 1363, 1364, and 1365). For example, an optical sensor may sense the presence of an object in a sensor zone immediately in front of the optical sensor. As another example, an infrared sensor may detect the presence of a warmth-emitting object within a certain distance in front of the sensor. One or more of the sensors (31-35) may detect the presence of an object and transmit a sensing signal (141-145) in response. The sensing signals (141, 142, 143, 144 and 145) from the primary electronic sensor C (31), the secondary electronic sensors A and B (32, 33) and tertiary electronic sensors D and E (34, 35) input signals to the logic processor circuit board (105). The outputs of the logic processor (123 and 124) control the water temperature control assembly A (131) and water flow control assembly B (108). The electricity power supply package (104) supplies electrical power (148) to logic process circuit board (105) for powering the whole system. In one embodiment, water flow (113) exits the temperature control assembly A (131) and enters the water flow control assembly B (108). In one embodiment, the water flows from the water flow control assembly B (108) through the water temperature sensor (133) and flows to the faucet as a stream (106).

In one embodiment, the water temperature sensor (133) detects the mixed water temperature flow (106) to the faucet spout. The sensed temperature signal (125) is transmitted to the logic processor (105), and may also be used for displaying the water flow temperature on a display device, such as an LED lighting device, LCD lighting device, etc.

In another embodiment, the water temperature sensor controls the water temperature control assembly (131) to control excessive temperature that is sensed, which can prevent injuries due to excessive water temperature being sensed by the water temperature sensor (133), which transmits a signal to the logic processor (105) to control the temperature control assembly (131).

Figure 16:
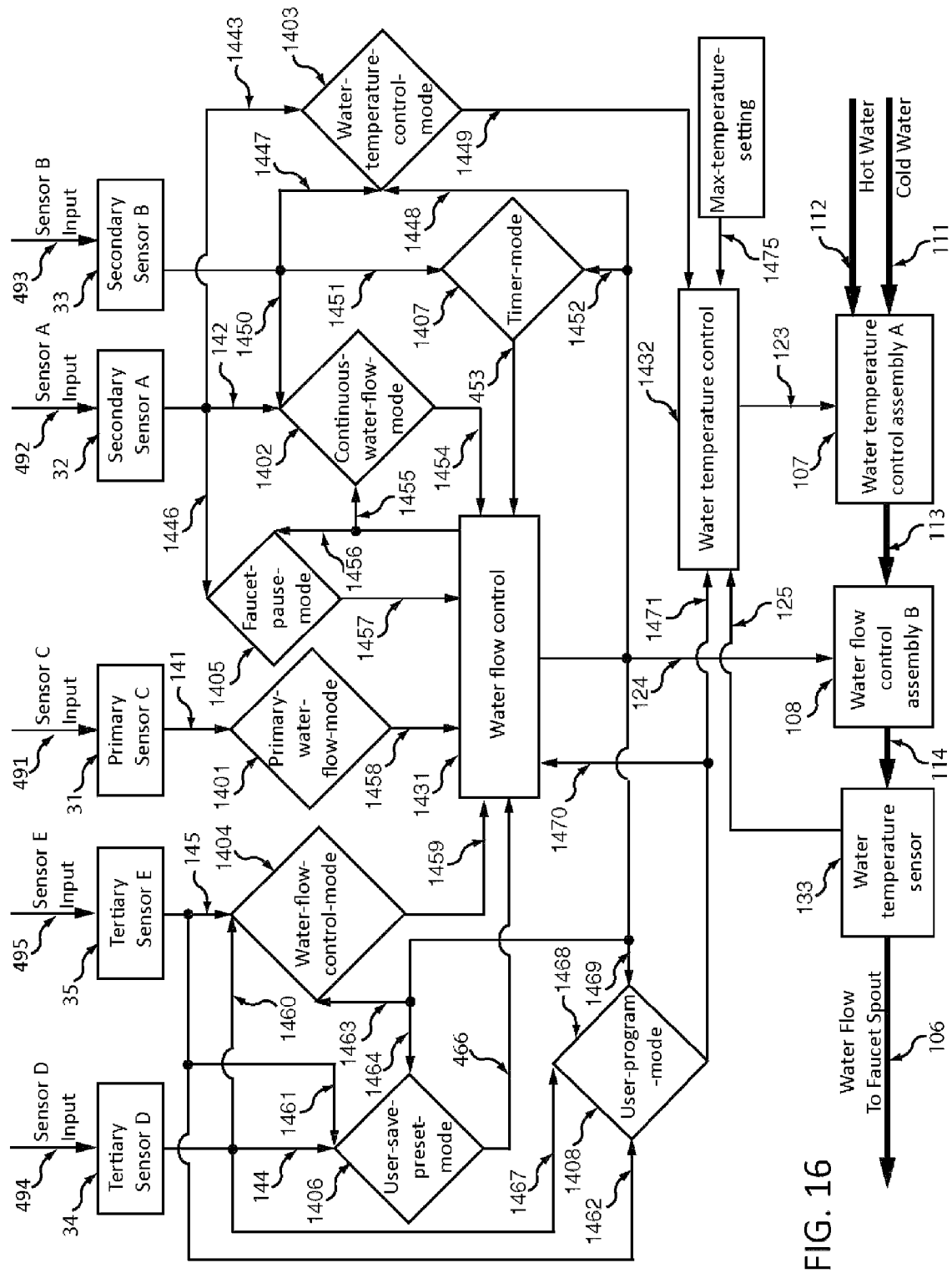
FIG. 16 depicts an embodiment of communications channels amongst various elements of a touch-free faucet, and various functionalities associated with those communications channels.

FIG. 16 is a logic diagram that shows various logic procedures and methods of one embodiment of a system using an electronic sensor (e.g., infrared sensor or others), detection devices, logic processor, and water flow control valves to enable touch-free and automatic faucet operation.

When the faucet detects an object present within the primary Sensor C (31) detection zone (for example, in a sink), it activates (141) the primary sensor (Sensor C) (31) and the logic processor program (1458) activates (124) the flow control assembly (108) for water flow to the faucet spout (101) (activation of Primary-water-flow-mode).

When the faucet is in Primary-water-flow-mode (1401) operation and an object is detected in the primary detection area, the water flow control assembly (108) is in activated position for water flow, and when the primary sensor (Sensor C) (1411) does not detect (1441) that an object is present within the detection zone (for example, in a sink), the logic processor program (1457) deactivates (124) the water flow control assembly (108) to stop the water flow to the faucet spout (101) (deactivation of Primary-water-flow-mode).

If the faucet detects that both of the secondary sensors (Sensor A and Sensor B) (32 and 33) sense the presence of an object (for example, a hand) within the detection zone for a predetermined time period (Time Continue-flow-on) (1442 and 1450), and no water is flowing from the spout (1455), the logic processor program (1454) activates (124) the water flow control assembly B (108) in order to trigger a continuous water flow (Continuous-water-flow-mode) (1402) to the faucet spout (101).

As illustrated in FIG. 16 the water flow control assembly B (108) is in an activated position for water flow (106) to flow to the faucet spout (101). If Sensor A (32) detects (1443) the presence of an object (for example, a finger) within its detection zone, the logic processor program (1448) increases the faucet water flow temperature by increasing the intake of hot water flow (112) and decreasing the intake of cold water flow (111) at the temperature control assembly B (131) accordingly, depending on the sensing time period of Sensor A (142). When the Sensor B (33) detects (1447) the presence of an object (for example, a finger) within its detection zone, the logic processor program (1449) decreases the faucet water flow temperature by decreasing the intake of hot water flow (112) and decreasing the intake of cold water flow (111) to the temperature control assembly A (131), depending on the sensing time period of the Sensor B (1447). Faucet water flow temperature may be controlled by the functioning of the plural of secondary sensors (Sensor A and Sensor B) (33 and 34) without a person or object touching any part(s) of the faucet body (101) (Temperature-control-mode) (403). In one embodiment, the water temperature sensor (133) operates to sense the temperature and feedback a signal (125) to the logical processor (105). In this embodiment, the logical processor program (432) sends a signal (123) to either the temperature control assembly A (131) to reduce temperature if the sensed temperature exceeds a predetermined temperature, or sends a signal (125) to the flow control assembly B (108) to turn off water flow if the predetermined maximum temperature setting is exceeded. The faucet, including its water temperature sensor may thereby provide safe functionality to prevent a person from coming in contact with water heated to an excessive temperature. Additionally, the water temperature sensor (133) may communicate with or comprise an indicator to alert users of the current water temperature. In one example, the indicator is an LED indicator that displays temperature in either degrees Fahrenheit or Celsius. In another example, the indicator is a sound indicator that produces a sound (e.g., a beep) or states the temperature in a preferred language. In another example, both sound and light indicators are used to indicate the current water temperature to users.

In one embodiment, when the faucet is in the Continuous-water-flow-mode (402), the water flow control assembly B (108) is activated for water flow (106) to the faucet spout (101). Both of the secondary sensors (Sensor A and Sensor B) (32 and 33) sense the presence of an object (for example, a hand) within the detection zone (1492 and 1493) for a predetermined time period (Time Continuous-flow-off), the logic processor program (1454) deactivates (124) the water flow control assembly B (108) to stop continuous water flow (124) (Continuous-water-flow-mode) (402) (deactivation of Continuous-water-flow-mode) (402).

In one embodiment, when the faucet (100) is in a stand-by condition, the primary sensor, Sensor C (31), does not sense an object present within the detection zone, and the flow control assembly B (108) is set to a deactivation condition (1456) where no water flows (106) from the faucet spout (101). Detection (1446) of an object (for example, a hand or finger) within the detection zone of the first sensor A (32) of the plural of secondary sensors for a predetermined time period (Time Sc-pause) triggers the logic processor program (1457) to pause (1457) the function of Sensor C (31), which is referred to as the "Faucet-pause-mode" (1405). In the Faucet-pause-mode, a user can work within the primary sensor detection zone without activating faucet water flow for water conservation (beginning of Faucet-pause-mode).

When the faucet is in the Primary-water-flow-mode (1401) or the Continuous-water-flow-mode (1402), the water flow control assembly B is in an activated position for water flow (1464). Then, if both the first sensor, Sensor D (34), and, Sensor E (35), sense the presence of an object (for example, a hand) within the detection zone for a predetermined time period (Time-default-setting), the logic processor program (1466) sets the current temperature and flow condition as the default settings for water flow (Common-default-mode) (1406). The user-defined flow and temperature reset function (User-save-preset-mode) (1406) prevents a user from accidently becoming injured by sudden hot water flow from a previous usage (e.g., maximum hot temperature) and maintains the faucet water flow at a minimum requirement for water conservation.

When the user activate Sensor D (34) and start water flow from the faucet with the Primary-water-flow-mode (1401) or the Continuous-water-flow-mode (1402), the water flow control assembly B is in an activated position for water flow (464), and both, Sensor D (34), and, Sensor E (35), sense the presence of an object (for example, a hand) within the detection zone for a predetermined time period (Time-default-setting). In this state the logic processor program (1466) sets the current temperature and flow condition as the default settings for water flow of User-save-preset-1 (User-save-preset-mode) (1406). The faucet provides similar functionality for Sensor E (35) to enable a user to save settings as the User-save-preset-2.

In one embodiment, when the faucet (100) is in a stand-by condition, it does not pour water (106) from the spout (101). However, once the faucet detects (1451) of an object (for example, a hand or finger) within the detection zone of Sensor B (33) for a predetermined time period (Time Sb-timer), the detection triggers the logic processor program (1453) to start a timer (Timer Water-flow) referred as Timer-mode (407) to set the water flow from the faucet spout (101) at a time period corresponding to the time period (Timer Water-flow) of the detection time period of the second sensor B (33) of the plural of secondary sensors when the faucet starts flow by the Primary-water-flow-mode or Continuous-water-flow-mode. For example, the function of the Timer-mode is very convenient for use in filling a kitchen faucet to fill a container, or a bathroom faucet to fill a tub.

In one embodiment, when the faucet (100) is in a stand-by condition, the faucet does not pour water (469) from the spout (101). Then, detection (1467 and 1462) of an object (for example, a hand or finger) within the detection zone of, Sensor D (34), and the, Sensor E (35), for a predetermined time period (Time Sb-timer) triggers the logic processor program (1470) to start setting a program procedures by the user referred as User-program-mode (1408) to set a program parameters for the control of the faucet.

In one embodiment, the water flow control assembly (108) and the water temperature control assembly (131) have a shared cold fluid inlet (112), a hot fluid inlet (111) and one fluid outlet (106) conduits, combined with one or more of electric solenoid valves and electric motorized gear valves therefrom to control water flow (106) to the faucet spout.

Figure 17:
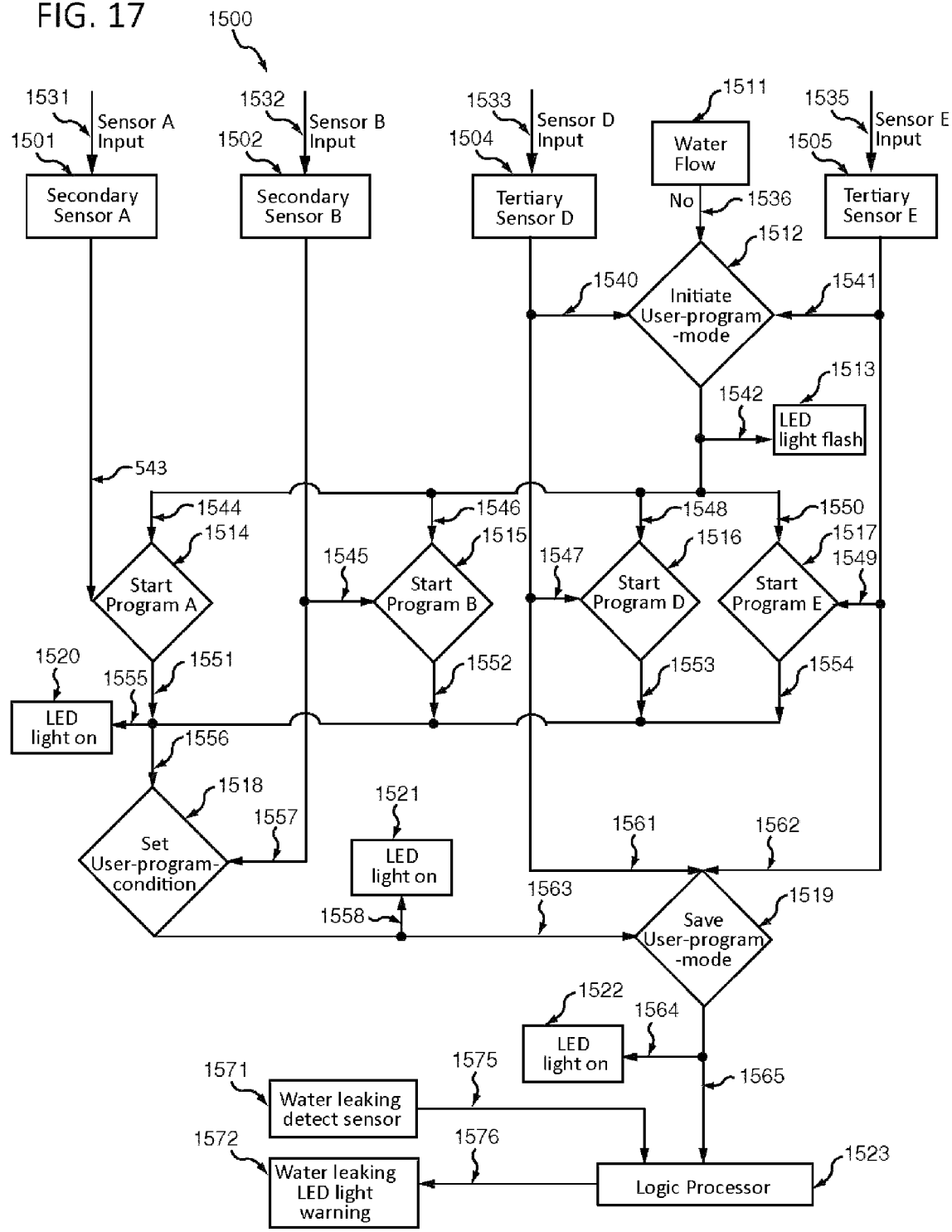
FIG. 17 depicts an embodiment of functionality associated with various sensor elements of a touch-free faucet, including which sensors may trigger which functional program, and certain user-visible indicators of functional state.

FIG. 17 illustrates logic, interconnection, and components for one embodiment of a faucet. When the faucet (100) is in a stand-by condition, no water flows (1536) from the spout (101), and activation (1540) of Sensor D (1504) indicates detection (1540) of an object (for example, a hand or finger) within the detection zone of Sensor D (1504). This may require detection for at least a minimum time (Time Sd-timer). In this condition, activation (1541) of Sensor E (1505) triggers the logic processor (105) to provide an (1542) LED indication (1513) flashing (for example, in red, yellow, and/or green colors) to indicate the initiation of User-program-mode (1512). Then, another signal (1544) from the logic processor couples with the activation (1543) of Sensor A (1501)triggers the logic processor program (1514) to provide an LED indication (1520) (for example, in yellow color) to indicate the initiation of program A (1514) of User-program-mode (1512). The signal (1556) also initiates a User-program-condition to be set by the activation (1557) of Sensor B (1502). The logic processor program (1518) triggers (1558) a LED indication (1521) (for example, in red color) to indicate the setting condition of the program A (for example, the parameter of Timer-mode) (1518). The setting (1563) of the program A (1514) and program A condition (1518) of User-program-mode (1512) can be saved (1519) by activation (1561 and 1562) of both the first sensor, Sensor D (1504), and second sensor, Sensor E (1505), of the tertiary sensors. An LED indicator (1522) may indicate the completion of the User-program-mode programmed (1565) in logic processor (1523). The User-program-mode can be programmed by changing the program A (1514) from activation (1543 and 1544) of Sensor A (1501) to program B (1515) of activation (1545 and 1546) of Sensor B (1502) of, the program D (1516) of activation (1547 and 1548) Sensor D (1504) or the program E (1517) of activation (1549 and 1550) the second sensor, Sensor E (1505), of the plural of secondary sensors. The User-program-mode (1512) enables the user defined favorite water temperature, flow and water flowing timer condition for comfortable and water saving. In another embodiment, for example, Program B can be set to check and display the system status information such as the battery life level, motor resistance status, and/or PCB circuit status.

In another embodiment, a water leaking detection system contains a water leaking detection sensor (1571) and LED warning light (1572) provides early warning function in case of water leakage from the water control valve assembly (106 of FIG. 1) which is enclosed in a control valve box. The water leaking detection sensor (1571) can be an electronic hygrometer or humidity such as capacitive humidity sensor, resistive humidity sensor or thermal conductivity humidity sensor to measure the relative humidity inside the control valve box. The relative humidity signal (1575) inside the control valve box is monitored by the water leaking detection sensor (1571) and input to logic processor (1523). Water leakage from the control valve (106 of FIG. 1) will increase a certain percentage of the relative humidity in a period of time inside the control valve box. The logic processor (1523) detects this change and may take one or more actions, such as activating (1576) a flashing LED (1572) on the faucet spout (101) in order to warn the user of the water leaking inside the control valve box.

Figure 18:
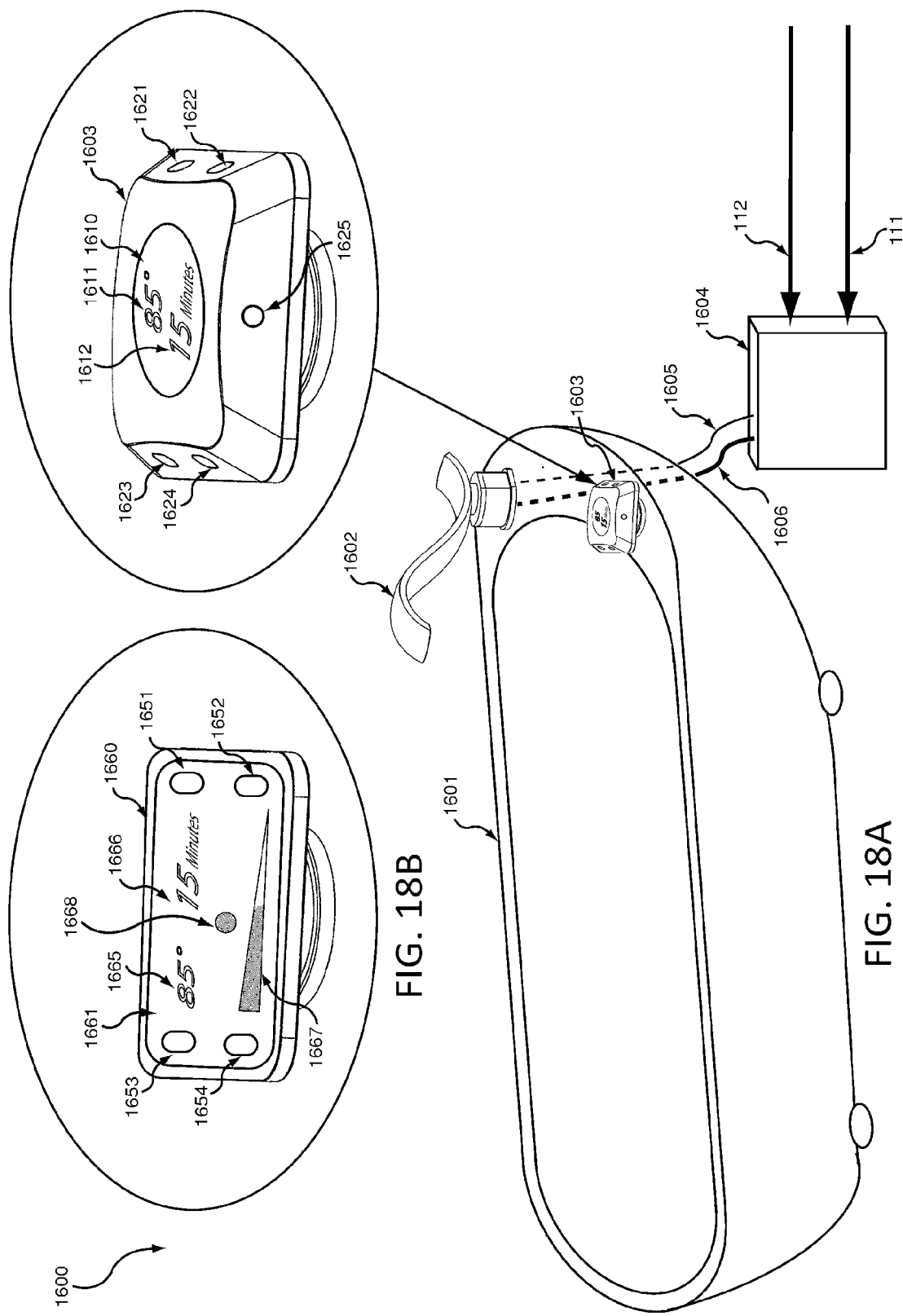
FIG. 18A illustrates an embodiment of a touch-free control apparatus for use as a bathtub faucet.
FIG. 18B illustrates an embodiment of a touch-free control apparatus.

FIG. 18A illustrates one embodiment of a touch-free automatic faucet system (1600) installed with a bathtub (1601). In this embodiment, the faucet spout (1602) and separate faucet sensor compartment (1603) are conveniently attached to the bath tub (1601). A digital controller (1604) remotely includes a water temperature control assembly (123) and a water flow control assembly (124). These assemblies are connected with the sensors housed in separate faucet sensor compartment (1603) via a wired or wireless connection (1605) for communicating signals to one another. In this embodiment, the faucet (1602) may be turned on with continuous water flow of first and second secondary sensors to fill up the bathtub (1601) to a desired water level at the desired temperature. In one example, the digital controller (1604) may be installed inside a wall or next to or under the bathtub (1601) for easy access for maintenance. The sensor compartment (1603) includes the sensors 621, 622, 623 and 624, a LED indicator (1625) and a LCD display panel (1610). The LCD display panel can show the water temperature, flow and other information such as the timer to fill the tub. In one embodiment the primary sensor C (111) is not included in the sensor compartment (1603) as it is typically not necessary for a bathtub (1601) to have the water flow momentarily on. It should be noted that other embodiments may include the primary sensor C (111) for bathtub applications. In some embodiments, the preset default temperatures allow users to customize the temperature settings to the desired temperature so that temperature does not have to be adjusted every time the bathtub (1602) is used.

In some embodiments, a customized timer is included for maintaining continuous water flow at the desired temperature. With this embodiment, based on the use of the bathtub (1601) in the past, a user can set the timer to automatically shut the water flow off after the predetermined time limit (Timer-mode). This embodiment allows the bathtub (1601) to fill without having to watch for a desired water level to be reached. This feature allows users to do other things while the bathtub (1601) is self-filling at the desired temperature. In some embodiments, the timer and sensors are controllable via a remote control from either a handheld remote control or via a network, such as the Internet or mobile phone network. In this embodiment, the bathtub (1601) can be filled at the desired level at the desired temperature without a user having to be in the same room, or location. In still another embodiment, the timer also includes a day and time setting feature for setting the bathtub (1601) to be filled in advance.

Some embodiments, including the illustrated examples, comprise automatic, touch-free control for use in controlling. In other embodiments, manual flow and/or temperature control may be used in addition or in the alternative.

As shown in FIG. 18B, some embodiments include a control console (1660) with multiple sensor sets (1651, 1652, 1653, and 1654) in a LCD panel (1661). The LCD is configured to display a signal (1668) indicating a current function of the logic processor (105). Alternatively, or additionally, an LED indicator (1625) may display apparatus status information. For example, the LCD and/or LED may display information indicative of the current water flow temperature (1665), water flow rate (1667) and flow timer (1666).

In one embodiment the sensors described herein, including sensors A, B, C, D and E have a sensing range from about 0.1 inch to about 36 inches. In one example, Sensor A, B, D and E will be in the range of about 0.1 to about 10 inches, whereas the Sensor C will have a range of about 0.1 to about 36 inches. In one embodiment, the sensing range is set during manufacturing depending upon use (e.g., commercial, home, based on a handicap, based on age of typical users, etc.). In another embodiment, the range may be adjusted by an installer.

In one embodiment, the distance between the plural of secondary sensors (Sensor A and Sensor B) ranges from about 0.1 inch to about 6 inches, depending upon the application and size of faucet. In one example, a distance ranges about 0.1 to about 2.5 inches is used. In another embodiment, the distance between the plural of third sensors (Sensor D and Sensor E) may range from about 0.1 to about 6 inches. In one example, a distance ranges from 0.1 to about 2.5 inches is used. In another example, there are no distance limitation between the plural of secondary (Sensor A and Sensor B) and the plural of third sensors (Sensor D and Sensor E). In another embodiment, the sensing range is adjusted depending on the faucet design.

According to an embodiment, according to the logic program, coverage of the plural of the Sensor A and Sensor B by an object (e.g., a person's hand(s)) will turn on or off the Continuous-flow-mode (402) depending on the current faucet condition/mode. In one example, the action of a hand covering both of the Sensor D and Sensor E will activate the User-save-preset-mode (406) and set the current faucet condition as the default condition.

In one embodiment, the predetermined time periods for the sensors may vary. In one example, the predetermined time periods range from about 0.1 to about 3600 seconds for various the logic functions. In another example, the predetermined time period of each function is set based on the specific applications (e.g., commercial, industrial, home, targeted user, etc.). In one embodiment, there are default predetermined time periods for each function (e.g., raise/lower temperature, increase/decrease flow, on/off, continuous flow, etc.). In one embodiment, the predetermined time periods are set during manufacturing depending upon use (e.g., commercial, industrial, home, based on a handicap, based on age of typical users, etc.). In another embodiment, the predetermined time periods may be adjusted by an user.

In one embodiment, the automatic touch-free faucet is operated at a low voltage to prevent shock. In one embodiment, the whole faucet system uses low voltage direct current (e.g., about 3 volts, about 6 volts, or about 24 volts), so there is no concern about harm from electric shock. In one embodiment, batteries can be used for operating the sensors and other electrical and electronic components. In this embodiment, a low battery signal alerts the user(s) so that the one or more batteries can be changed before failure, such as a sound alert, a light alert (e.g., LED signal), both sound and light, etc.

In one embodiment, the faucet is set to a factory default temperature range of about 55° to 140° F., depending on the geologic market area for comfort usages, type of use (e.g., commercial, industrial, home, targeted users, etc.). In one example, users may change the default to a personal (i.e., favorite) default temperature and flow at their preference by covering both the Sensor D and Sensor E of the plural of tertiary sensors for a time period referred as the User-save-preset-mode when the faucet water is in their favorite flowing condition. In one embodiment, the default temperature range is set during manufacturing depending upon use (e.g., commercial, home, based on a handicap, based on age of typical users, etc.). In another embodiment, the default temperature range may be adjusted by an installer, or the user.

In one embodiment, the time period related to increasing/decreasing temperature is dependent on the pressure and temperature of both the hot and cold water supply. In one example, a convenient adjusting speed for temperature and flow is set so that the increase/decrease in temperature does not change at an inconvenient rate (e.g., too fast, too slow, etc.). In one embodiment, the temperature and flow adjustment rates are set during manufacturing depending upon use (e.g., commercial, home, based on a handicap, based on age of typical users, etc.). In another embodiment, the adjustment rates may be adjusted by an installer or user (User-program-mode).

In one embodiment the sensors A, B, C, D and E are single IR sensors. In one embodiment, the IR sensors have varying wave length and emitting angles for various applications. In one embodiment, the sensing angle range is adjustable depending on the type of use (e.g., a sensing angle range of about 35 degrees to about 270 degrees or more). In another embodiment, the Sensors A, B, D and E use an electronic capacity sensor, such as the function used in a "touch lamp." However, this type of sensor is not a "touch-free" type of sensor. In one example, the electronic capacity sensor is only used where a non-touch-free operation is desired. Other motion type sensors may also be employed in other embodiments. In one embodiment the sensors A, B, C, D and E are single ultrasonic sensors. In one embodiment, the ultrasonic sensors have varying wave lengths and emitting angles for various applications.

In some embodiments, the maximum hot water temperature is conveniently set based on age of the targeted users. For example, when the faucet is in use in a senior home, a preschool, etc., the maximum temperature may be set accordingly to prevent injury to those that may be more susceptible to higher water temperatures. In other uses, such as industrial use or commercial use, where the maximum temperature is necessarily higher, a higher maximum temperature may be set accordingly. The maximum temperature setting is therefore set to avoid injuries or to be used for a particular purpose (i.e., commercial, industrial, etc.). It should be noted that in some embodiments, the water temperature is reset to a default temperature to avoid injury to the next person after a person using the faucet at a maximum temperature. In another embodiment, a maximum water temperature set knob is located on the logic processor board or on the outside surface of digital controller.

In one embodiment, the continuous flow mode may run indefinitely once entered into. In one example, the Continue-water-flow-mode will perform same function as somebody opens a manual faucet and lets it flow continuously. In one example, the main purpose of this mode is targeted for residential applications where a basic knowledge about faucet operation principles are known, and not for just commercial usages like a restroom in airport or restaurants. However, the maximum water flowing time period (Timer-mode) can be set in the logic processor, or by the User (User-program-mode), and/or by the manufacturer. In one embodiment, if power to the automatic faucet is interrupted, the flow control valve B (solenoid valve) will shut off (normal close) to shut off water flow in case the power goes out or battery dies. In one embodiment, a backup battery system detects a drop in battery voltage below a predetermined minimum level and, in response thereto, provides a warning signal and shuts off the water flow control valve B. This may prevent the battery from being entirely depleted.

In some embodiments, since there is only one water tube and an electronic wire connection from faucet body to the housing of the digital controller, the installation of the embodiments are even easier than traditional manual faucets.

In one embodiment, the left/right sensors are fully reversible or at the same side based on need (e.g., a handicap, left handed vs. right handed, etc.). Additionally, the sensors may be installed in different parts of faucet body depending upon the application and/or need.

Figure 10:
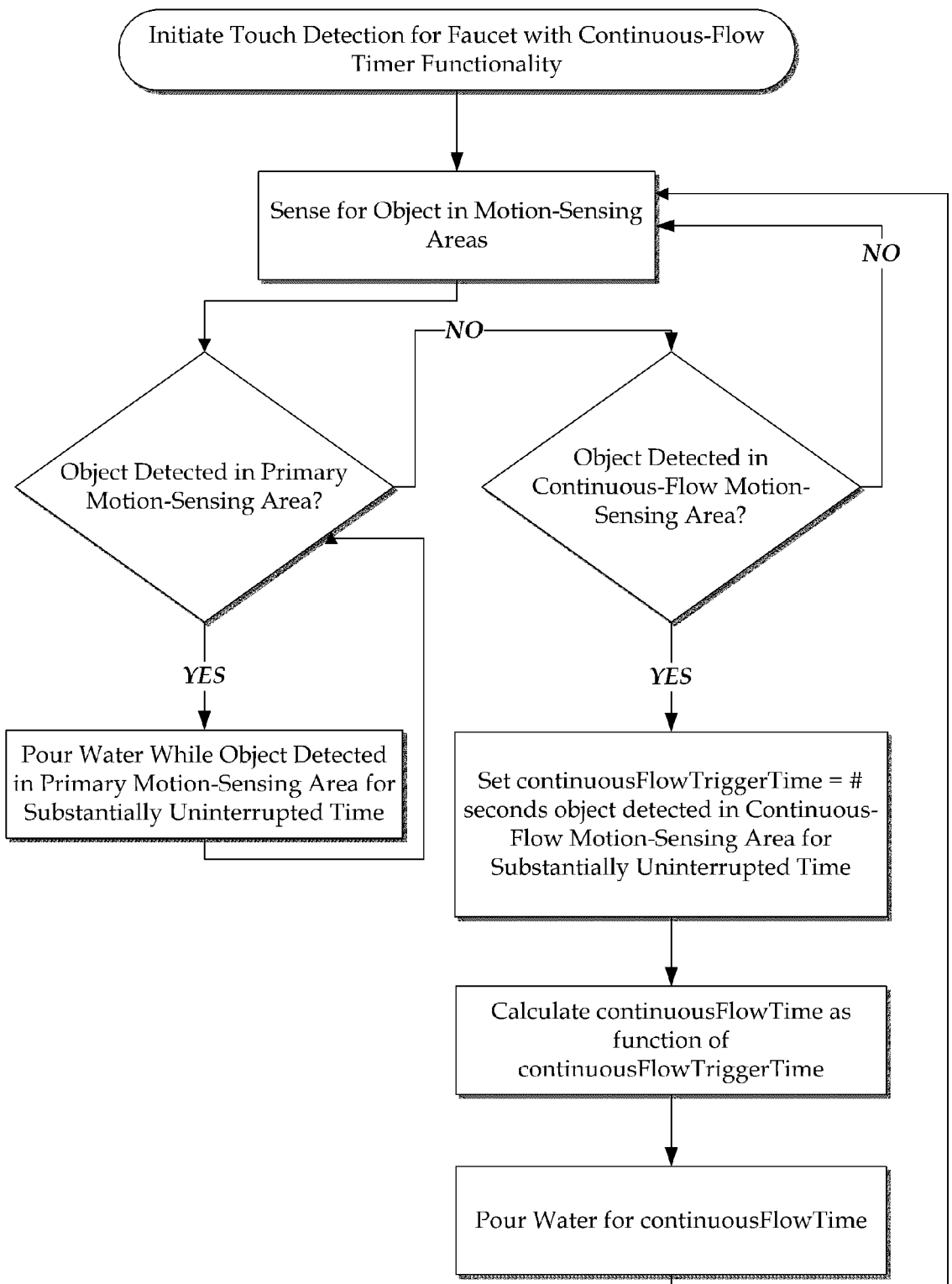
FIG. 10 is a flow-chart depicting an embodiment of a method for providing both touch-free primary-flow water operation and user-set continuous-flow water operation.

Referring to FIG. 10, there is depicted one example method for a touch-free faucet to provide both primary-flow and continuous-flow operations. The faucet senses for the presence of an object in motion sensing areas, including both a primary motion-sensing area and a continuous-flow motion-sensing area. While an object is detected in the primary motion-sensing area, the faucet pours water. When an object is detected in the continuous-flow motion-sensing area, the faucet calculates the amount of time that the object is detected for a substantially uninterrupted period of time. The faucet then calculates an amount of time for the continuous flow operation, based upon the amount of time that the object was detected. The faucet pours water for that calculated amount of time. In one example, the faucet begins pouring water while the object is still detected in the continuous-flow motion-sensing area such that the final amount of time for continuous flow operation has not yet been calculated. In other embodiments, different methods may be used to provide user-programmable continuous-flow operation. For example, the system may detect one or more objects in one or more detection zones and may determine a continuous-flow time based on factors such as the amount of time that the object or objects were detected, the distance of the objects from the sensors, motion gestures of the objects, and any combination thereof.

Embodiments of a touch-free faucet may include a plurality of sensor zones, which may be in distinct or overlapping areas. A sensor zone may comprise one or more sensors capable of detecting objects within the sensor zone. For example, a temperature increase sensor zone may comprise a touch-free sensor that detects the presence of an object within a detection proximity of the touch-free sensor, and may provide an electronic signal in response to the detection, where a logic processor responds to the receipt of the electronic signal by increasing the temperature of water flow. The same embodiment may also include a continuous-flow sensor zone that comprises both the touch-free sensor used for temperature increases, and a second touch-free sensor used similarly for temperature decreases. The continuous-flow sensor zone may encompass the smaller sensor zones for the two sensors that it comprises, such that when a user holds a hand out in front of both sensors simultaneously, the user activates the continuous-flow sensor zone. In such an embodiment, the logic processor is programmed to detect that, when the two sensors transmit a signal indicating that they each detect an object, and those signals are transmitted and/or received substantially simultaneously, the user action is interpreted based on an action associated with the activation of both sensors, rather than the actions associated with the activation of the sensors individually. In this example, the system detects the user's hand in proximity to both sensors and performs continuous-flow operation based on that detection.

Figure 19:
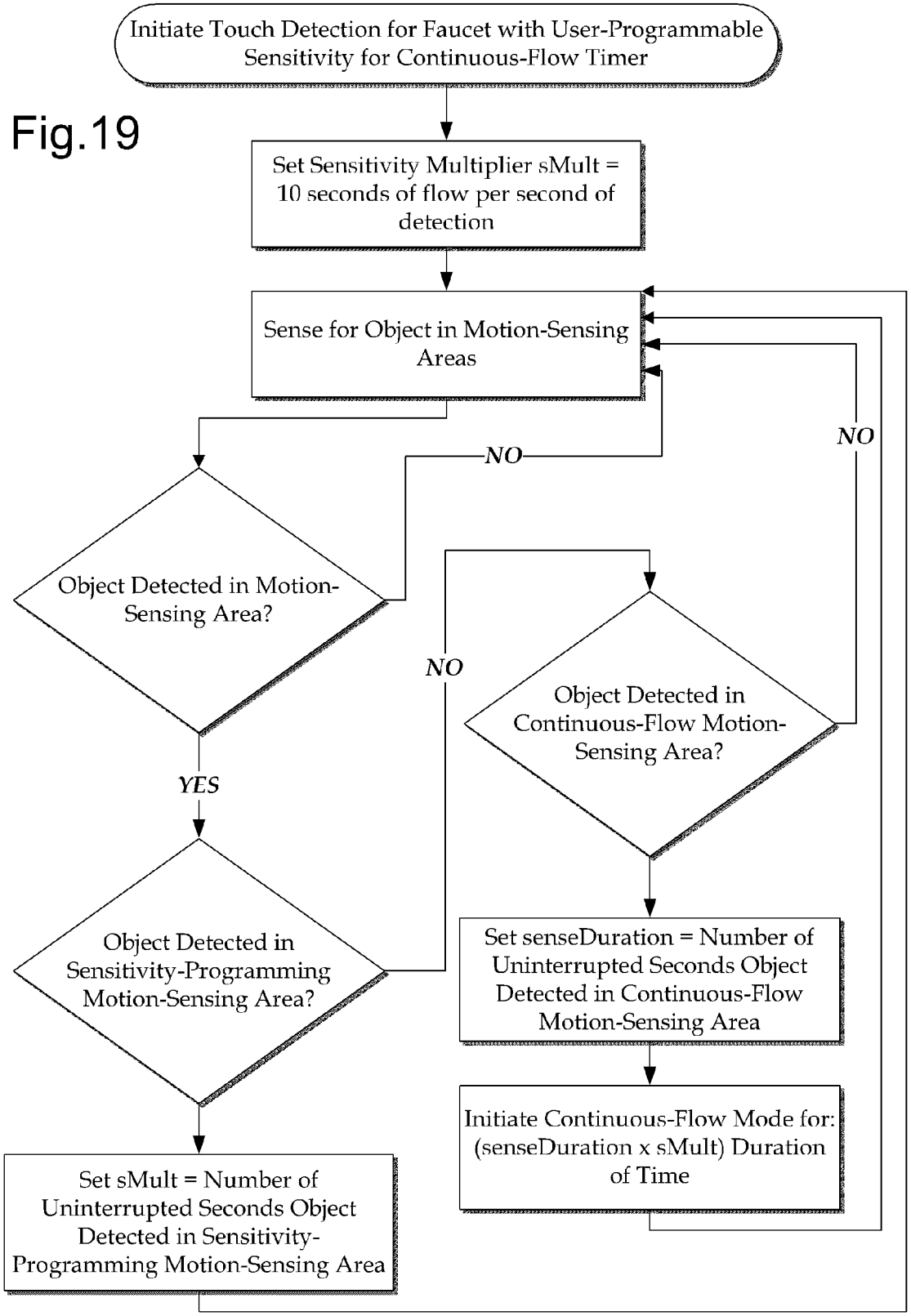
FIG. 19 is a flow-chart depicting one embodiment of a method for adjusting the user-programmable continuous flow timing sensitivity of a touch-free faucet, and then initiating a continuous flow based on that user-programmed continuous flow timing sensitivity.

Referring to FIG. 19, there is depicted a method for a touch-free faucet to provide both primary-flow and continuous-flow operations, with the continuous-flow operations including a user-programmable sensitivity. The faucet maintains a sensitivity multiplier, sMult, which can be initially set to 10 seconds of flow per second of detection. The faucet senses for objects in its motion-sensing areas. If an object is detected in the sensitivity-programming motion-sensing area, the sMult is set as a function of the amount of uninterrupted seconds that the object is detected in that sensing area. This allows a user to change the sMult variable, thereby changing the faucet's sensitivity for continuous-flow operation. The faucet detects whether there is an object in the continuous-flow motion-sensing area. If there is an object detected, the faucet sets the variable senseDuration to the number of uninterrupted seconds that the object is detected in that motion-sensing area. The faucet then initiates continuous-flow water flow for an amount of time calculated from both the senseDuration variable and the sMult variable. In this example, the continuous-flow time is set as the product of senseDuration and sMult. In other embodiments, other algorithms may be used.

In some embodiments, the assembly may include multiple default settings for the sMult variable. For example, the assembly may include low, medium, and high sMult variables. In that example, when the assembly detects an object for less than a first predetermined period of time, the assembly selects the low-sMult variable. When the assembly detects an object for more than the first predetermined period of time, but less than the second predetermined period of time, the assembly selects the medium-sMult variable. When the assembly detects an object for more than the second predetermined period of time, the assembly selects the high-sMult variable. The system may provide a visual indication of the sMult variable, for example by flashing once to indicate the low-sMult variable, flashing twice to indicate the medium-sMult variable, and flashing three times to indicate the high-sMult variable. For example, the low-sMult variable may correspond to a low sensitivity state, where the continuous flow functionality is calculated using a multiplier of 5, such that triggering continuous-flow by placing an object before the appropriate sensor for 10 seconds will result in 50 seconds of continuous flow. Similarly, the medium-sMult variable may correspond to a medium sensitivity state, where the continuous flow functionality is calculated using a multiplier of 15, such that triggering continuous-flow by placing an object before the appropriate sensor for 10 seconds will result in 150 seconds of continuous flow. Similarly, the high-sMult variable may correspond to a high sensitivity state, where the continuous flow functionality is calculated using a multiplier of 60, such that triggering continuous-flow by placing an object before the appropriate sensor for 60 seconds will result in 600 seconds of continuous flow. In some embodiments, the system includes functionality for two default sensitivity levels rather than three. In other embodiments, the system includes functionality for more than three default sensitivity levels. A range of multiplies may be used such that the levels can be adapted to a variety of preferences.

For example, the apparatus of claim 9, wherein the low-sensitivity multiplier is 5, the medium-sensitivity multiplier is 15, and the high-sensitivity multiplier is 60 such that, if an object is detected in the second sensor zone substantially uninterrupted for 5 seconds, the logic processor is configured to determine the amount of time for continuous water flow as 25 seconds if the continuous-water-flow-sensitivity level is in the low-sensitivity state, the logic processor is configured to determine the amount of time for continuous water flow as 75 seconds if the continuous-water-flow-sensitivity level is in the medium-sensitivity state, and the logic processor is configured to determine the amount of time for continuous water flow as 5 minutes if the continuous-water-flow-sensitivity level is in the high-sensitivity state.

Figure 20:
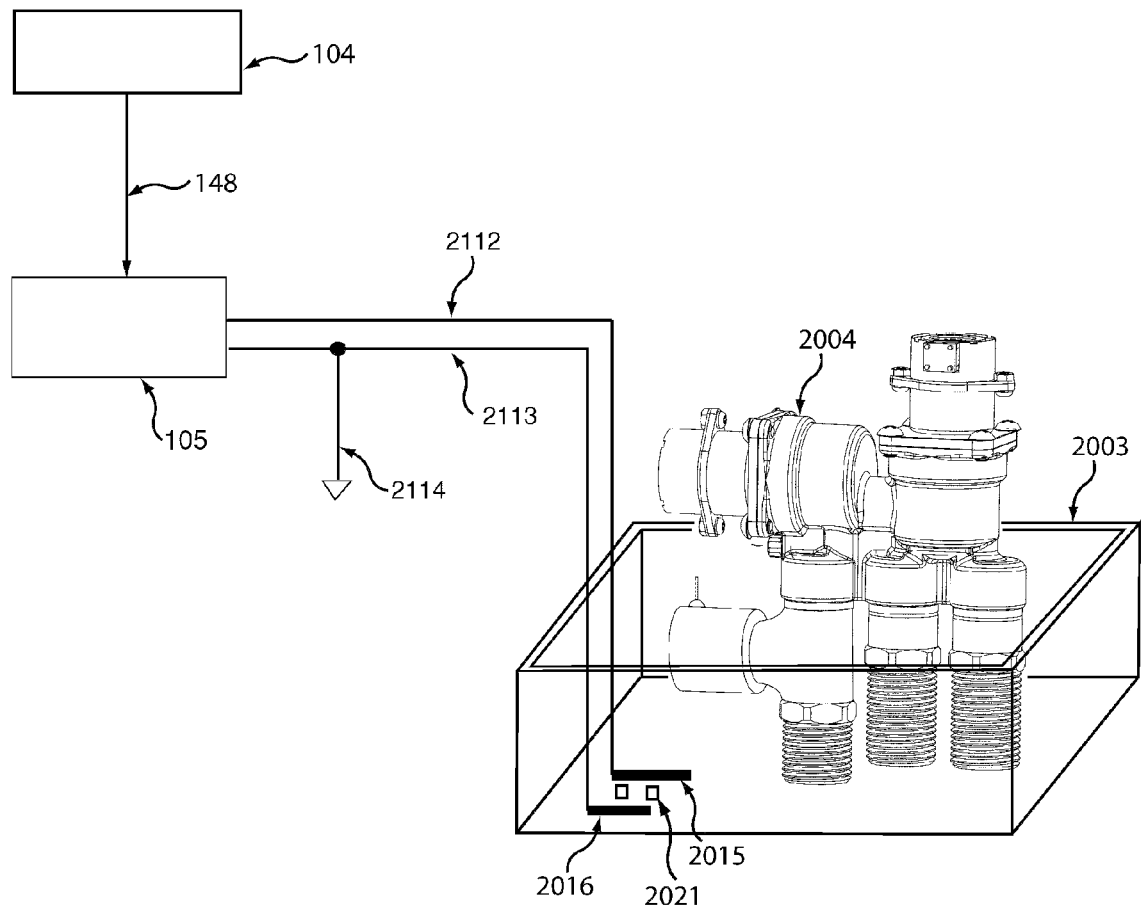
FIG. 20 illustrates an embodiment of a faucet apparatus that includes functionality for water leakage detection in the control valve box of a touch-free faucet.

Referring to FIG. 20, a control valve apparatus (2004) is shown with functionality for moisture detection. The control valve apparatus (2004) is at least partially within a housing (2003) that also includes moisture-detection components. For example, in the illustrated embodiment, moisture detection elements (2015, 2016, and 2021) are shown. Various embodiments may use a variety of moisture detection components, such as moisture detection circuits, humidity detection circuits, optical water recognition, or hydrostatic testing of the control valve apparatus frame. In the illustrated embodiments, moisture detection element (2021) forms a completed circuit between two electrodes (2015 and 2016) when water is present. The system transmits one or more signals (2112 and 2113) to the logic processor circuit board (105) corresponding to this moisture detection. The circuitry includes a ground circuit (2014), and the electrical power supply package (104) provides a current (148) to the logic processor circuit (105). When the water detection elements (2015, 2016) transmit one or more signals to the logic processor circuit board (105) indicating the presence of water, the logic processor circuit board (105) sends a signal to the control valve apparatus (2004) instructing it to restrict the flow of water in order to reduce further leakage. Further communications can be sent to outside agencies. For example, notice of a possible leak may be sent to a handheld remote or via a network, such as the Internet or mobile phone network.

Figure 21A:
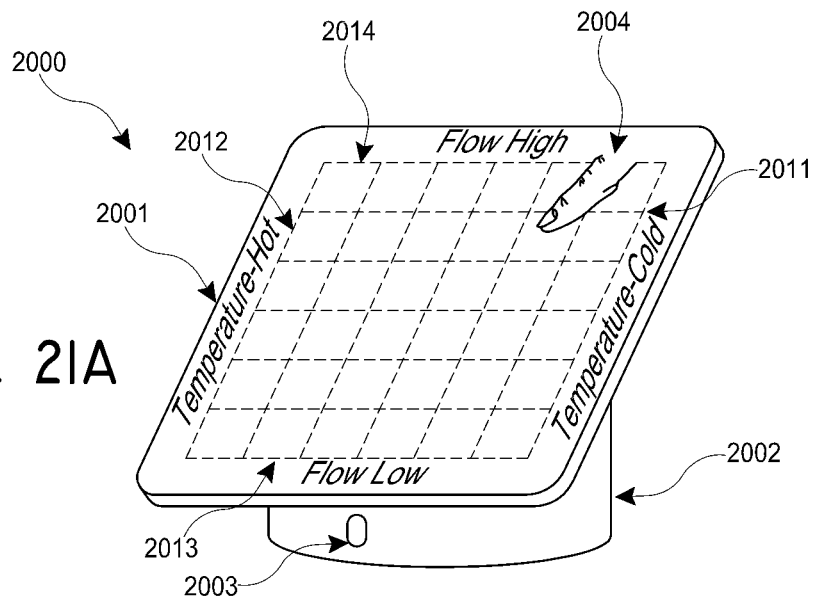
FIG. 21A illustrates an embodiment of a of a faucet control assembly that includes a sensor control panel assembly to control water temperature and flow.

FIG. 21A illustrates another embodiment of the water control apparatus (1060). The water control apparatus includes a control panel assembly (2001) with a base (2002). A sensor (2003) is mounted on the base (2002) to sense an object in the sink area, which may start an intermittent water flow. The control panel (2001) includes a printed panel with printed indication of the various control options: water temperature cold (2011), temperature hot (2012), flow low (2013) and flow high (2014) for user to control the water flow with a finger (2004) or other object.

Figure 21B:
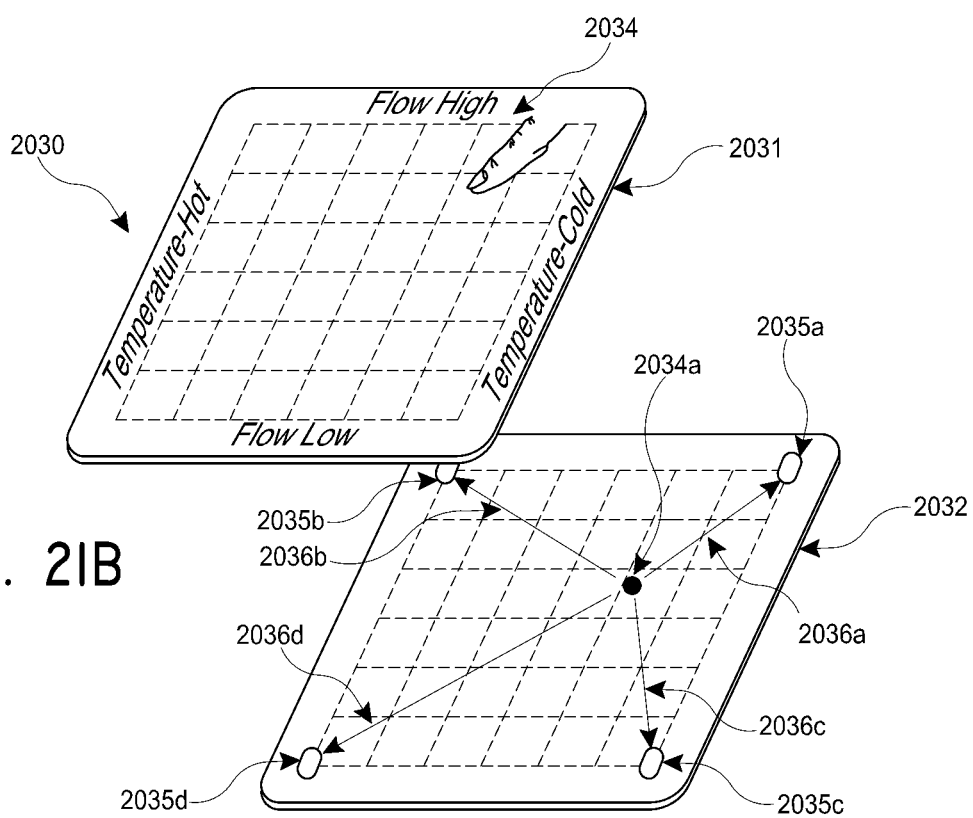
FIG. 21B illustrates an embodiment of a of a faucet control assembly that includes multiple sensors control water temperature and flow.

FIG. 21B illustrates another embodiment of the water control assembly (2030). The water control assembly includes a panel cover (2031) and a sensor board (2032). Four sensors (2035a, 2035b, 2035c, and 2035d) are mounted on the four corners of the board (2032) in an array arrangement to sense an object (2034) on the top of control panel. The apparatus controls water temperature and flow using a scale which is decided by the relative position of the object (2034a) in relation to the sensors. For example, the apparatus senses the distances between the object and each of the four sensors (2036a, 2036b, 2036c and 2036d). The distances between the object and each of the four sensors (2036a, 2036b, 2036c and 2036d) can be calculated from the signal strength received by the four sensors (2035a, 2035b, 2035c and 2035d) and hence control the water temperature and water flow. This may provide for control of water flow functionality using three dimensions in space, for example.

Figure 21C:
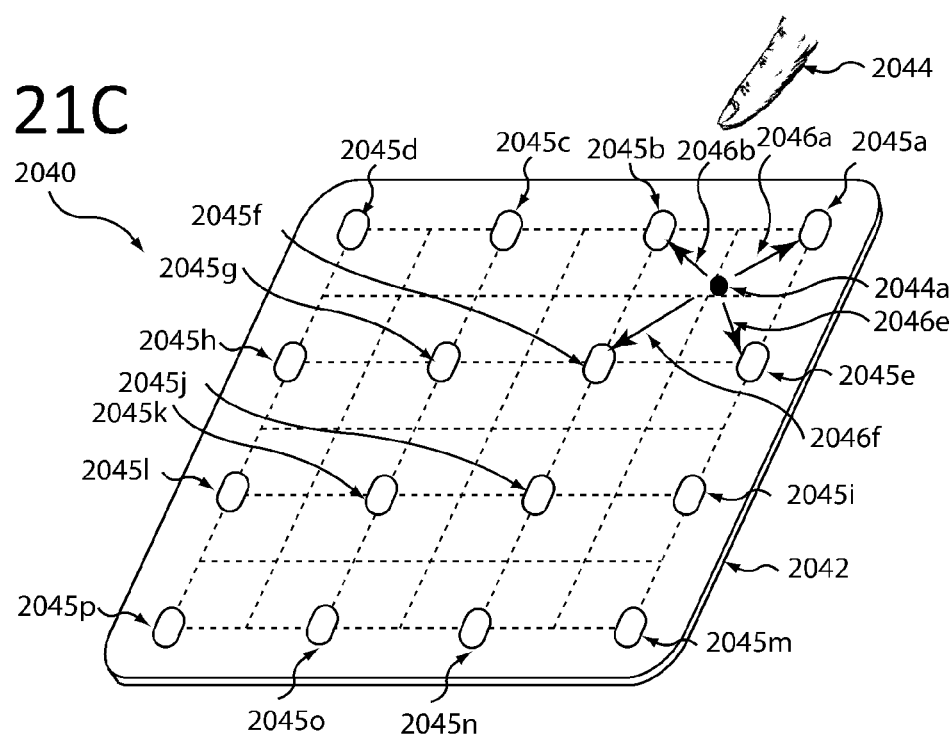
FIG. 21C illustrates an embodiment of a of a faucet control assembly that includes a sensor array to control water temperature and flow.

FIG. 21C illustrates another embodiment of the water control sensor board (2040). Multiple sensors (2045a, 2045b, 2045c, 2045d, 2045e, 2045f, 2045g, 2045h, 2045i, 2045j, 2045k, 2045l, 2045m, 2045n, 2045o, 2045p) are mounted on the board (2042) in an array arrangement to sense an object (2044) on the top of control panel. The water temperature and flow are controlled using a scale that is determined at least in part by the relative position of the sensors such as the object (2044a) to the four sensors (2045a, 2045b, 2045e and 2045f). The distances between the object and each of the four sensors (2046a, 2046b, 2046e and 2046f) can be calculated from the signal strength received by the four sensors (2045a, 2045b, 2045f and 2045e) and can be used by the apparatus to control the water temperature and water flow.

Figure 21D:
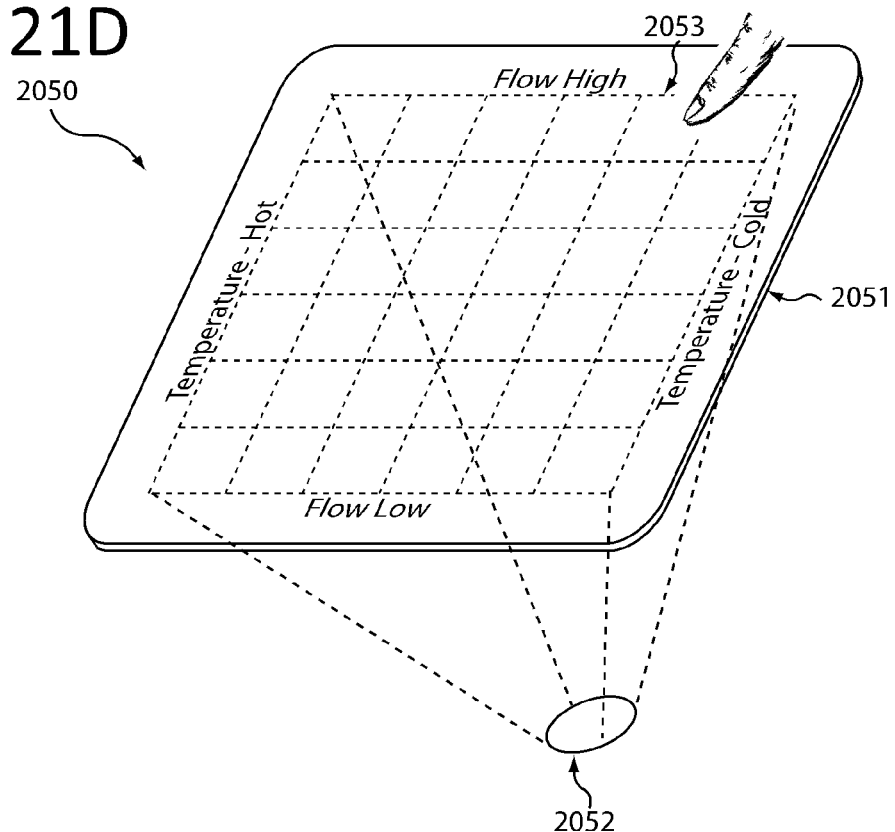
FIG. 21D illustrates an embodiment of a of a faucet control assembly that includes a camera to sense an object to control water temperature and flow.

FIG. 21D illustrates another embodiment of the water control assembly (2050). The water control assembly includes a panel cover (2051) and a camera set (2052). The camera set (2052) is mounted under the control panel cover (2051). The apparatus captures images of an object using the camera set (2052). The apparatus may then process one or more images to determine the position of object (2054) and use that determined position to control the water temperature and flow. In various embodiments, an infrared camera, optical camera, or infrared/optical hybrid camera may be used, for example. Other technology such as eye ball tracking technology can be applied in this invention.

FIGS. 22-28 depict various perspectives of compartment housing sensors for touch-free control of a faucet. The compartment may be configured to be mounted next to a faucet, and may include sensors that control the flow of water from the faucet in manners such as those described above within this application. The illustrated embodiment includes two cylindrical shaft sections, either or both of which may be either rotated or fixed. For example, the bottom section includes a primary sensor (C-sensor) that may sense the presence of an object within a sink area in order to control temporary flow in response to the detection. The cylindrical shaft section housing that sensor may be rotated approximately 360 degrees so that the sensor points toward the sink, depending on the placement of the compartment in relation to the faucet and sink. Similarly, the upper cylindrical shaft section houses additional sensors used for functions such as increasing and decreasing temperature and flow. This upper cylindrical section may also be rotated so that the functions may be conveniently accessed by a user.

Figure 22:
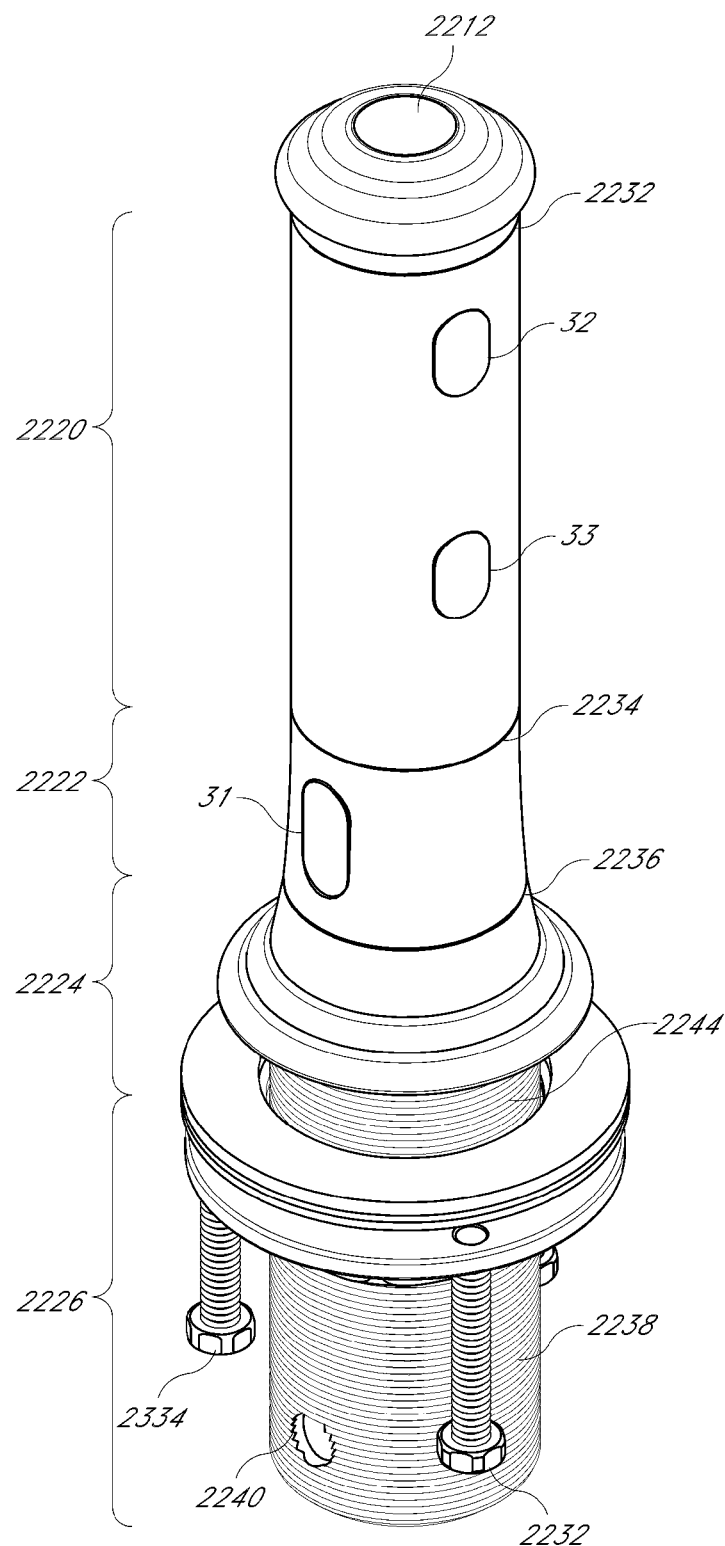
FIG. 22 is a perspective view of a compartment housing sensors for touch-free control of a faucet.
Figure 23:
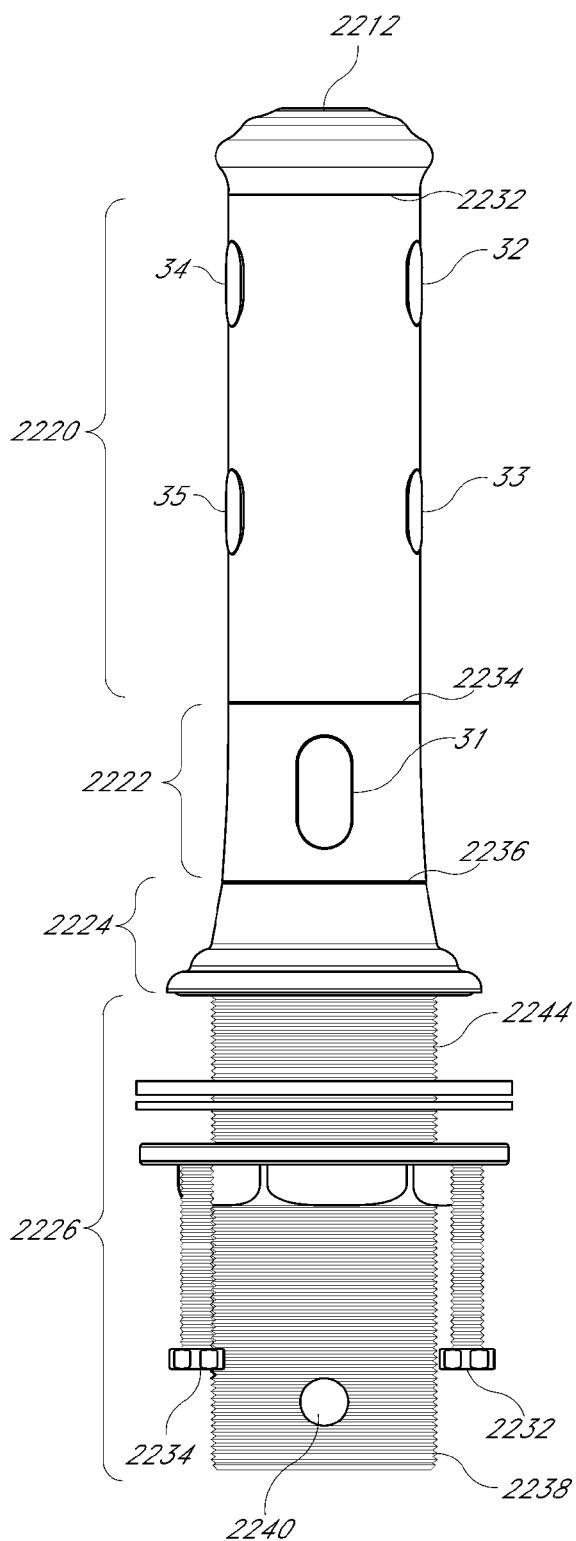
FIG. 23 is a front view of a compartment housing sensors for touch-free control of a faucet.
Figure 24:
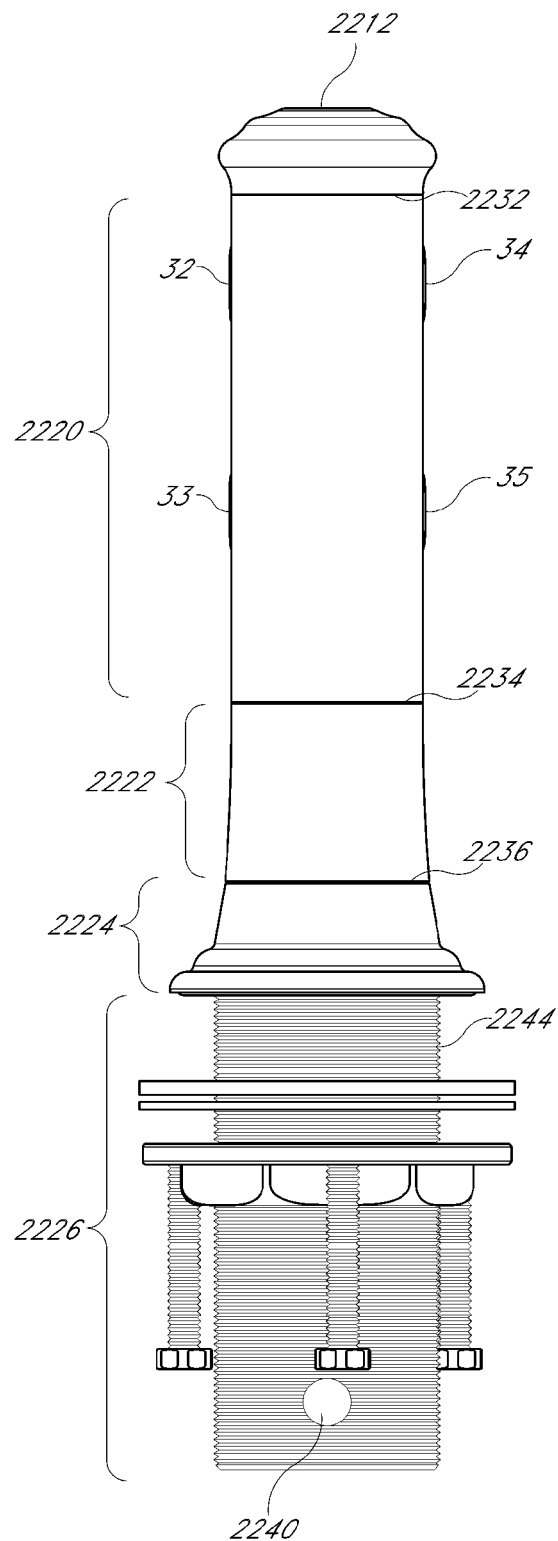
FIG. 24 is a rear view of a compartment housing sensors for touch-free control of a faucet.
Figure 25:
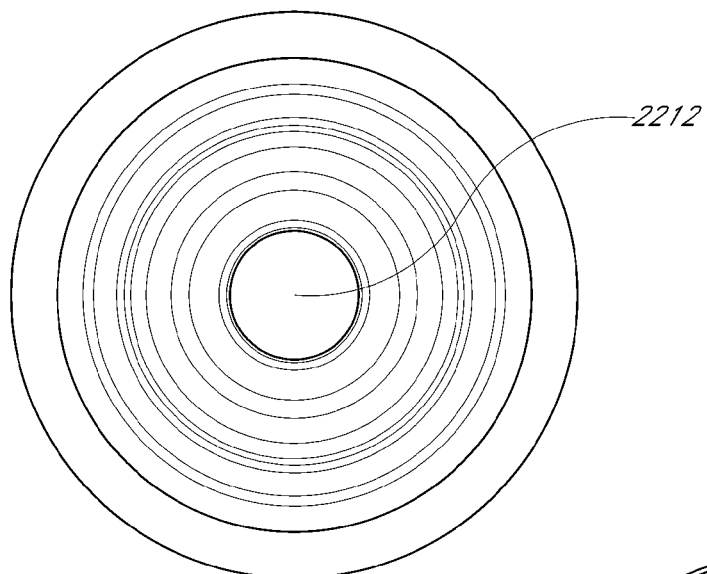
FIG. 25 is a top view of a compartment housing sensors for touch-free control of a faucet.
Figure 26A:
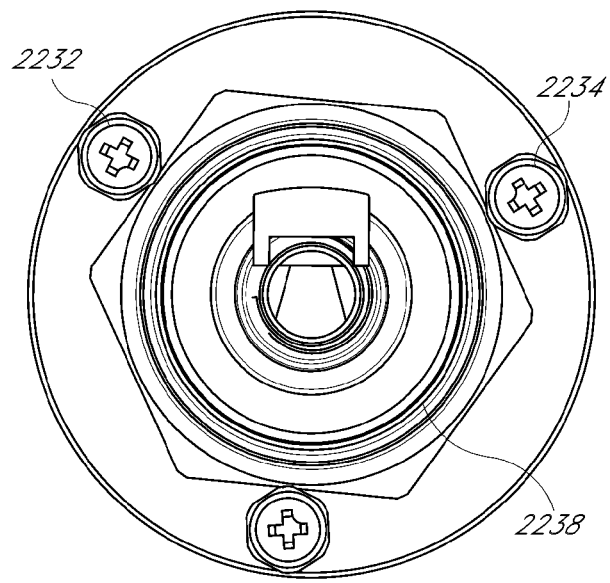
FIG. 26A is a bottom view of a compartment housing sensors for touch-free control of a faucet.
Figure 26B:
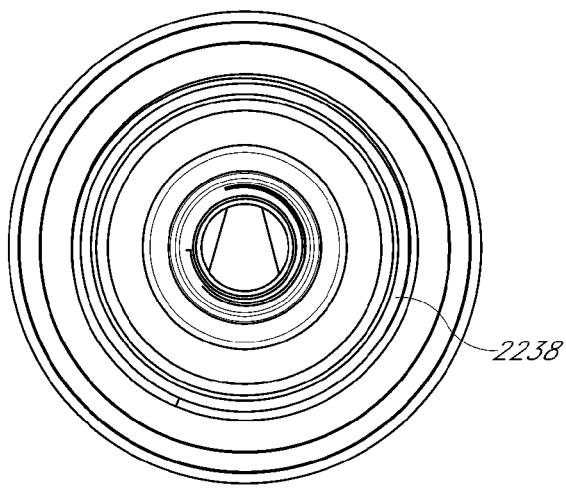
FIG. 26B is a bottom view of a compartment housing sensors for touch-free control of a faucet.
Figure 27:
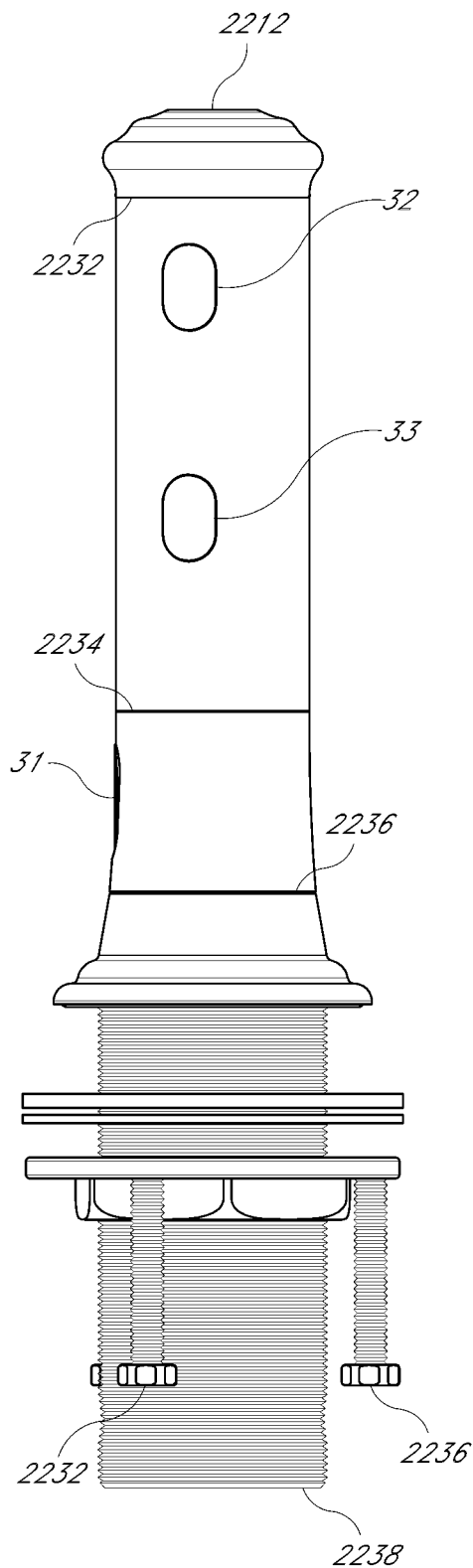
FIG. 27 is a side view of a compartment housing sensors for touch-free control of a faucet.
Figure 28:
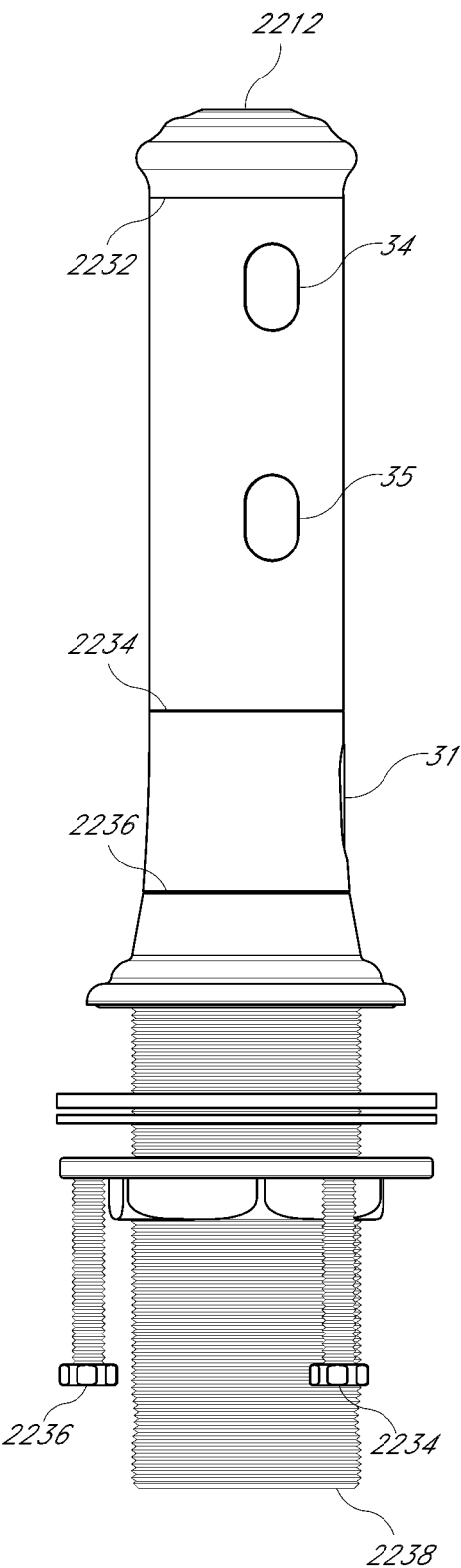
FIG. 28 is a side view of a compartment housing sensors for touch-free control of a faucet.
Figure 29:
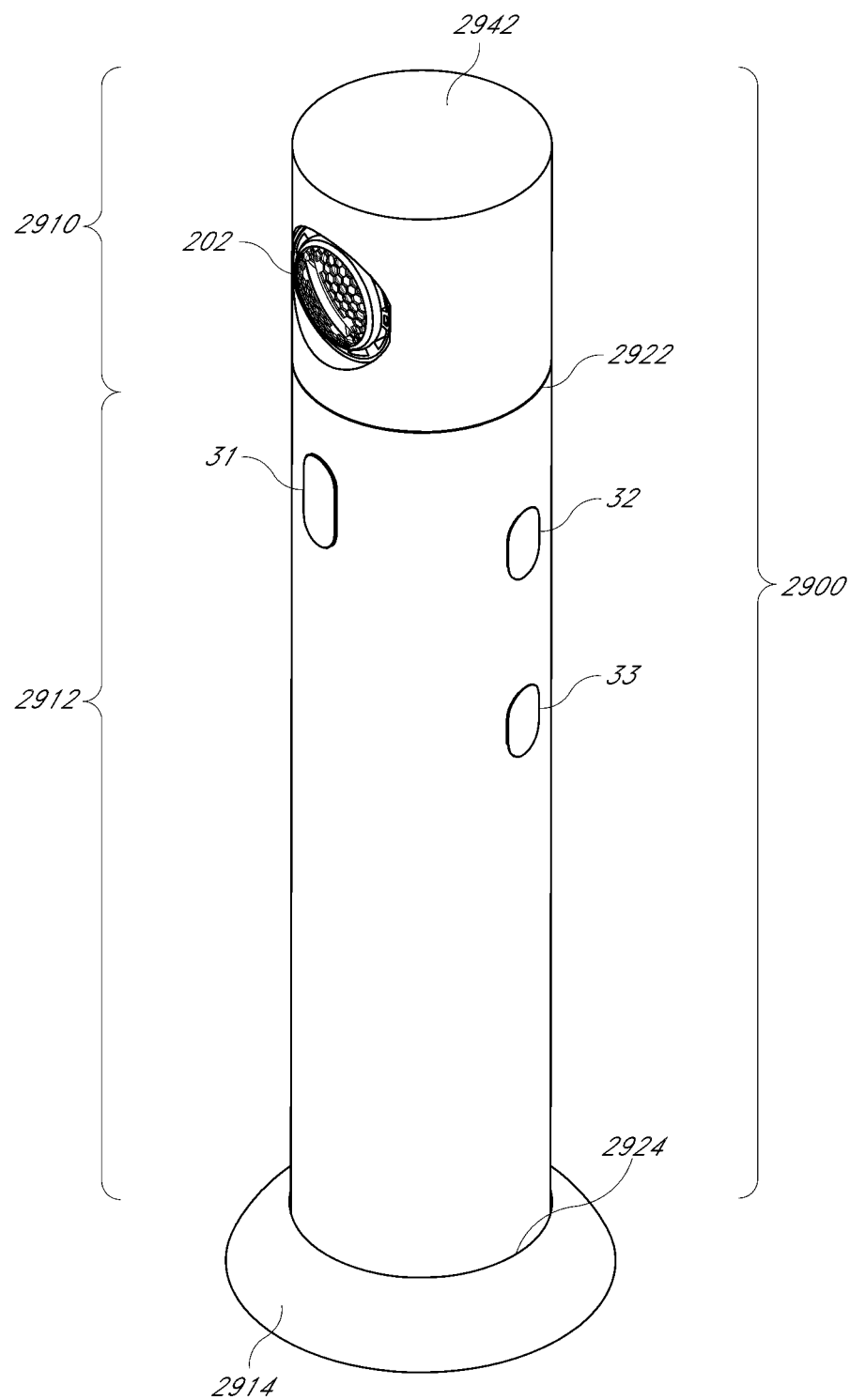
FIG. 29 is a perspective view of a touch-free, wall-mountable faucet.
Figures 30, 31:
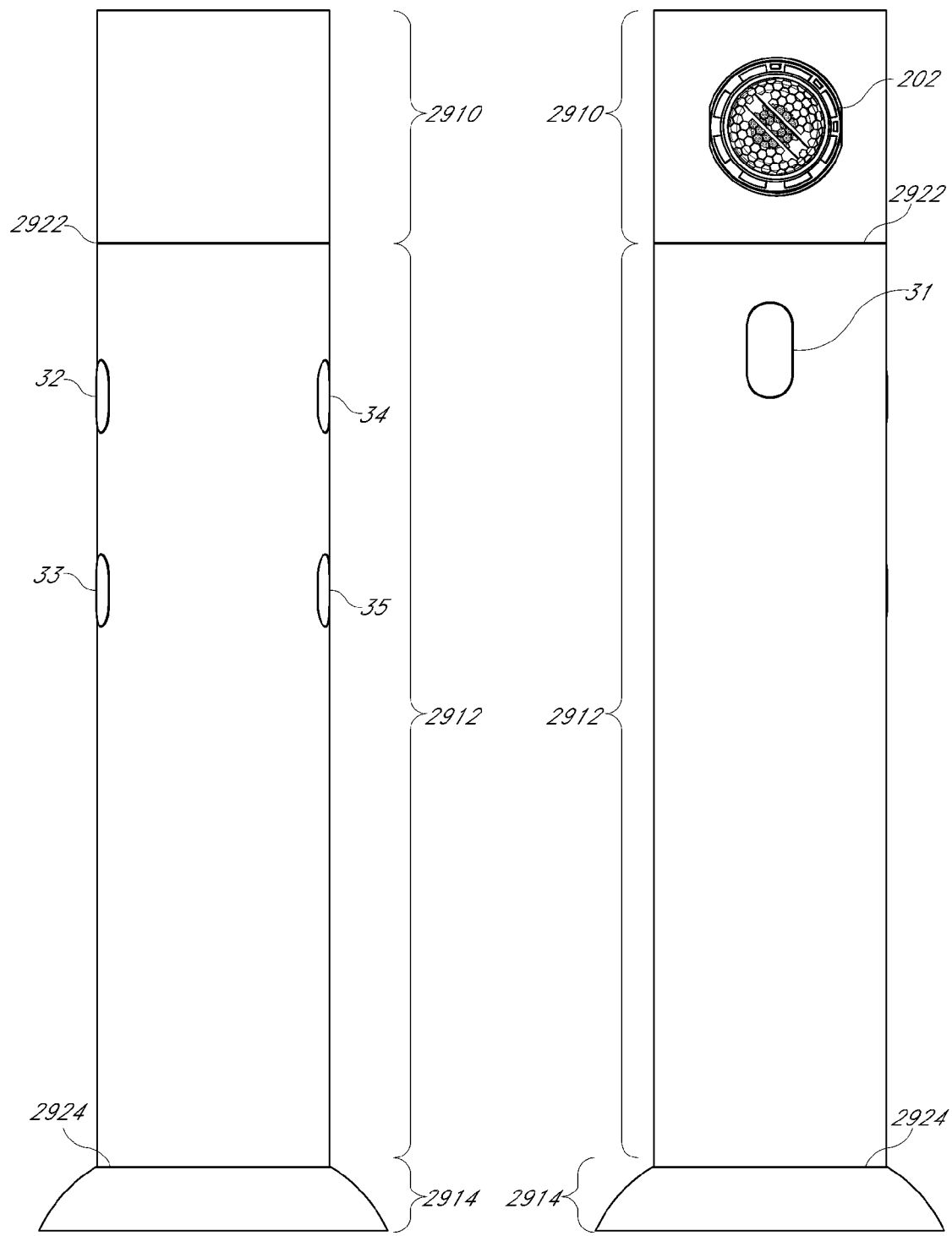
FIG. 30 is a top view of a touch-free, wall-mountable faucet.
FIG. 31 is a bottom view of a touch-free, wall-mountable faucet.
Figure 32:
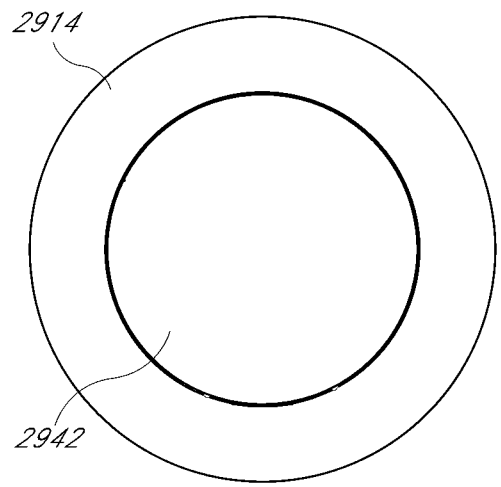
FIG. 32 is a front view of a touch-free, wall-mountable faucet.
Figure 33:
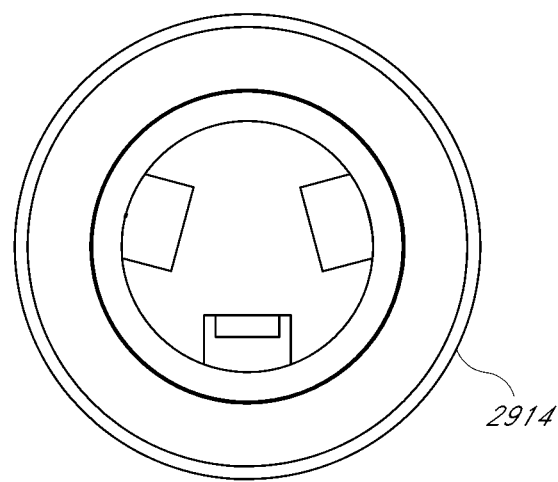
FIG. 33 is a rear view of a touch-free, wall-mountable faucet.
Figure 34:
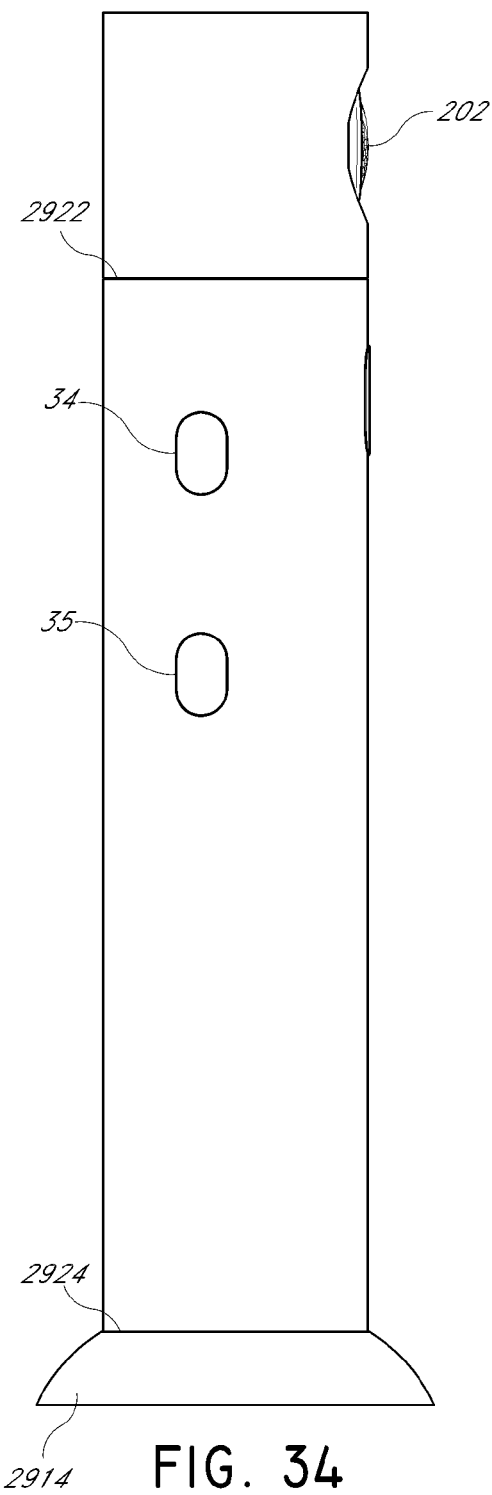
FIG. 34 is a side view of a touch-free, wall-mountable faucet.
Figure 35:
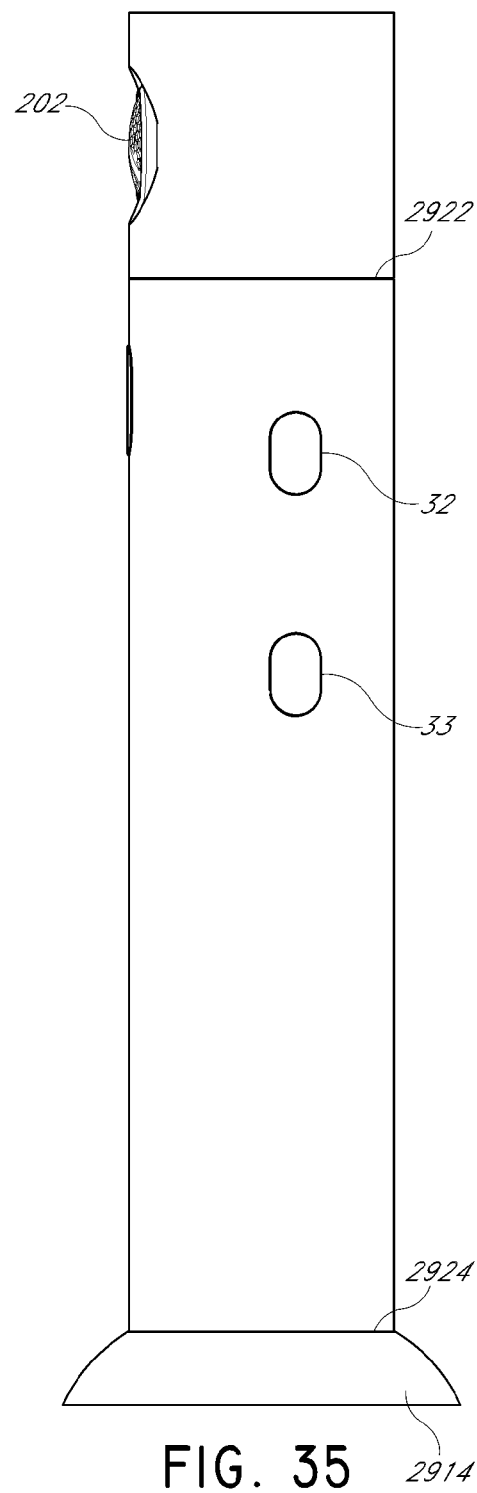
FIG. 35 is a side view of a touch-free, wall-mountable faucet.

Referring to FIG. 22, the compartment of the illustrated embodiment has a cap (2212), an upper cylindrical section (2220), a lower cylindrical section (2222), a base (2224), and a below-surface section (2226). In the present embodiment, a primary sensor (e.g., "C-Sensor") (31) is embedded within the lower cylindrical section (2222) while the secondary and tertiary sensors (e.g., "A-Sensor," "B-Sensor," "D-Sensor," and "E-Sensor") (32-35) are embedded within the upper cylindrical section (2220). The cylindrical section (2220) and/or the lower cylindrical section (2222) are housed on a rotational element, such as bearings or bushings. A separation spacing (2234) between the section, a separation spacing (2232) above the upper cylindrical section (2220) and a separation spacing (2236) below the lower cylindrical section (2222) permit one or both of the sections to rotate angularly. For example, the compartment may be mounted to the right of a faucet, near the back of a kitchen sink. The user may rotate the lower cylindrical section clockwise approximately 60 degrees so that the primary sensor (31) is pointed directly toward the sink basin. In one embodiment, one or more of the cylindrical sections can be rotated and then fixed into place, for example using a bolt, pin, or spring. In another embodiment, one or more of the cylindrical sections remains freely rotatable.

The sensor compartment may include a cap (2212) which, in certain embodiments, may include an embedded, upward-facing sensor. The compartment may also include a base (2224) that is designed to be mounted against a flat surface, such as a kitchen counter or the rim of a sink. A portion of the compartment (2226) may be designed to mount beneath the surface, and may include components for securing the compartment to the surface. For example, the illustrated embodiment includes bolts (e.g., 2232 and 2234) mounting. A below-surface shaft (2238) may include a cutout (2240), for example to permit wiring from the sensors to pass through.

FIGS. 29-35 depict various perspectives of a touch-free, wall-mountable faucet. The illustrated embodiment includes a faucet head that is rotatable in relation to the rest of the faucet body. For example, the faucet outlet is housed in a cylindrical shaft portion that may be rotated approximately 360 degrees in order to adapt the spout angle in relation to the mounting angle and sink location. The other illustrated portion of the cylindrical shaft houses sensors, and may also be either capable of rotation, or fixed, depending on the embodiment.

The wall-mountable faucet (2900) may include a spout (202) embedded within a spout portion (2910) and sensors (31-35) within a sensor portion (2912). In another embodiment, the spout portion (2910) includes at least one sensor. In certain embodiments, the spout portion (2910) and/or the sensor portion (2912) may rotate. A separation spacing (2922) between the spout portion (2910) and the sensor portion (2912) and a separation spacing (2924) between the sensor portion (2912) and the base (2914) permit one or both portions to rotate angularly. The base (2924) may be designed to fit against a flat, vertical surface, such as a wall next to a bathtub or sink.

Terminology

The headings provided herein, if any, are for convenience only and do not necessarily affect the scope or meaning of the claimed invention. Although the exemplary embodiments are described in relation to a touch-free faucet, embodiments of the present disclosure can be applied in any application where control of water flow is desired. Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad inventions, and that the inventions not be limited to the specific constructions and arrangements shown and described, since various other modifications may occur to those ordinarily skilled in the art. Although the inventions have been described in terms of certain preferred embodiments, other embodiments will be apparent to those of ordinary skilled in the art, including embodiments that do not include all of the features and benefits set forth herein.

What is claimed is:

1. A faucet apparatus for providing user-controllable continuous water flow, the faucet apparatus comprising:
   a spout configured to direct water flow into a sink;
   a logic processor;
   a first sensor zone comprising a first sensor, said first sensor facing the area in which the spout is configured to direct water to flow; and
   a second sensor zone comprising a second sensor, said second sensor configured to detect an object in the second sensor zone and respond to the detection by providing input to the logic processor;
   wherein the logic processor is programmed to:
      determine whether an electronic representation of a flow state is in either a primary-water-flow-mode or a continuous-water-flow mode;
      receive input from the first sensor indicating the presence of an object within the first sensor zone and, in response thereto, cause the spout to direct water flow while the input from the first sensor indicates than an object is present in the first sensor zone;
      cause the spout to stop directing water flow when the input from the first sensor indicates that no object is present within the first sensor zone, if it is determined that the electronic representation of the flow state is in the primary-water-flow-mode; and
      receive input from the second sensor indicating the presence of an object within the second sensor zone and, in response thereto, if the electronic representation of the flow state is in the primary-water-flow-mode, determine an amount of time for continuous water flow based on the amount of substantially uninterrupted time in which the object is detected in the second sensor zone and in response thereto, change the electronic representation of the flow state from the primary-water-flow-mode to the continuous-water-flow-mode, and cause the spout to direct water flow for the determined amount of time for continuous water flow, regardless of whether an object is present in the first sensor zone.

2. The apparatus of claim 1, wherein the logic processor is further programmed to receive input from the second sensor indicating the presence of an object within the second sensor zone and, in response thereto, if the electronic representation of the flow state is in the continuous-water-flow mode, cause the spout to stop directing water to flow.

3. The apparatus of claim 1, wherein the logic processor is further programmed to receive input from the second sensor indicating the presence of an object within the second sensor zone and, in response thereto, if the electronic representation of the flow state is in the continuous-water-flow mode, increase the determined amount of time for continuous water flow.

4. The apparatus of claim 3, wherein the logic process is further programmed to receive input from the second sensor indicating the presence of an object within the second sensor zone and, in response thereto, if the electronic representation of the flow state is in the continuous-water-flow mode, increase the determined amount of time for continuous water flow as a function of the amount of time that the object is detected within the second sensor zone substantially interrupted.

5. The apparatus of claim 3, wherein the logic process is further programmed to:
   receive input from the second sensor indicating the presence of an object within the second sensor zone and, in response thereto, if the electronic representation of the flow state is in the continuous-water-flow mode and the object is detected for at least a minimum threshold amount of time, increase the determined amount of time for continuous water flow; and
   receive input from the second sensor indicating the presence of an object within the second sensor zone and, in response thereto, if the electronic representation of the flow state is in the continuous-water-flow mode and the object is detected for less than a minimum threshold amount of time, cause the spout to stop directing water to flow.

6. The apparatus of claim 1, further comprising a display element, wherein said display element is configured to provide a visual indication when the electronic representation of a flow state is in continuous-water-flow mode.

7. The apparatus of claim 1, wherein the logic processor is further programmed to:
   receive a first input from the second sensor indicating the presence of an object within the second sensor zone and, in response thereto, if the electronic representation of the flow state is in the primary-water-flow-mode, determine an amount of time for continuous water flow based on the amount of substantially uninterrupted time in which the object is detected in the second sensor zone and in response thereto, change the electronic representation of the flow state from the primary-water-flow-mode to the continuous-water-flow-mode, and cause the spout to direct water flow for the determined amount of time for continuous water flow, regardless of whether an object is present in the first sensor zone; and
   receive a second input from the second sensor indicating the presence of an object within the second sensor zone and, in response thereto, if the electronic representation of the flow state is in the primary-water-flow-mode and the second input was received within a predetermined duration from when the first input was received, change the electronic representation of the flow state from the primary-water-flow-mode to the continuous-water-flow-mode, and cause the spout to direct water flow for the same determined amount of time for continuous water flow as was determined in response to the receipt of the first input, regardless of whether an object is present in the first sensor zone.

8. The apparatus of claim 1, further comprising:
a third sensor zone comprising a third sensor, said third sensor configured to detect an object in the third sensor zone and respond to the detection by providing input to the logic processor; and
wherein said logic processor is further programmed to:
determine an electronic representation for a continuous-water-flow timing-sensitivity level;
receive input from the third sensor indicating the presence of an object within the third sensor zone and, in response thereto, change the electronic representation for the continuous-water-flow-sensitivity level; and
receive input from the second sensor indicating the presence of an object within the second sensor zone and, in response thereto, if the electronic representation of the flow state is in the primary-water-flow-mode, determine an amount of time for continuous water flow based on both the amount of substantially uninterrupted time in which the object is detected in the second sensor zone and the continuous-water-flow timing-sensitivity level, and in response thereto, change the electronic representation of the flow state from the primary-water-flow-mode to the continuous-water-flow-mode, and cause the spout to direct water flow for the determined amount of time for continuous water flow, regardless of whether an object is present in the first sensor zone.

9. The apparatus of claim 2, wherein changing the electronic representation for the continuous-water-flow-sensitivity level comprises setting the electronic representation for the continuous-water-flow-sensitivity level to one of a low-sensitivity state, a medium-sensitivity state, or a high-sensitivity state, wherein, the logic processor is further programmed to, in response to receiving input from the second sensor indicating the presence of an object within the second sensor zone, determine an amount of time for continuous water flow as the product of the amount of substantially uninterrupted time in which the object is detected in the second sensor zone and either a low-sensitivity multiplier, a medium-sensitivity multiplier, or a high-sensitivity multiplier, depending on which of the respective continuous-water-flow-sensitivity levels the electronic representation for the continuous-water-flow-sensitivity level is set to, wherein the low-sensitivity multiplier is a lower numeric value than the medium-sensitivity multiplier and the medium-sensitivity multiplier is a lower numeric value than the high-sensitivity multiplier.

10. The apparatus of claim 9, wherein the low-sensitivity multiplier is 5, the medium-sensitivity multiplier is 15, and the high-sensitivity multiplier is 60 such that, if an object is detected in the second sensor zone substantially uninterrupted for 5 seconds, the logic processor is configured to determine the amount of time for continuous water flow as 25 seconds if the continuous-water-flow-sensitivity level is in the low-sensitivity state, the logic processor is configured to determine the amount of time for continuous water flow as 75 seconds if the continuous-water-flow-sensitivity level is in the medium-sensitivity state, and the logic processor is configured to determine the amount of time for continuous water flow as 5 minutes if the continuous-water-flow-sensitivity level is in the high-sensitivity state.

11. The apparatus of claim 9, wherein changing the electronic representation for the continuous-water-flow-sensitivity level comprises setting the electronic representation for the continuous-water-flow-sensitivity level to a multiple calculated as a function of the amount of substantially uninterrupted time in which an object is detected in the second sensor zone.

12. The apparatus of claim 9, wherein the second sensor zone overlaps with the third sensor zone.

13. The apparatus of claim 9, wherein the logic processor is further configured to reset the electronic representation for the continuous-water-flow-sensitivity level to a default value after a predetermined period of time.

14. The apparatus of claim 9, further comprising a display element, wherein said display element is configured to provide a visual indication of the continuous-water-flow timing-sensitivity level.

15. The apparatus of claim 14, wherein said display element is an light emitting diode configured to blink as an indication of the continuous-water-flow timing-sensitivity level, such that the light emitting diode is configured to blink a larger number of times as an indication of a higher continuous-water-flow timing-sensitivity level and the light emitting diode is further configured to blink a smaller number of times as an indication of a lower continuous-water-flow timing-sensitivity level.

16. A method of providing user-controllable continuous water flow comprising:
receiving a first signal from a first sensor of a plurality of sensors, said first signal indicating a presence of an object within a zone of the first sensor;
determining whether an electronic representation of a flow state is in either a primary-water-flow-mode or a continuous-water-flow mode;
determining how long said sensor detects said object from the first signal;
determining, using a logic processor, an amount of time for continuous water flow based in part on said determination of how long said sensor detected said object;
changing the electronic representation of the flow state to the continuous-water-flow-mode based in part on said determination of the electronic representation;
causing the spout to direct water flow for the determined amount of time for continuous water flow; and
increasing the determined amount of time based in part on receiving a second signal.

17. The method of claim 16, wherein the amount of time is a direct function of said determination of how long said sensor detected said object.

18. The method of claim 16, further comprising displaying a visual indication when the electronic representation of a flow state is in continuous-water-flow mode.

* * * * *